(12) United States Patent
Boduch

(10) Patent No.: US 8,401,348 B2
(45) Date of Patent: Mar. 19, 2013

(54) METHODS AND APPARATUS FOR CONSTRUCTING LARGE WAVELENGTH SELECTIVE SWITCHES USING PARALLELISM

(75) Inventor: Mark E. Boduch, Geneva, IL (US)

(73) Assignee: Tellabs Operations, Inc., Naperville, IL (US)

(*) Notice: Subject to any disclaimer, the term of this patent is extended or adjusted under 35 U.S.C. 154(b) by 476 days.

(21) Appl. No.: 12/380,811

(22) Filed: Mar. 4, 2009

(65) Prior Publication Data

US 2009/0232447 A1 Sep. 17, 2009

Related U.S. Application Data

(60) Provisional application No. 61/188,083, filed on Aug. 6, 2008, provisional application No. 61/072,584, filed on Apr. 1, 2008, provisional application No. 61/070,573, filed on Mar. 24, 2008, provisional application No. 61/069,947, filed on Mar. 19, 2008, provisional application No. 61/069,825, filed on Mar. 17, 2008, provisional application No. 61/068,277, filed on Mar. 5, 2008.

(51) Int. Cl.
*G02B 6/26* (2006.01)
*G02B 6/42* (2006.01)
*H04J 14/00* (2006.01)

(52) U.S. Cl. .......................................... 385/16; 398/48

(58) Field of Classification Search ................. 385/16, 385/17, 20–24; 398/48
See application file for complete search history.

(56) References Cited

U.S. PATENT DOCUMENTS 5,974,207 A * 10/1999 Aksyuk et al. ................. 385/24
6,192,172 B1 * 2/2001 Fatehi et al. .................... 385/17
7,027,732 B2 * 4/2006 Paiam et al. .................... 398/50
7,133,616 B2 11/2006 Caroli
(Continued)

FOREIGN PATENT DOCUMENTS

EP 1 628 424 A2 2/2005
WO WO 03/061330 A2 7/2003
(Continued)

OTHER PUBLICATIONS

Zong, L., et al., "A Novel Tunable DeMUX/MUX Solution for WSS-Based ROADM and WXC Nodes," Optical Fiber Communication Conference and Exposition National Fiber Optic Engineers Conference. OFCNFOEC 2007, Mar. 25-29, 2007, Anaheim, CA; IEEE, Piscataway, NJ, Mar. 1, 2007, pp. 1-7.
(Continued)

*Primary Examiner* — Rhonda Peace
(74) *Attorney, Agent, or Firm* — Hamilton, Brook, Smith & Reynolds, P.C.

(57) ABSTRACT

Optical networks are increasingly employing optical network nodes having multiple interfaces to allow a node to direct optical signals received at any interface to any other interface connected to the node. Constructing a larger wavelength selective switching (WSS) module used in such a node can be complex and expensive. A method an apparatus for constructing a large WSS using parallelism is provided. In example embodiments, a larger WSS may include multiple parallel non-cascaded smaller WSSs and an optical coupler configured to optically couple the multiple parallel, non-cascaded smaller WSSs. This technique may be used to construct both N×1 and 1×N WSSs. Because the technique employs multiple parallel, non-cascaded WSSs, all inputs of a larger N×1 WSS and all outputs of a larger 1×N WSS are available receive or transmit external signals rather than being rather than being unavailable due to, for example, cascading smaller WSS devices together.

38 Claims, 32 Drawing Sheets

U.S. PATENT DOCUMENTS

| | | | |
|---|---|---|---|
| 7,184,666 | B1 | 2/2007 | Li et al. |
| 7,231,107 | B1* | 6/2007 | Zhong et al. ............... 385/24 |
| 7,272,321 | B1 | 9/2007 | Kuo et al. |
| 7,343,066 | B2 | 3/2008 | Doerr et al. |
| 7,469,080 | B2 | 12/2008 | Strasser et al. |
| 7,653,311 | B2 | 1/2010 | Kikuchi et al. |
| 8,116,629 | B2 | 2/2012 | Boduch et al. |
| 2002/0186432 | A1 | 12/2002 | Roorda et al. |
| 2003/0002104 | A1* | 1/2003 | Caroli et al. ............ 359/127 |
| 2003/0138252 | A1* | 7/2003 | Paiam et al. ............... 398/49 |
| 2003/0170025 | A1* | 9/2003 | Bortolini et al. ........... 398/50 |
| 2003/0223682 | A1* | 12/2003 | Kinoshita et al. .......... 385/24 |
| 2004/0042712 | A1 | 3/2004 | Cho et al. |
| 2005/0281558 | A1 | 12/2005 | Wang et al. |
| 2006/0034610 | A1 | 2/2006 | Akiyama et al. |
| 2006/0133807 | A1 | 6/2006 | Jenkins et al. |
| 2007/0237524 | A1 | 10/2007 | Gerstel et al. |
| 2008/0008474 | A1 | 1/2008 | Boduch et al. |
| 2008/0013953 | A1 | 1/2008 | Boduch et al. |
| 2008/0013954 | A1 | 1/2008 | Boduch et al. |
| 2008/0260386 | A1 | 10/2008 | Boduch et al. |
| 2009/0028501 | A1 | 1/2009 | Wagener et al. |
| 2009/0226168 | A1 | 9/2009 | Boduch |

FOREIGN PATENT DOCUMENTS

| | | | |
|---|---|---|---|
| WO | WO 2008/008277 | A2 | 1/2008 |
| WO | WO2009/111029 | A2 | 9/2009 |

OTHER PUBLICATIONS

Jajszczyk, A. and Mouftah, H.T., "An Architecture for a Photonic Fast Packed Switching Fabric," Proceedings of the Global Telecommunications Conference (Globecom), New York, IEEE, pp. 1219-1223, (Dec. 2, 1991).

Notification of Transmittal of the International Search Report and the Written Opinion of the International Searching Authority of PCT/US2009/001387, mailed Sep. 9, 2009.

Marom, D. "Modular wavelength selective cross-connects," Optical Fiber Communication Conference, 2004, vol. 2, paper ThQ1 and Slide 9 and 20, Feb. 23-27, 2004.

Strasser, T., "ROADM Technologies and Network Applications," Optical Fiber Communications Conference, 2006, Short Course Notes, SC261, Slide 55, Mar. 6, 2006.

Notification Concerning Transmittal of International Preliminary Report on Patentability and International Preliminary Report on Patentability in International Application No. PCT/US2009/001387, 6 pages, mailed Sep. 16, 2010.

International Search Report of Int'l Application No. PCT/US2007/015541, Date of Mailing: Jun. 5, 2008.

International Preliminary Report on Patentability for Int'l Application No. PCT/US2007/015541, Date of Issuance: Jan. 13, 2009.

Notification of Transmittal of the International Search Report and the Written Opinion of the International Searching Authority of PCT/US2008/059672, mailed Nov. 14, 2008.

* cited by examiner

METHODS AND APPARATUS FOR CONSTRUCTING LARGE WAVELENGTH SELECTIVE SWITCHES USING PARALLELISM

RELATED APPLICATIONS

This application claims the benefit of: U.S. Provisional Application No. 61/188,083, filed on Aug. 6, 2008; U.S. Provisional Application No. 61/072,584, filed on Apr. 1, 2008; U.S. Provisional Application No. 61/070,573, filed on Mar. 24, 2008; U.S. Provisional Application No. 61/069,947, filed on Mar. 19, 2008; U.S. Provisional Application No. 61/069,825, filed on Mar. 17, 2008; and U.S. Provisional Application No. 61/068,277, filed on Mar. 5, 2008.

The entire teachings of the above applications are incorporated herein by reference.

BACKGROUND OF THE INVENTION

A large wavelength selective switch (WSS) can be complex and costly to design and construct. Multiple smaller WSSs can be lower in cost than one equivalently sized large WSS. A known method of creating a larger WSS device from multiple smaller, WSS devices involves daisy chaining or cascading smaller WSS devices to create a larger WSS device.

For example, an 11×1 WSS can be created by cascading three 4×1 WSS devices and one 2×1 WSS device. This can be accomplished by feeding an output of the first 4×1 WSS device, an output of the second 4×1 WSS device, and an output of the 2×1 WSS device into three inputs of the third 4×1 WSS device. In such an arrangement, the 2×1 WSS device, a first 4×1 WSS device, and a second 4×1 WSS device are said to be cascaded with a third 4×1 WSS device. However, when one cascades the smaller WSS devices, not all of the inputs of each of the WSS devices are available be used as inputs to the overall 11×1 WSS, as some inputs of some smaller WSS devices are used to connect one smaller WSS device to another smaller WSS device. Furthermore, some input signals to the 11×1 WSS may traverse multiple smaller WSS devices before exiting the 11×1 WSS, resulting in increased input-to-output insertion loss for those input signals.

SUMMARY OF THE INVENTION

An apparatus and corresponding method for wavelength selective switching of optical signals at an optical node in accordance with an example embodiment of the present invention is provided. An example embodiment may perform multiple parallel non-cascaded wavelength selective switching of multiple optical signals having multiple wavelengths. Multiple optical paths associated with multiple parallel non-cascaded wavelength selective switching may be coupled to a common optical path.

Embodiments also include an apparatus and method for wavelength-selective switching comprising multiple, parallel, non-cascaded wavelength-selective switches (WSSs). In such embodiments, all the inputs of the WSSs are configured to be available to receive optical signals having multiple wavelengths and an optical coupler optically coupled to outputs of the multiple parallel non-cascaded WSSs. The optical coupler may couple multiple output optical paths associated with the multiple parallel non-cascaded WSSs to a common optical path.

Further embodiments include an apparatus and method for wavelength-selective switching comprising multiple, parallel, non-cascaded WSSs with all outputs configured to be available to output optical signals having multiple wavelengths from the WSS. An optical coupler optically coupled to inputs of the multiple, parallel, non-cascaded WSSs may couple a common optical path to multiple input optical paths associated with the multiple parallel non-cascaded WSSs.

Still further embodiments include an apparatus and method for multiplexing optical signals at an optical node with a Reconfigurable Optical Add Drop Multiplexer (ROADM). The ROADM may include inter-network node paths, add paths, drop paths, and express paths. The add and drop paths may be configured to add and drop, respectively, optical signals from tributary paths to the inter-node network paths. Similarly, the express paths may be configured to pass optical signals to the inter-node network paths. The ROADM may further include a WSS optically disposed in the express paths, where the WSS including multiple, parallel, non-cascaded sub-WSSs and an optical coupler optically coupled to the multiple, parallel, non-cascaded sub-WSSs.

Additional embodiments may include an optical network node made up of at least two multi-degree ROADMs, where each ROADM includes inter-network node paths, add paths, drop paths, express paths, and intra-network node paths. The add and drop paths may be configured to add and drop, respectively, optical signals from tributary paths to the inter-node network paths. Similarly, the express paths may be configured to pass optical signals to the inter-node network paths. The intra-network node paths may be configured to interconnect the ROADMs to enable a given ROADM to direct optical signals received at the given ROADM to any other interconnected ROADM. The ROADM may include a WSS optically disposed in the express paths, where the WSS includes multiple, parallel, non-cascaded sub-WSSs and an optical coupler optically coupled to the multiple, parallel, non-cascaded sub-WSSs.

Embodiments may also include a ROADM apparatus that includes a light distributor, light combiner, add ports, and drop ports. The light distributor may be configured to receive a first optical signal along a subtending input and to distribute the optical signal received along a plurality of subtending outputs. The light combiner may be configured to receive second optical signals along a plurality of subtending inputs, to combine the second optical signals received into a combined signal, and to output the combined signal. The add ports may be split into a first set configured to add signals only and a second set that can be configured to add signals or to transmit signals to another ROADM. Likewise, the drop ports may be split into a first set configured to drop signals only and a second set that can be configured to drop signals or to transmit signals to another ROADM.

A corresponding method of processing optical signals with a first ROADM includes enabling a first add port to receive an optical signal from a second ROADM with less insertion loss than receiving the same optical signal through a second add port. The corresponding method also includes transmitting an optical signal through a first drop port to the second ROADM with less insertion loss than transmitting the same optical signal through a second drop port. The method may be used in an optical system that includes a first ROADM that has a plurality of add and drop ports and a second ROADM optically coupled to the first ROADM through an add port and a drop port of the first ROADM.

Yet further embodiments include an optical input block in a ROADM. Example optical input blocks include an input signal port configured to receive an optical input signal with plural wavelengths. The example optical input blocks further include at least one dedicated express output port configured to transport multiple wavelengths to another ROADM, at least one dedicated drop port configured to transport a single wavelength to an optical transponder device, and at least one express drop port configured to operate as an express port or a drop port. In addition, example optical input blocks include at least two wavelength filtering devices that are configured to direct the wavelengths to the dedicated express port, the dedicated drop port, and the express drop port.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Unless otherwise noted, all optical amplifiers may have gain that is fixed, variable, adjustable, programmable, or any combination thereof. Optical attenuators, including variable optical attenuators (VOAs), may optionally be placed in front of the fixed gain amplifier. Optical amplifiers may be erbium-doped fiber amplifiers, solid-state optical amplifiers, or any other suitable optical amplifiers. Optical characteristics, including gain, saturated output power, and noise figure, may depend on system requirements including, but not limited to, propagation loss, insertion loss, maximum optical power, minimum optical power, and system cost.

Similarly, unless otherwise noted, VOAs may be individual discrete VOAs, arrays of VOAs residing on a single silicon die (or other suitable substrate material), or any other suitable attenuator(s). Likewise, tunable filters may be individual discrete tunable filters, or they may be a tunable filter array implemented on a common substrate (such as silicon, or other suitable substrate).

Unless otherwise noted, connection between optical interfaces may be achieved using connectors, such as MT-RJ, FC-PC, FC-APC, SMA, SMC, or any other suitable type of optical fiber connector. Alternatively, interfaces may coupled by splicing the ends of a pair of optical fibers. In addition, splices and connectors may be disposed along any connection between components.

Other connections may be formed using planar lightwave circuits (PLCs). PLCs may also be used to form optical couplers. In other embodiments, optical couplers may be formed of fused optical fibers; couplers with more legs may be formed by coupled multiple smaller couplers in cascaded or parallel fashion.

Reconfigurable Optical Add/Drop Modules, Optical Nodes, and Optical Networks

Figure 1:
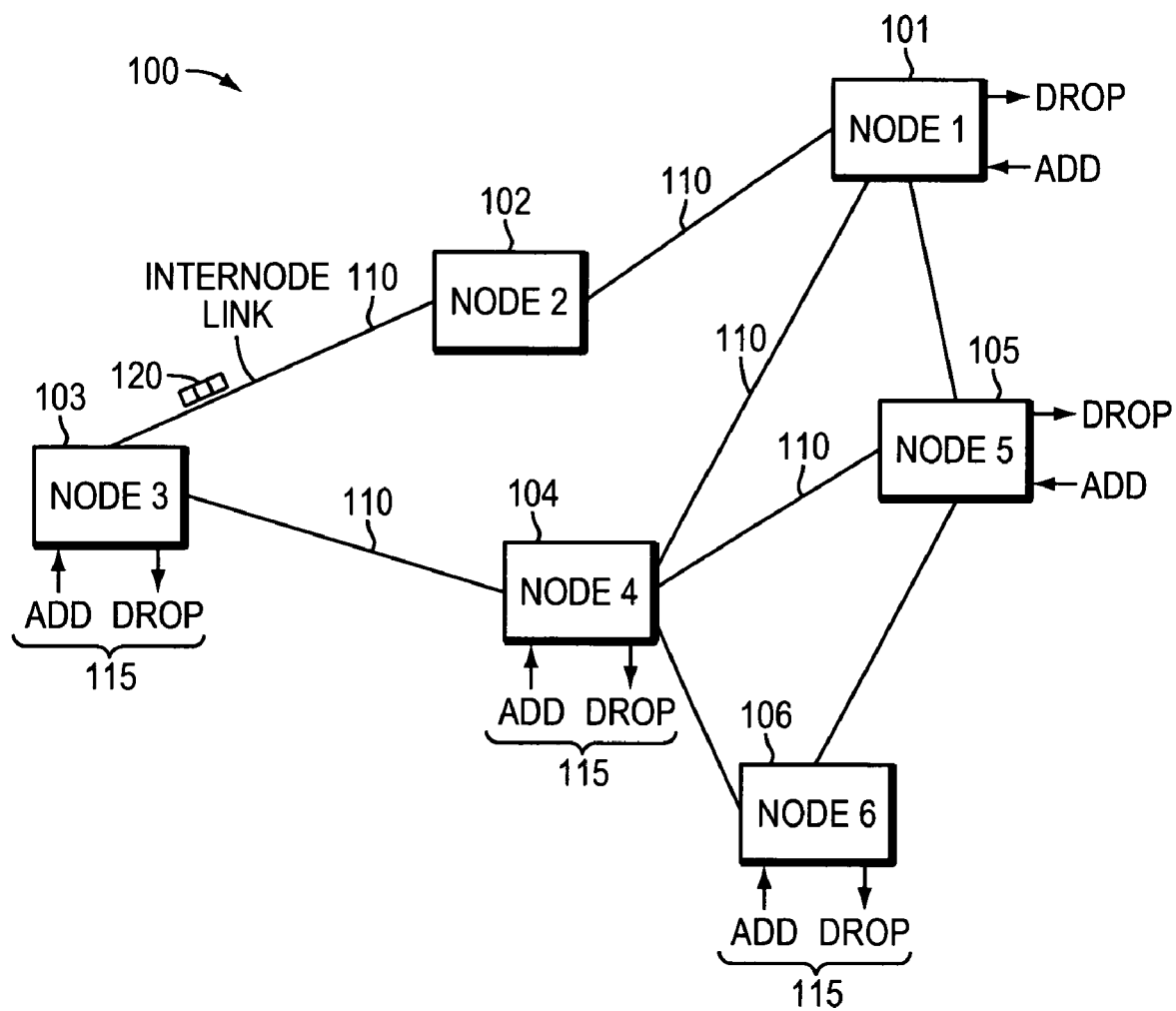
FIG. 1 is a network diagram illustrating multiple optical nodes arranged in a mesh network configuration in which embodiments of the present invention may be employed.

FIG. 1 is a network diagram illustrating an optical network 100 arranged in a mesh configuration in which example embodiments of the present invention may be employed. In this configuration, multiple optical nodes 101-106 are coupled to one or more other optical nodes 101-106 via one or more internode links or paths 110. Mesh network topologies can provide additional reliability and flexibility as compared with other network topologies, such as ring networks, in that if one node and/or internode link is unable to operate, the remaining nodes can still communicate with each other, either directly or through one or more intermediate nodes 101-106.

The optical nodes 101-106 are configured to transmit respective optical signals 120 in a suitable format, such as wavelength division multiplexed (WDM) signals 120, via the internode network paths 110 to one or more destination nodes. The internode links 110 may be fashioned from a suitable communications media such as one or more optical fibers suitable for an intended network design.

The optical nodes 101-106 may include at least one add/drop filter (not shown) in communication with add and drop paths 115. The add/drop paths 115 may be used to add optical signals to an internode link 110 or drop an optical signal from an internode link 110 to or from, for example, tributary network paths (not shown).

Although FIG. 1 illustrates a mesh network configuration, it should be appreciated by those skilled in the art that alternative network topologies (e.g., ring network, star network, etc.) may be employed in accordance with example embodiments of the present invention. The illustrated mesh network is presented by way of example, and the present invention should not be construed as being limited thereto.

Figure 2:
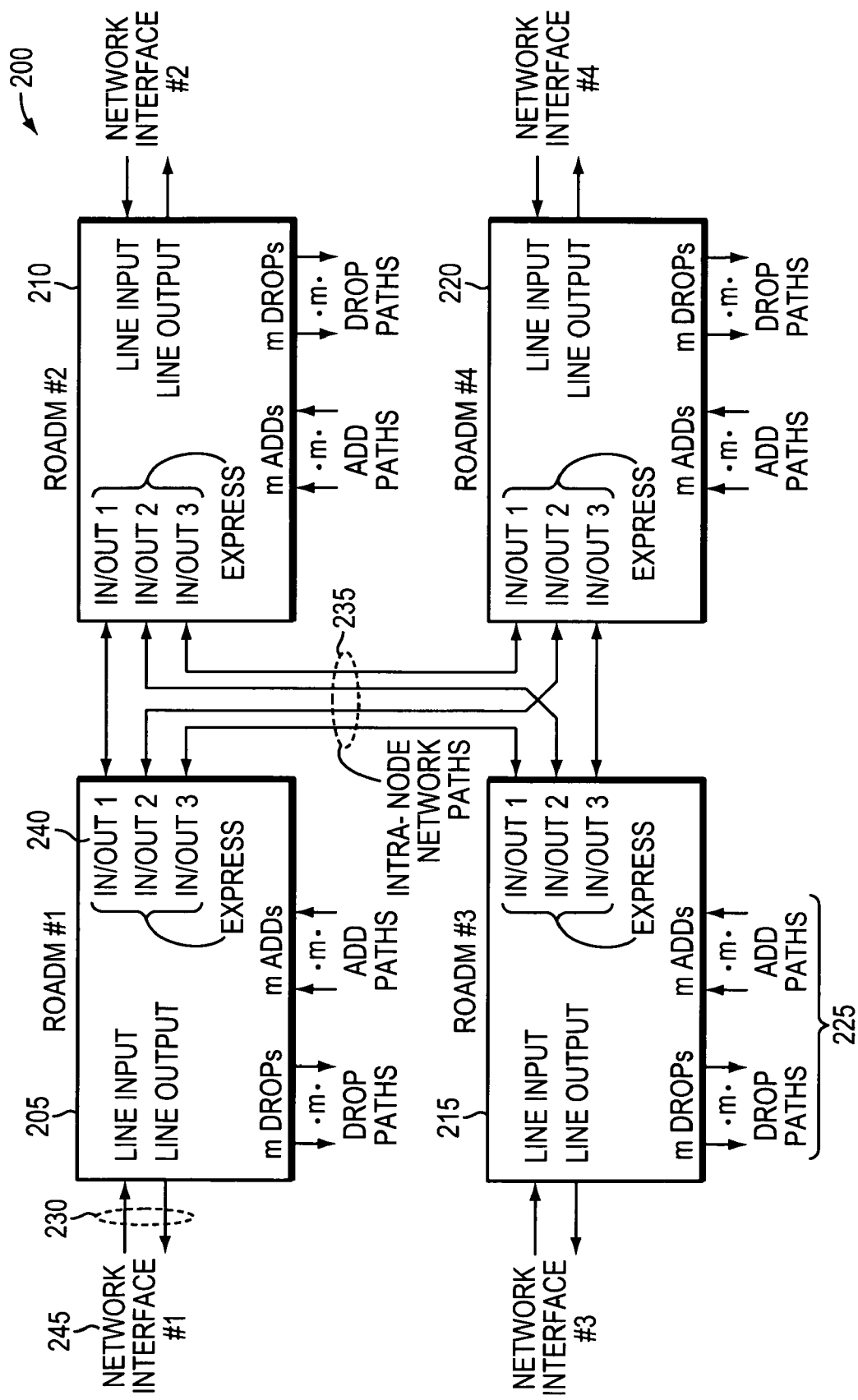
FIG. 2 is a block diagram illustrating an optical node in which four reconfigurable optical add/drop modules (ROADMs) are configured to operate as a four degree optical network node.

FIG. 2 illustrates an optical node 200 in additional detail according to an example embodiment of the present invention. The optical node 200 may include four reconfigurable optical add/drop modules (ROADMs, also referred to as "ROADM configurations") 205, 210, 215, 220 configured to form a four-degree dense wavelength division multiplexing (DWDM) optical node 200. Each individual ROADM 205, 210, 215, 220 may include three express in/out ports 240 that are coupled to every other individual ROADM device's corresponding express in/out ports 240 via intranode paths 235. Each ROADM may further include a network interface 245 having line input and line output ports configured to direct optical signals to and from other external optical network nodes via inter-node network paths 230. Optical signal components may be added to or dropped from an inter-node network path via add/drop ports via associated add/drop paths 225. Configured in this manner, the optical node 200 is capable of supporting four-degrees of operation. Thus, the optical node 200 can forward any wavelength received via the line input of a given network interface 245 to any line output of any other given network interface 245 by properly configuring the wavelength selective switch (WSS) devices within the ROADMs 205, 210, 215, 220.

Figure 3:
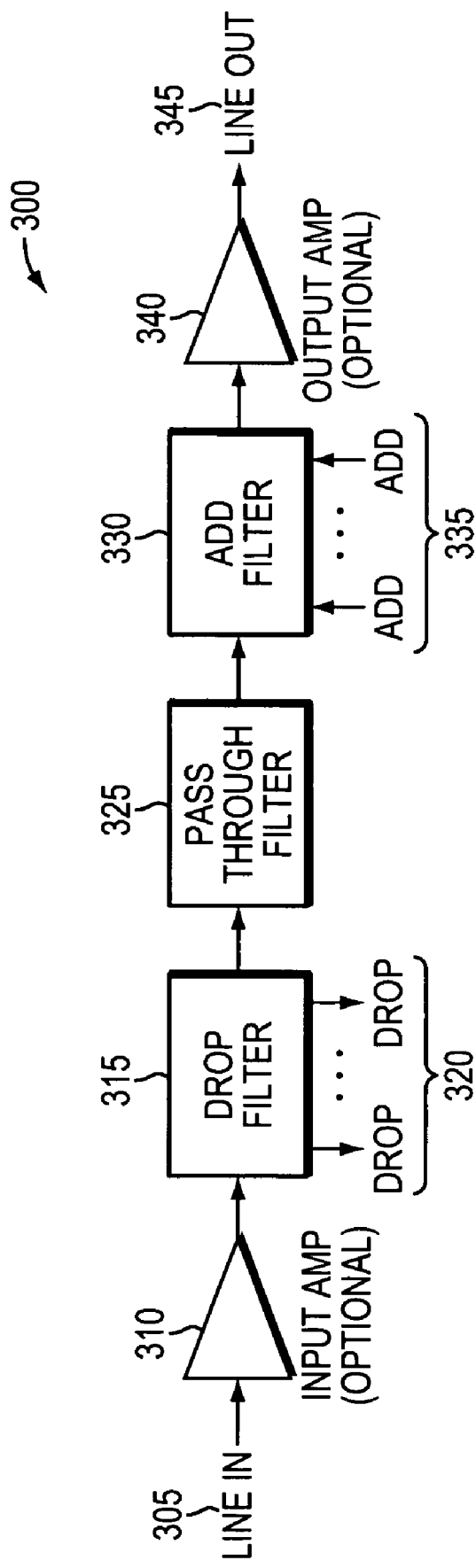
FIG. 3 is a block diagram illustrating portions of a ROADM in further detail illustrating example embodiments of the present invention.

FIG. 3 is a block diagram illustrating ROADM components 300 in the path through a two-degree ROADM node according to various example embodiments of the present invention. The ROADM components 300 may include, but are not limited to: a line-in path 305; optional input optical amplifier 310; drop filter 315; pass-through filter 325; add filter 330; output optical amplifier 340; and line-out path 345. The drop filter 315 may further include one or more drop paths 320, and the add filter 330 may include one or more add paths 335. Although FIG. 3 shows input and output optical amplifiers 310 and 340, respectively, embodiments may use a different number of amplifiers depending upon system requirements, such as power losses and the overall length of the optical connections between nodes.

Multi-wavelength optical signals arrive at the ROADM components 300 via the line in path 305 which may include a line in port or similar input mechanism. The optical signals may be amplified by the input optical amplifier 310 to, for example, compensate for losses associated with the length of internode fiber links or other such components. The optical signals are then directed to the drop filter 315 where signal wavelengths to be dropped are filtered and are directed to one or more drop paths 320 and on to, for example, tributary paths (not shown).

Optical signals that are not dropped by the drop filter 315 are directed to the pass-through filter 325 via pass-through channels and then on to the add filter 330. The add filter 330 may be used to add signals received from, for example, tributary paths (not shown) via add paths 335. The add signals are combined at the add filter 335 to produce a composite signal. The composite signal may be amplified by the output amplifier 340 to compensate for insertion losses or other losses. The (amplified) composite signals are then directed to one or more other network nodes via line out 345.

Parallelism for Large WSSs

In an example embodiment of the invention, a method and corresponding apparatus for constructing WSSs with many channels (i.e., large WSSs) using parallelism is disclosed. The WSS may include multiple parallel non-cascaded WSSs and an optical coupler optically coupled to the multiple parallel non-cascaded WSSs. The optical coupler may include cascaded optical couplers. The WSS may further include a first WSS that includes at least one expansion path being an output from the optical coupler and a second WSS. An optical amplifier may be disposed between the optical coupler in the second WSS. Alternatively, the WSS may further include multiple optical couplers where each coupler is coupled to multiple non-cascaded WSSs and a combining WSS coupled to the multiple optical couplers.

In another example embodiment, the WSS may be in the form of a N×1 WSS. That is, the WSS may include multiple parallel non-cascaded WSSs having all inputs configured to be available to receive optical signals having multiple wavelengths at the WSS, and an optical coupler optically coupled to outputs of the multiple parallel non-cascaded WSSs. The optical coupler may include cascaded optical couplers. The WSS may further include an expansion port being an input to the optical coupler, and a second WSS whose output is connected to the expansion port. An optical amplifier may be disposed between the expansion port and the second WSS. The WSS may further include multiple optical couplers each coupled to multiple non-cascaded WSSs and a combining WSS coupled to the multiple optical couplers.

In yet another example embodiment, the WSS may be in the form of an 1×N WSS (i.e., the inverse of the previous example embodiment). The WSS may include multiple parallel non-cascaded WSSs having all outputs configured to be available to output optical signals having multiple wavelengths from the WSS, and an optical coupler optically coupled to inputs of the multiple parallel non-cascaded WSSs. The optical coupler may include cascaded optical couplers. The WSS may be a first WSS including an expansion path being an output from the optical coupler, and a second WSS whose input is coupled to the expansion path. An optical amplifier may be disposed between the expansion path and the second WSS. The WSS may further include multiple optical couplers each coupled to multiple non-cascaded WSSs and a combining WSS coupled to the multiple optical couplers.

Alternative example embodiments may include a ROADM that may include: inter-network node paths; add paths configured to add optical signals from tributary paths to the inter-node network paths; drop paths configured to drop optical signals from the inter-node network paths to tributary paths; express paths configured to pass optical signals to the inter-node network paths and a WSS optically disposed in the express paths, where the WSS may include multiple parallel non-cascaded WSSs and an optical coupler optically coupled to the multiple parallel non-cascaded WSSs.

An insertion loss for the express paths may be lower than an insertion loss of the add paths or drop paths. The drop paths may include drop paths and express paths, where the express paths are outputs from the WSS and the drop paths are not. A subset of the drop paths may be coupled to an output of a sub-WSS and selectively configured to be drop paths or express paths. An optical amplifier may be disposed along a drop path where the drop path includes a first path having dedicated drop paths and a second drop path having paths that can operate as both dedicated drop paths and express paths. The drop path may include a tunable filter array. Alternatively, or in addition, an optical amplifier may be disposed along an add path. The amplifier may be coupled to the output of the WSS via at least one optical coupler or coupled to an input of a sub-WSS. The add path may also include an optical coupler.

Still other example embodiments may include an optical network node including at least two multi degree ROADMs, where each ROADM includes: inter-network node paths; add paths configured to add optical signals from tributary paths to the internode network paths, drop paths configured to drop optical signals from the internode network paths to tributary paths, express paths configured to pass optical signals to the internode network paths, and a WSS optically disposed in the express paths, where the WSS may include multiple parallel non-cascaded WSSs and an optical coupler optically coupled to the multiple parallel non-cascaded WSSs. Intra-network node paths may be configured to interconnect the at least two ROADMs to enable a given ROADM to direct optical signals received at the given ROADM to any other interconnected ROADM.

FIGS. 4-12 and 14-22 each show 1×N or N×1 WSS devices formed of smaller WSS devices combined in parallel. Although each figure shows a specific number of WSS devices, other embodiments can be built with any number of WSS devices combined in parallel. Also, each of the individual WSS devices can contain an k×1 WSS device where k is an integer greater than zero. When the total number of inputs to the larger WSS (formed by multiple smaller WSS devices) is increased or decreased, the number of express inputs and express outputs is increased or decreased accordingly.

Constructing Larger N×1 WSS Devices

Figure 4:
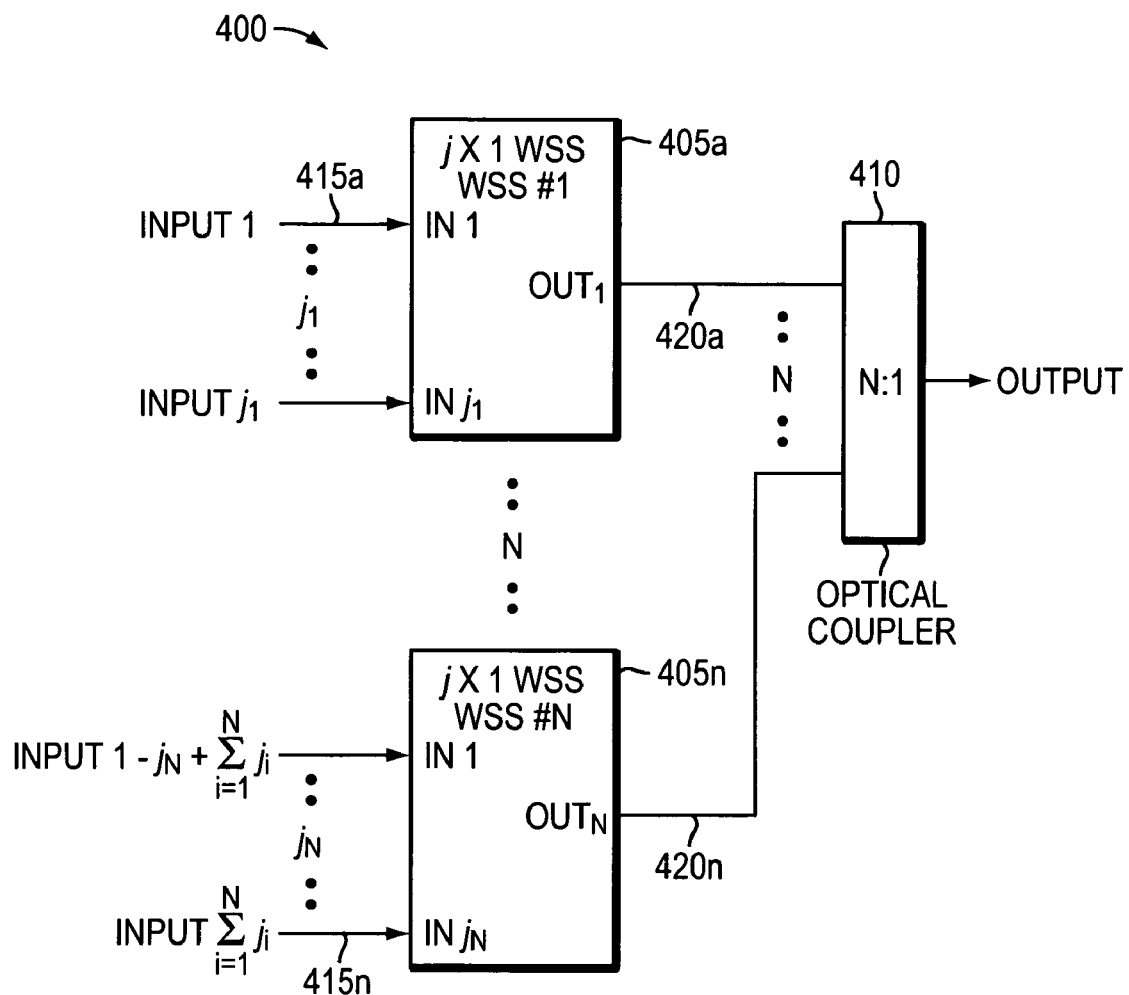
FIG. 4 is a general block diagram of a larger wavelength selective switch (WSS) device created from multiple smaller j×1 WSS devices and an optical coupler using parallelism in accordance with example embodiments of the present invention.

FIG. 4 illustrates a general configuration used to create an N×1 WSS device 400 from multiple smaller WSS devices 405*a-n* using parallelism according to an example embodiment of the present invention. In FIG. 4, outputs from N smaller WSS devices 405*a-n* are coupled to inputs of an N-to-1 coupler 410 to create a single, larger WSS 400. Each of the smaller WSS devices 405*a-n* may have any number of inputs j 415*a-n*. For example, $j_1$ does not have to equal $j_N$, but $j_1$ may equal $j_N$. The total number of inputs 415*a-n* for the larger overall WSS device 400 is equal to the sum of the inputs 415*a-n* of each of the smaller WSS devices 405*a-n*

$$\left(\text{or } \sum_{i=1}^{N} j_i\right).$$

Figure 5:
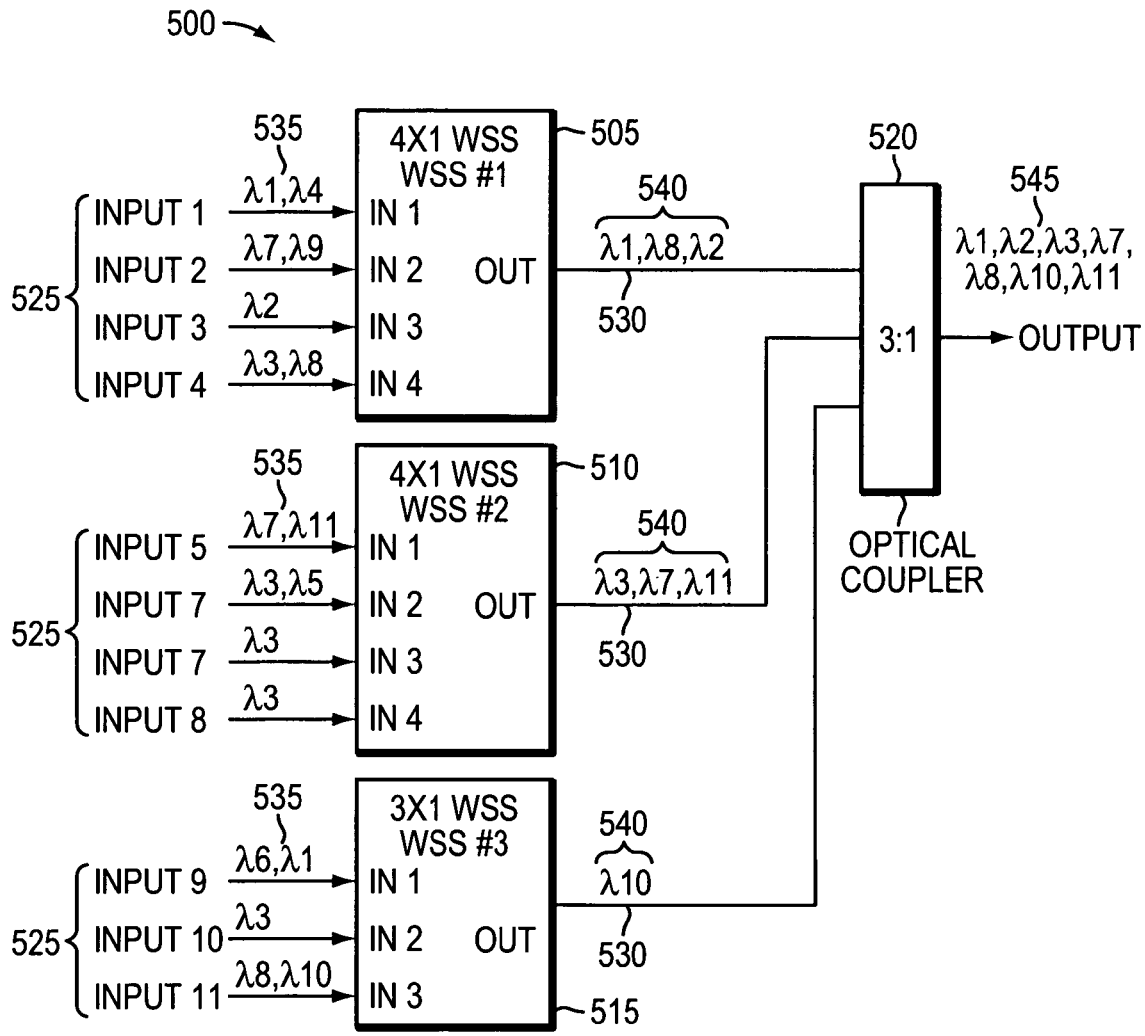
FIG. 5 is a block diagram depicting an 11×1 WSS device created from two 4×1 devices and one 3×1 WSS device illustrating wavelength components within various segments of the 11×1 WSS device according to an example embodiment of the present invention.

FIG. 5 is a block diagram illustrating the components associated with a number of smaller WSS devices 505, 510, and 515 coupled in parallel to form a larger, more efficient WSS device 500 according to an example embodiment of the present invention. The block diagram shows three smaller WSS devices: two 4×1 WSS devices 505 and 510, and one 3×1 WSS device 515. In addition, one 3-to-1 optical coupler 520 whose inputs are coupled to the outputs of each of the three smaller N×1 WSS devices 505, 510, and 515. The entire structure forms an 11×1 WSS 500 device. In contrast with cascaded WSSs, where cascading prevents the use of all the inputs, parallelism allows each input of each smaller WSS device 505, 510, and 515 to be used as an input to the overall 11×1 WSS device, creating a larger, more efficient, less expensive N×1 WSS device.

In operation, a given individual smaller WSS device 505, 510, 515 is used to select and forward wavelengths 535 from its individual inputs 525 to corresponding outputs 530. The wavelengths 540 from each of the smaller WSS devices 505, 510, and 515 are then forwarded to a 3-to-1 optical coupler 520, and, in turn, further forwarded to the overall output 545 of the larger 11×1 structure 500. For example, in 11×1 WSS 500, each 4×1 WSS device 505, 510 and the 3×1 WSS device 515 may be configured (e.g., programmed) to select individual wavelengths 535 from corresponding inputs 525 and direct the selected wavelengths 540 to corresponding outputs 530. The optical coupler 520 passively combines the wavelengths 540 at each of the smaller WSS outputs 530 into one composite output 545.

Advantageously, systems implementing example embodiments of the present invention will require smaller WSS components or a smaller number of WSS components. They may also attenuate optical signals less than known techniques. For example, a 4×1 WSS can be created by cascading three 2×1 WSS devices, or by feeding an optical coupler with two parallel 2×1 WSS devices. In the cascaded approach, the outputs of the first and second 2×1 WSS devices feed the inputs of the third 2×1 WSS device to create the overall 4×1 WSS device. In the parallel WSS approach, the outputs of a first and second 2×1 WSS device feed the two inputs of a 2-to-1 optical coupler to create the overall 4×1 WSS device. Assuming insertion losses of 6 dB and 3.4 dB for the 2×1 WS and 2-to-1 optical coupler, respectively, the insertion loss of the 4×1 WSS created using the cascaded approach is 12 dB, while the insertion loss of the 4×1 WSS created using the parallel WSS approach is only 9.4 dB.

Figure 6A:
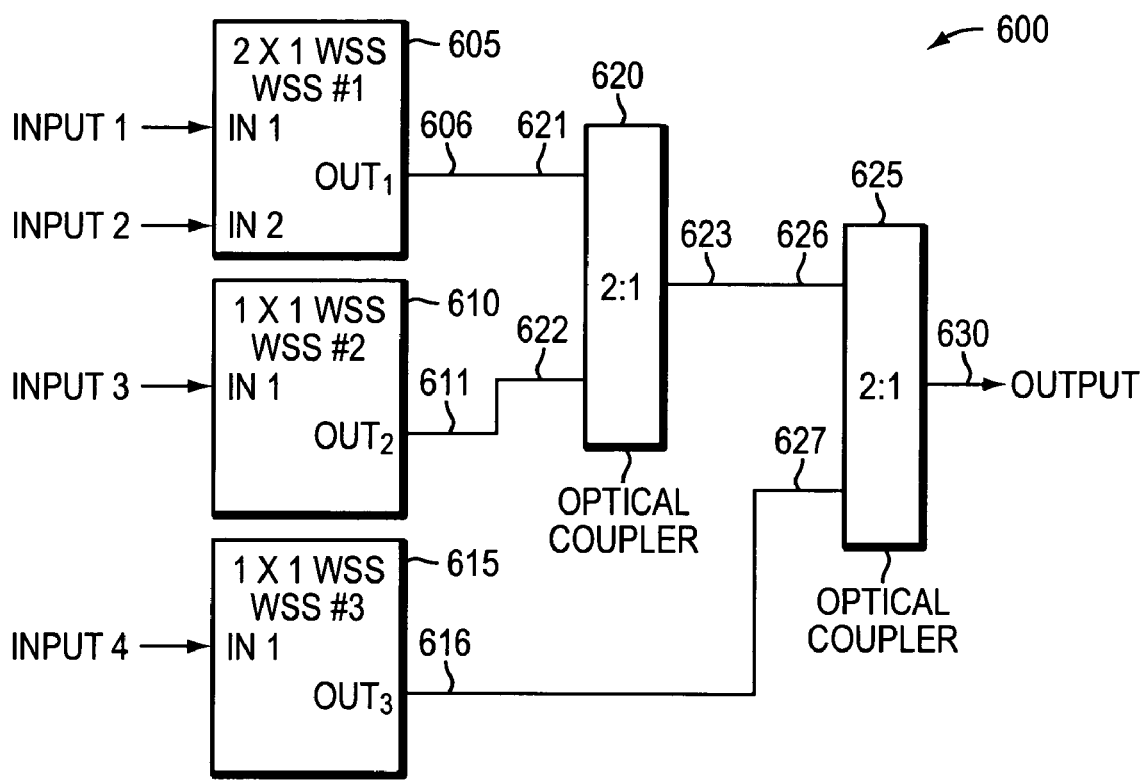
FIG. 6A is a block diagram depicting a 4×1 WSS device created from two 1×1 devices and one 2×1 WSS device coupled to cascaded optical couplers illustrating an example embodiments of the present invention.

FIG. 6A illustrates such an example where the coupling function is implemented using cascaded optical couplers. In this example embodiment, two 2-to-1 optical couplers 620, 625 are cascaded or daisy chained together to create a 3-to-1 optical coupler. A 2×1 WSS device 605 and two 1×1 WSS devices 610, 615 are configured to create a larger 4×1 WSS device 600. Outputs 606, 611 of the first and second WSS devices 605, 610, respectively, are coupled to a first input 621 and a second input 622, respectively, of a first optical coupler 620. The first optical coupler 620 passively combines optical signals received at its inputs 621, 622 into a composite signal that is further directed the output 623 to an input 626 of a second optical coupler 625. An output 616 of the third WSS 615 is coupled to a second input 627 of the second optical coupler 625. The second optical coupler 625 passively combines optical signals received at its inputs 626, 627 into one composite output signal that is directed to an output 630 of the larger 4×1 WSS device 400.

Figure 6B:
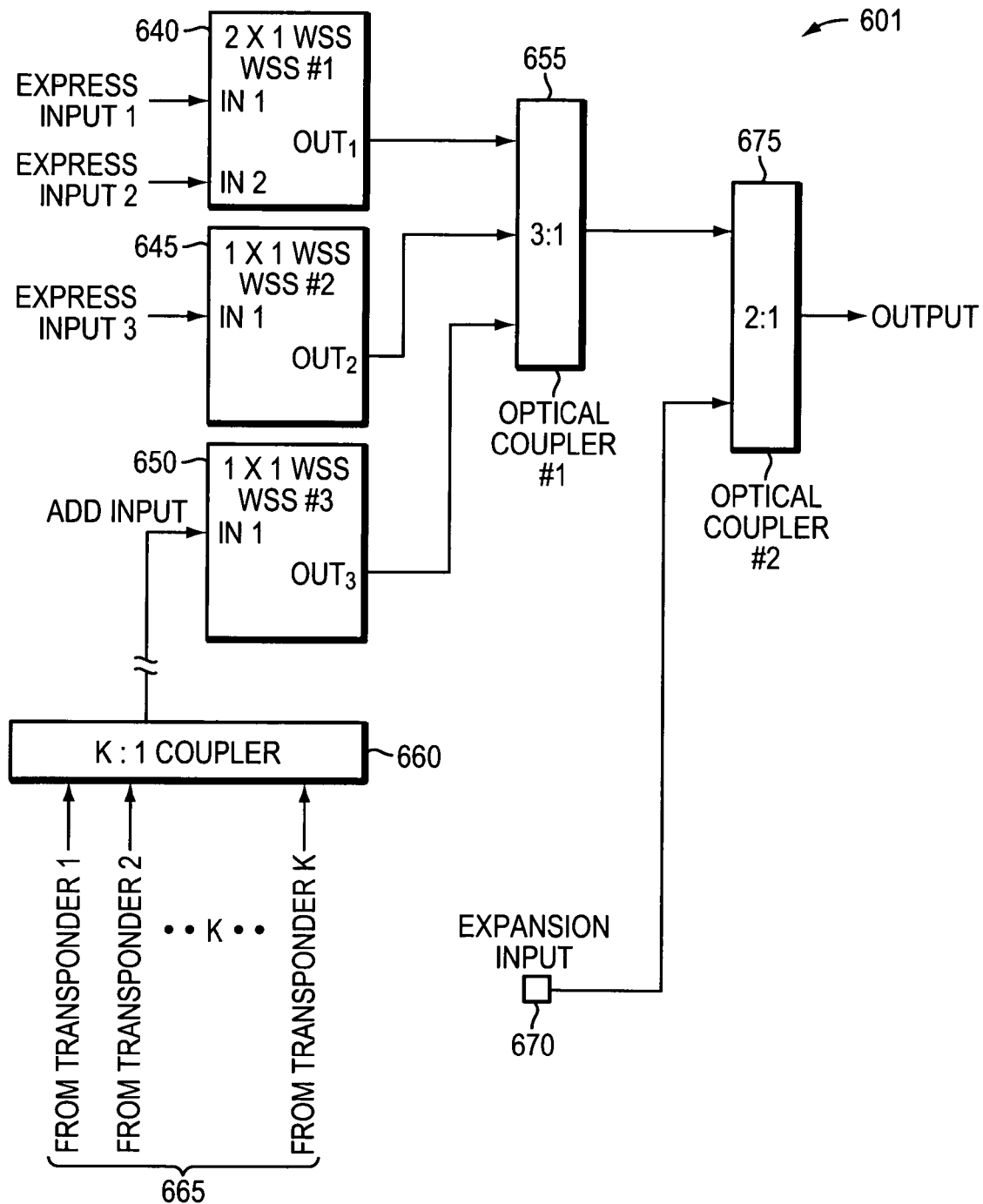
FIG. 6B is a block diagram depicting add functionality provided to a 4×1 WSS device created from two 1×1 devices and one 2×1 WSS device according to an example embodiments of the present invention.

FIG. 6B depicts the "add portion" of a ROADM containing a 4×1 WSS 601 created with a 2×1 WSS device 640, two 1×1 WSS devices 645, 650, and an optical coupler 655 (optical coupler #1). Express input paths are attached to three of the four inputs of the 4×1 WSS 601, and a K:1 coupler 660 is attached to the fourth input of the 4×1 WSS 601. The K:1 coupler 660 is used to combine the outputs 665 from K optical transponders.

Additionally, the add portion of the ROADM of FIG. 6B may contain an expansion input port 670. The "add" optical circuitry shown in FIG. 6B (along with appropriate "drop" circuitry) may be placed on a single first pluggable circuit pack. The expansion input port 670 in combination with optical coupler #2 675 provides the ability to expand the 4×1 WSS 601 to a larger N×1 WSS, where N is greater than 4. This can be achieved by coupling a second circuit pack to the first circuit pack via an optical jumper.

Figure 6C:
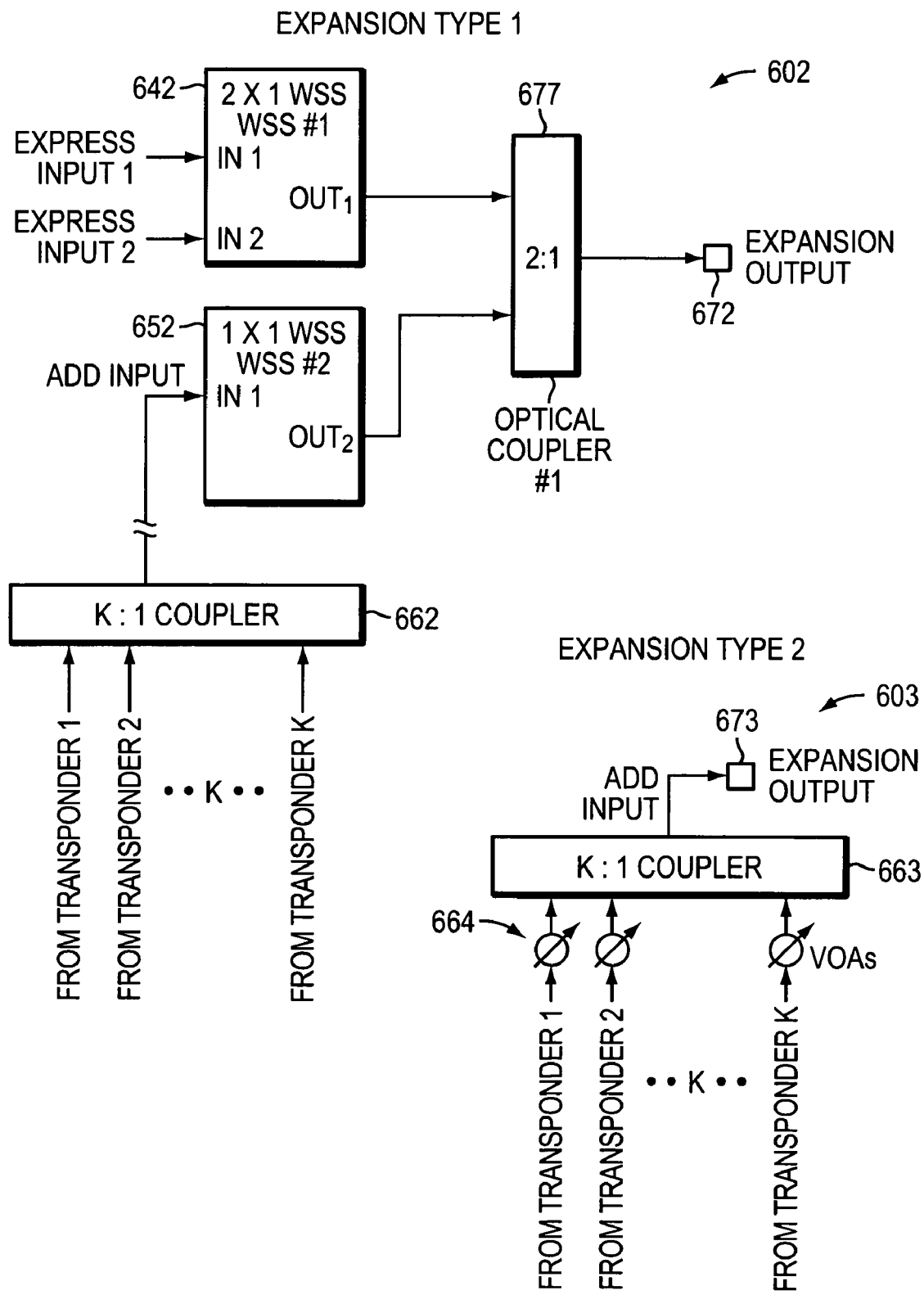
FIG. 6C is a block diagram illustrating two types of expansion circuits for use with the expansion input depicted in FIG. 6B according to example embodiments of the present invention.

FIG. 6C shows an example embodiment of a "second circuit pack," or "Expansion Type 1" circuit pack 602. The Expansion Type 1 circuit pack 602 includes a 3×1 WSS created with a 2×1 WSS device 642, a 1×1 WSS device 652, and an optical coupler 662 (Optical coupler #1). Express input ports are attached to two of the three inputs to the 3×1 WSS, and a K:1 coupler 662 is attached to the third input of the 3×1 WSS. The K:1 coupler 662 combines the outputs from K optical transponders (not shown). When an Expansion Output port 672 of the Expansion Type 1 circuit pack 602 of FIG. 6C is attached to the Expansion Input port 670 of the ROADM circuit pack of FIG. 6B, an overall 7×1 WSS device is formed from the combination of the 4×1 WSS of circuit pack of FIG. 6B and the 3×1 WSS of the Expansion Type 1 circuit pack 601 of FIG. 6C.

Although the ROADM of FIG. 6B contains a 4×1 WSS made up of multiple smaller WSS devices, the ROADM may be constructed with any number of smaller WSS devices, and each of the smaller WSS devices may have any number of inputs. Also, although the Expansion Type 1 circuit pack of FIG. 6C contains a 3×1 WSS made up of two smaller WSS devices, the WSS on the expansion circuit pack may be constructed with any number of smaller WSS devices, and each of the smaller WSS devices may have any number of inputs.

FIG. 6C also shows a block diagram a second type of expansion circuit pack (Expansion Type 2) 603 that can be attached to the ROADM of FIG. 6B. In this example, transponders may be added by coupling the transponders to VOAs 664. The output of the VOAs 664 can be directed to a K:1 optical coupler 663. The optical coupler's output may then be directed to an expansion output port 673. Consequently, this type of circuit pack does not expand the WSS of the ROADM module, but it does provide additional add ports to the ROADM for providing additional transponders.

Figure 7:
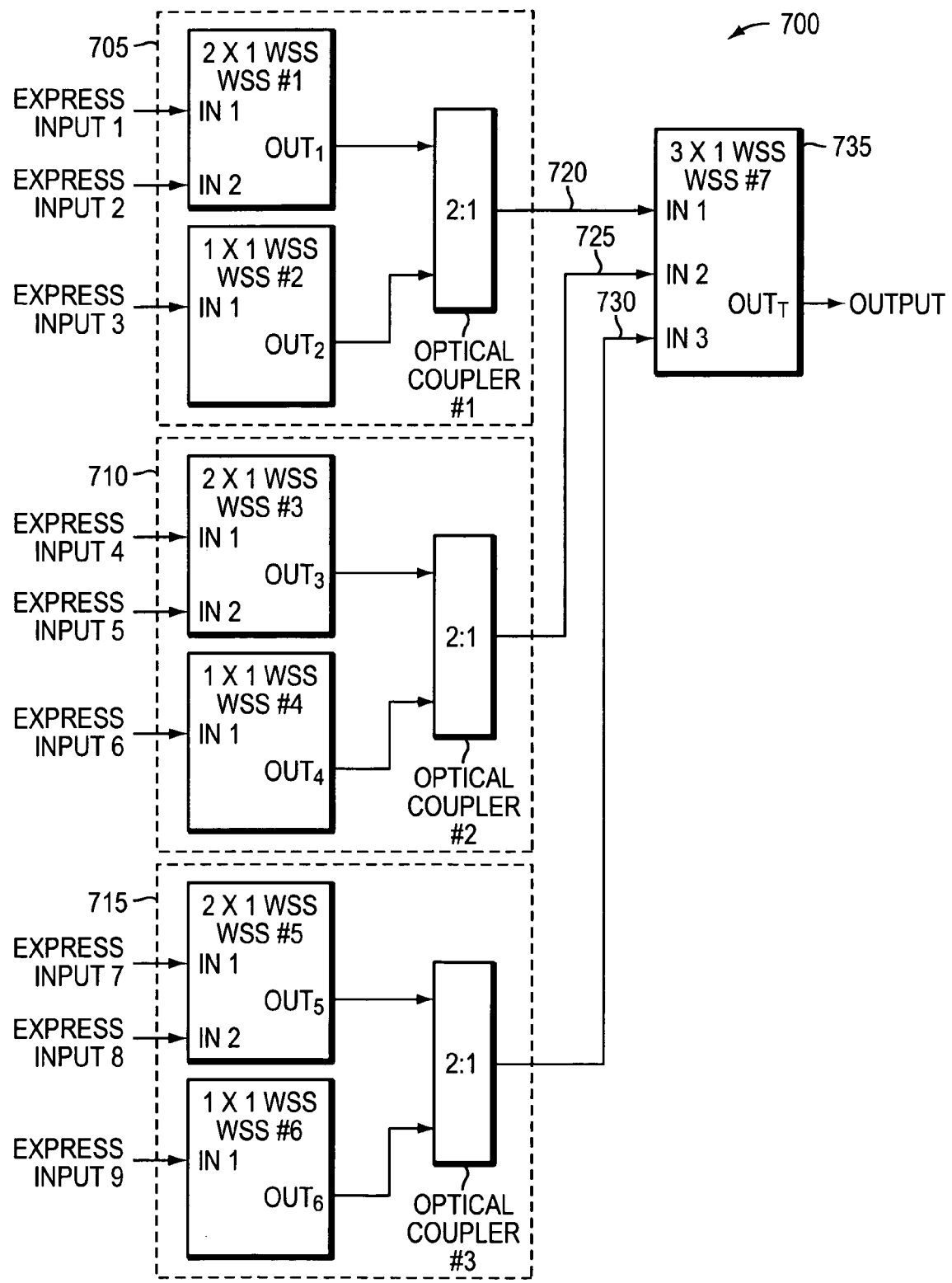
FIG. 7 is a block diagram depicting a multistage 9×1 WSS device created from three 3×1 sub-WSS devices further coupled to a 3×1 WSS device in accordance with an example embodiments of the present invention.

FIG. 7 illustrates an alternative example embodiment where multiple smaller WSSs are arranged in a parallel, multistage configuration to construct a larger WSS device. In this example embodiment, parallelism is employed to create three separate 3×1 WSS devices 705, 710, 715 by arranging a 2×1 WSS device, 1×1 WSS device, and optical coupler in a manner similar to that as described above. However, in this example, outputs 720, 725, 730 of each of the 3×1 WSS devices 705, 710, 715, respectively, are further coupled to corresponding inputs of a fourth WSS device 735. The resulting arrangement can operate as a 9×1 WSS device 700. The fourth WSS device 735 may or may not be constructed using parallelism. Similar arrangements using a different number of N1 WSSs and/or number of stages may be configured such that smaller WSSs are arranged to create a larger WSS.

Constructing Larger 1×N WSS Devices

Figure 8:
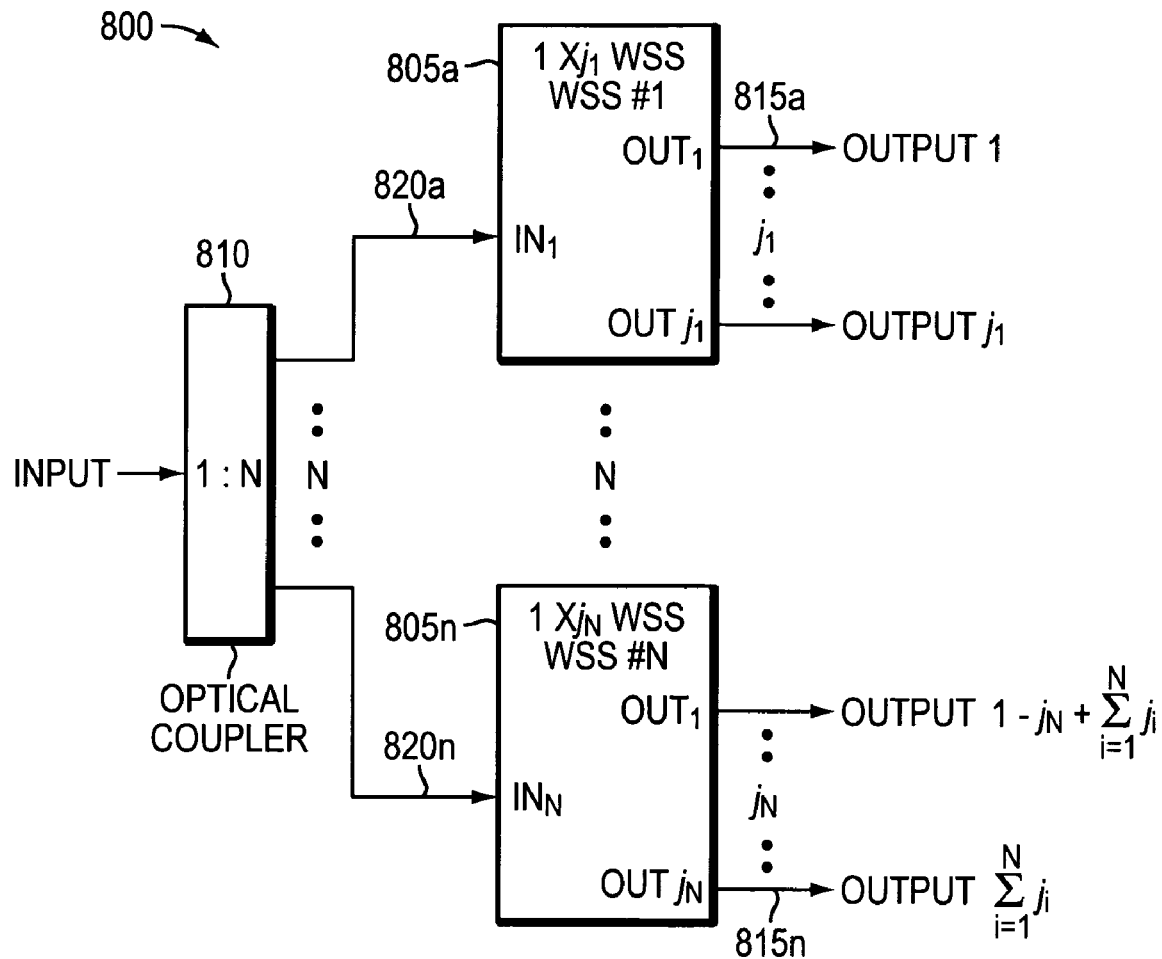
FIG. 8 is a general block diagram of a larger WSS device created by coupling outputs of an optical coupler to the inputs of multiple smaller 1×j WSS devices using parallelism in accordance with example embodiments of the present invention.

FIG. 8 illustrates a general configuration used to create a large 1×N WSS device 800 from multiple smaller WSS devices 805a-n using parallelism according to example embodiments of the present invention. In FIG. 8, outputs an N-to-1 optical coupler 810 are coupled to inputs of N smaller WSS devices 805a-n to create a single larger WSS device 800. Each of the smaller WSS devices 805a-n may have any number of outputs j 815a-n. Therefore, for example, $j_1$ does not have to equal $j_N$, but $j_1$ may equal $j_N$. The total number of outputs 815a-n for the larger overall WSS 800 is equal to the sum of the outputs 815a-n of each of the smaller WSS devices 805a-n $$\left(\text{or } \sum_{i=1}^{N} j_i\right).$$

The FIG. 8 configuration is the inverse of the N×1 configuration illustrated in FIG. 4.

Figure 9:
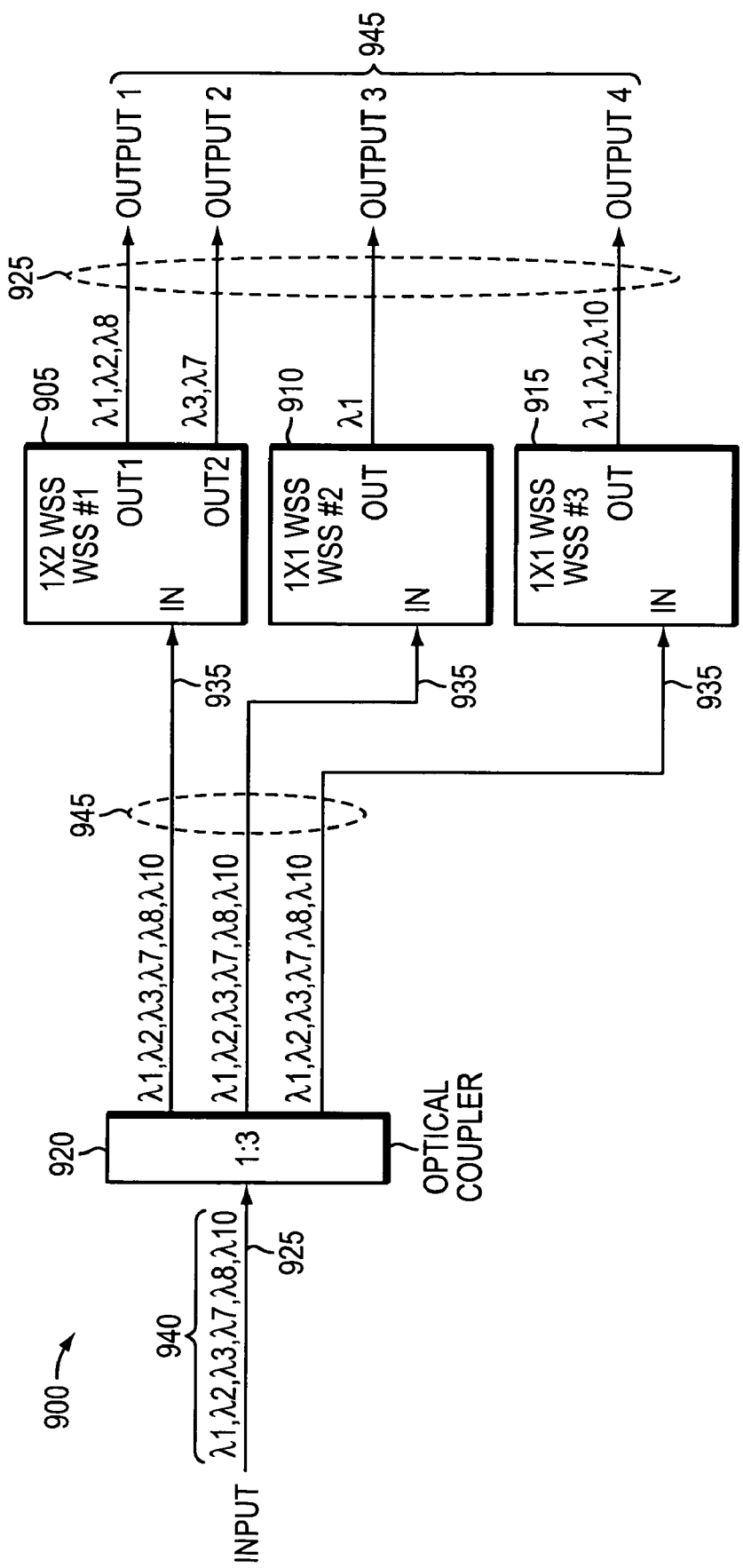
FIG. 9 is a block diagram depicting a 1×4 WSS device created from two 1×1 WSS devices and one 1×2 WSS device illustrating wavelength components within various segments of the 1×4 WSS device according to an example embodiments of the present invention.

FIG. 9 is a block diagram illustrating components associated with multiple smaller WSS devices 905, 910, and 915 employing parallelism to create a larger, more efficient WSS device 900 according to an example embodiment of the present invention. As can be seen, the configuration illustrated in FIG. 9 is similar to the inverse of FIG. 5. FIG. 9 includes three parallel WSS devices: one 1×2 WSS device 905 and two 1×1 WSS devices 910, 915. In addition, a 1-to-3 optical coupler 920 is provided such that the optical coupler's outputs 945 are coupled to corresponding inputs 935 of each of the parallel WSS devices 905, 910, and 915. The resulting configuration forms a 1×4 WSS device 900. As described above, operating WSSs in parallel instead of cascading them makes it possible to use every WSS input, creating a more efficient, less complex, less expensive WSS.

In operation, the WSS devices 905, 910, and 915 can be configured to pass wavelengths 940 from an input 925 of the overall 1×4 WSS device 900 to appropriate outputs 945 of the overall 1×4 WSS 900 device. In FIG. 9, wavelengths $\lambda_1$, $\lambda_2$, $\lambda_3$, $\lambda_7$, $\lambda_8$, and $\lambda_{10}$ 940 are applied to the input 925 of the 1:3 optical coupler 920. The optical coupler 920 broadcasts each of the six wavelengths 940 to three smaller WSS devices 905, 910, and 915. WSS #1 905 is then configured to pass wavelengths $\lambda_1$, $\lambda_2$, and $\lambda_8$ to output 1, and wavelengths $\lambda_3$, and $\lambda_7$ to output 2. WSS #2 910 is configured to pass wavelength $\lambda_1$ to output 3. WSS #3 915 is configured to pass wavelengths $\lambda_1$, $\lambda_2$, and $\lambda_{10}$ to output 4. The FIG. 9 configuration also illustrates how a given wavelength can be broadcasted to multiple outputs 945 of the overall 1×4 WSS 900. In contrast with known techniques, this broadcast capability is advantageously achieved by employing a larger WSS device 900 using multiple smaller WSS devices 905, 910, and 915 connected in parallel as described herein.

A further advantage of systems implementing example embodiments of the present invention is that such embodiments attenuate optical signals less than other techniques. For example, assuming the 1:3 optical coupler 920 shown in FIG. 9 has an insertion loss of 6 dB and that the individual smaller WSS devices 905, 910, and 915 each have an insertion loss of 6 dB, then the signal 940 applied to the input 925 of the resulting 1×4 WSS device 900 will experience an optical signal loss of only 12 dB. In contrast, signals travelling through cascaded WSS devices experience much higher signal losses because of the many extra stages required to achieve the same switching degree.

ROADMs Using N×1 WSS Devices

Figure 10:
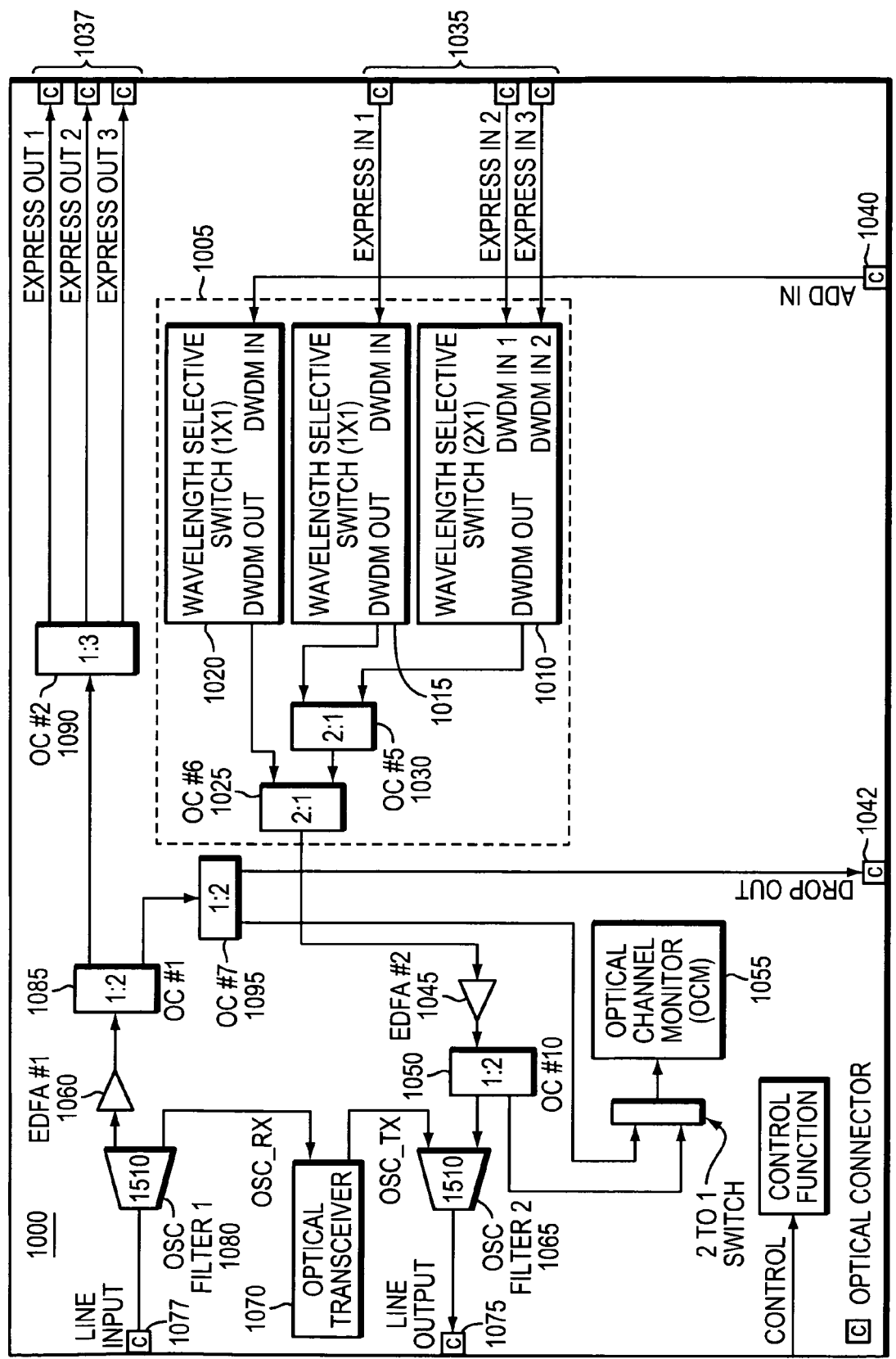
FIG. 10 is a block diagram illustrating a multi-degree ROADM employing a WSS device supporting example embodiments of the present invention.

FIG. 10 is a block diagram that shows a multi-degree ROADM 1000 with a larger WSS device formed of multiple smaller WSS devices coupled in parallel according to an example embodiment of the present invention. Larger WSS devices can be used to create multi-degree ROADMs. These multi-degree ROADMs can be used, in turn, to create a multi-degree ROADM network node.

The ROADM 1000 includes a 4×1 WSS 1005 created from one 2×1 WSS 1010 device, two 1×1 WSS devices 1015, 1020, and two 2-to-1 optical couplers (OC#5 and OC#6) 1025, 1030. Three of the inputs to the 4×1 WSS 1005 device are used as express input 1035 ports, while the fourth input is used to support an add in port 1040 of the ROADM 1000. In the FIG. 10 configuration, the add in port 1040 can be used to attach another module (not shown) containing optical circuitry capable of multiplexing a number of individual wavelengths into a single DWDM signal.

OC #5 1030 and OC #6 1025 direct an output of the 4×1 WSS 1005 to an output optical amplifier 1045. The output amplifier 1045 is used to simultaneously amplify all the wavelengths exiting the 4×1 WSS 1005 by a programmable, variable, or fixed amount. Following amplification of the optical signal by the output amplifier 1045, a portion of the amplified signal is tapped off using coupler OC #10 1050 and directed to an optical channel monitor 1055. A sufficient amount of power necessary to meet the minimum required level of the optical channel monitor 1055 is forwarded to the lower leg of OC #10. The optical channel monitor 1055 alternately selects signals out of an input optical amplifier 1060 and the output optical amplifier 1045.

The optical channel monitor 1055 is capable of measuring the power level of each wavelength forwarded to it. Each WSS device 1010, 1015, 1020 contains circuitry (not shown) that can optically attenuate each individual wavelength in a programmable manner. Therefore, once the power level of each wavelength out of the output amplifier 1045 is measured by the optical channel monitor 1055, each wavelength exiting the output amplifier 1045 can be set to the same power level by using attenuation circuitry within the WSS devices 1010, 1015, 1020. The upper output of OC #10 1050 (containing all the wavelengths exiting the 4×1 WSS 1005) is forwarded to a first input of Optical Supervisory Channel (OSC) filter 1065. The OSC filter 1065 is used to add an OSC (corresponding to wavelength 1510 nm) to the wavelengths exiting the 4×1 WSS 1005. The OSC wavelength is generated by an optical transceiver 1070. Following the addition of the OSC wavelength, the composite DWDM signal exits the ROADM 1000 via the line output port 1075 to a corresponding output path.

A DWDM signal from a network interface of the ROADM 1000 enters the ROADM 1000 at a line input port 1077. After entering the ROADM 1000, the OSC wavelength is first removed from the DWDM signal using an OSC filter 1080. The removed OSC wavelength is then sent to an optical transceiver 1070 which is used to convert the OSC wavelength to an electrical signal for further processing.

Once the OSC wavelength is removed, the remaining wavelengths are forwarded to an input optical amplifier 1060 which is used to simultaneously amplify all the wavelengths applied to its input by some programmable or fixed amount. The amplification setting of the input amplifier 1060 can be determined by measuring the optical power levels of all the wavelengths within the input signal using the optical channel monitor 1055. As can be seen in FIG. 10, a portion of the optical power exiting the input amplifier 1060 is forwarded to the optical channel monitor 1055 by optical couplers OC #1 1085 and OC #7 1095. If the measured wavelengths' power levels are too low, the input amplifier 1060 can be programmed to provide additional amplification. If the measured wavelengths' power levels are too high, the input amplifier 1060 can be programmed to provide a lesser amount of amplification.

After exiting the input amplifier 1060, the DWDM signal is forwarded to optical coupler OC #1 1085 which sends a copy of all received wavelengths to couplers OC #2 1090 and OC #7 1095. Coupler OC #2 1090 is used to broadcast all of the received amplified wavelengths from the input amplifier 1060 to express output ports 1037, while OC #7 1095 is used to broadcast all of the received amplified wavelengths out of the input amplifier 1060 to both the optical channel monitor 1055 and the drop out port 1042.

Additional add/drop ports can be added to the ROADM 1000 of FIG. 10 by attaching a wavelength de-multiplexing module (not shown) to a drop out port 1042 and a wavelength multiplexing module (not shown) to the add in port 1040. The module containing multiplexing circuitry and the module containing de-multiplexing circuitry may be included on the same circuit pack. The circuit pack attached to the add in and drop out ports 1040, 1042 may contain either colorless or colored add/drop ports. If the circuit pack attached to the add in and drop out ports 1040, 1042 contains colored add/drop ports, the colored add/drop ports can be implemented with thin film filters, thermal array waveguide gratings (AWGs), or athermal AWGs.

If athermal AWGs are used, the port expansion circuit pack may be a patch panel that includes an athermal AWG for multiplexing wavelengths and an athermal AWG for de-multiplexing wavelengths. Alternatively, a first patch panel may be attached to the ADD IN and DROP OUT expansion ports of the ROADM 1000, where the first patch panel includes two optical interleaver devices and two AWGs. The first optical interleaver device separates wavelengths into two groups of dropped wavelengths. The first athermal AWG receives and demultiplexes one group of dropped wavelengths from an output of the first optical interleaver device. The second AWG multiplexes a group of added wavelengths, then transmits them to the second optical interleaver device, which combines two groups of added wavelengths.

A second patch panel can be attached to the first patch panel via an input of the first interleaver device and an output of the second interleaver device. The second patch panel includes a third athermal AWG used to de-multiplex the second group of dropped wavelengths from the first interleaver device. The second patch panel also includes a fourth athermal AWG that multiplexes a second group of added wavelengths, which it provides to the second interleaver device.

The various optical couplers within the ROADM 1000 of FIG. 10 may be specified with various coupling ratios. For interchangeable express ports, optical coupler OC #2 1090 is typically specified as an "equal split" coupler, where the input signal is equally divided between the three output ports of the coupler. OC #7 1095 is typically designed to forward the majority of its input power to the drop out port 1042, which is typically be connected to optical transponders (not shown) via a wavelength demultiplexer. OC #7 1095 sends most of its input power to the transponders because the transponders require optical signals of reasonably high optical power levels to convert the colored wavelengths into "white light" wavelengths (e.g., 850 nm, 1310 nm, and 1550 nm).

The optical channel monitor 1055 can operate with a relatively low optical signal, and, therefore, an optical coupler with a coupling ratio of between 80/20% and 97/3% may be appropriate for OC #7 1095. Optical coupler OC #1 1085 can be specified such that a minimum amount of power (which satisfies the requirements of the optical channel monitor 1055 and the transponders downstream from the drop out port 1042) is directed to the lower output port of OC #1 1085.

To make the express input ports 1035 interchangeable, OC #5 1030 may typically be selected to be an equal-split coupler. The coupling ratio for OC #6 1025 may be chosen to provide both the desired optical power margins for the pass-through wavelengths (i.e., the wavelengths arriving on the express ports that are directed to the output amplifier 1045) and the added wavelengths (arriving on the asdd in port 1040). This will result in either an even or uneven split coupling ratio for OC #6 1025.

The power levels of the wavelengths arriving at the input to the input amplifier 1060 may be unequal. The median power of the wavelengths is identified, and the gain of the input amplifier 1060 is set such that the median power is amplified to some set target value. The gain of the output amplifier 1045 is set such that power levels of the wavelengths exiting the output amplifier 1045 are set to some predetermined value, while providing a predetermined amount optical power margin for both the added wavelengths and pass-through wavelengths. An additional optical power level margin can be provided for the pass-through wavelengths by increasing the gain of the output amplifier 1045 or by increasing both the gain and saturated output power of the input amplifier 1060.

Also, the coupling ratios of OC #5 1030 and OC #6 1025 may be appropriately adjusted if the insertion losses of the three WSS devices 1010, 1015, 1020 are unequal.

In one example embodiment of the invention, all the optical components shown in FIG. 10 may be placed within a single pluggable circuit pack. Each circuit pack may include an input amplifier with a different range of optical gain.

An alternative example embodiment may contain multiple drop out ports 1042 and multiple add in ports 1040. For this case, each drop out port 1042 is connected to an output of a first additional equal split optical coupler, with the input of the first equal split optical coupler attached to the right output of OC #7 1095. Also, each add in port 1040 is attached to an input of a second additional equal split optical coupler, and the output of the second additional equal split optical coupler is attached to the input of the top WSS 1020.

Figure 11:
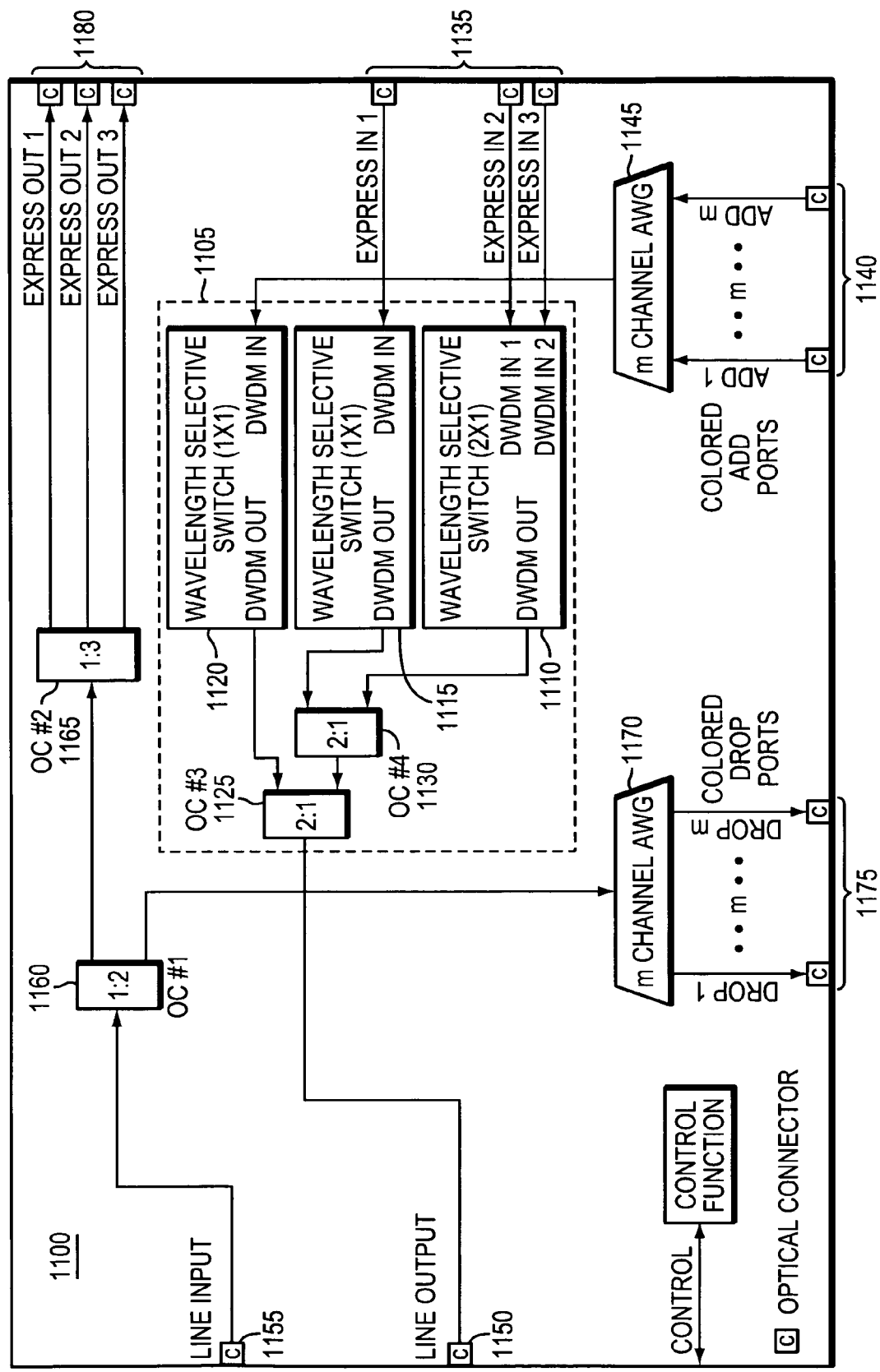
FIG. 11 is a block diagram illustrating a ROADM employing a WSS device and array waveguide grating (AWG) devices coupled to the add/drop ports according to example embodiments of the present invention.

FIG. 11 is a block diagram of a multi-degree ROADM 1100 illustrating how a larger WSS device can be created from multiple smaller WSS devices using parallelism according to another example embodiment of the present invention. These multi-degree ROADMs can similarly be used to create a multi-degree ROADM network node for use in multi-degree optical network nodes. The ROADM 1100 of FIG. 11 is similar to the ROADM 1000 of FIG. 10, except that the ROADM 1100 of FIG. 11 does not contain the OSC circuitry, input/output amplifiers, and optical channel monitor. The ROADM 1100 of FIG. 11 further includes two AWGs 1145, 1170.

In this embodiment, the ROADM 1100 employs a larger 4×1 WSS 1105 created from one 2×1 WSS device 1110, two 1×1 WSS devices 1115, 1120, and two 2 to 1 optical couplers OC#3 1125 and OC#4 1130. Three of the inputs to the 4×1 WSS device 1105 are used as express input 1135 ports, while a fourth input is used to support add ports 1140 coupled to the ROADM 1100. In ROADM 1100, m add ports 1140 are combined using a first Array Waveguide Grating (AWG) 1145. Since a specific wavelength is applied to each input of the AWG 1145, these add ports are referred to as "colored" add ports. As shown in FIG. 11, the output of the 4×1 WSS is directed to a line output 1150 port and a corresponding line output path (not shown) of the ROADM 1100.

The line input 1155 side of the ROADM 1100 includes a 1 to 2 coupler 1160, 1 to 3 coupler 1165, and a second AWG device 1170. The 1 to 2 coupler 1160 and 1 to 3 coupler 1165 are used to broadcast all the wavelengths received on the line input 1155 port of the ROADM 1100 to the second AWG device 1170 and express output ports 1180. The second AWG device 1170 demultiplexes all the wavelengths received at the line input 1155 port of the ROADM 1100 and directs the demultiplexed wavelengths to various drop ports 1175 of the ROADM 1100. Since a specific wavelength is directed to each drop port 1175, the drop ports 1175 are referred to as colored drop ports. Optical transponders (not shown) can be connected directly to the input and output ports 1140, 1175 of the two AWGs 1145, 1170, respectively.

The coupling ratios of the optical couplers of the ROADM 1100 can be set using the same methods and constraints as the optical couplers in the ROADM 1000 shown in FIG. 10. In ROADM 1100, optical coupler #4 1130 has a 50/50 coupling ratio (i.e., half the output power exiting coupler #4 1130 comes from the 2×1 WSS 1110 and half the output power exiting coupler #4 1130 comes from the lower 1×1 WSS 1115). This is because each express input 1135 is treated equally, meaning that the insertion loss experienced by a signal applied to one express input 1135 is equal to the insertion loss experienced by a signal applied to any of the other express inputs 1135. (Of course, the coupling ratio of optical coupler #4 1130 can be a value other than 50/50.) Optical coupler #3 1125 may have a coupling ratio of some value other than 50/50. This is because the optical power levels of the wavelengths arriving at the top WSS 1120 (i.e., from the add ports 1140) may be substantially different than the optical power levels of the wavelengths arriving at the inputs of the middle and lower WSS devices 1110, 1115 (i.e., from the express ports 1135).

For example, the coupling ratio for optical coupler #3 1125 may be 75%/25%. That is, 75% of the output power exiting OC #3 1125 may come from the first input of the coupler and 25% of the output power exiting coupler #3 may come from the second input of the coupler. In this example, the first input of OC #3 1125 (the input associated with 75% of the power)

may be attached to OC #4 1130, and the second input of coupler #3 1125 may be attached to the upper 1×1 WSS 1120.

Figure 12:
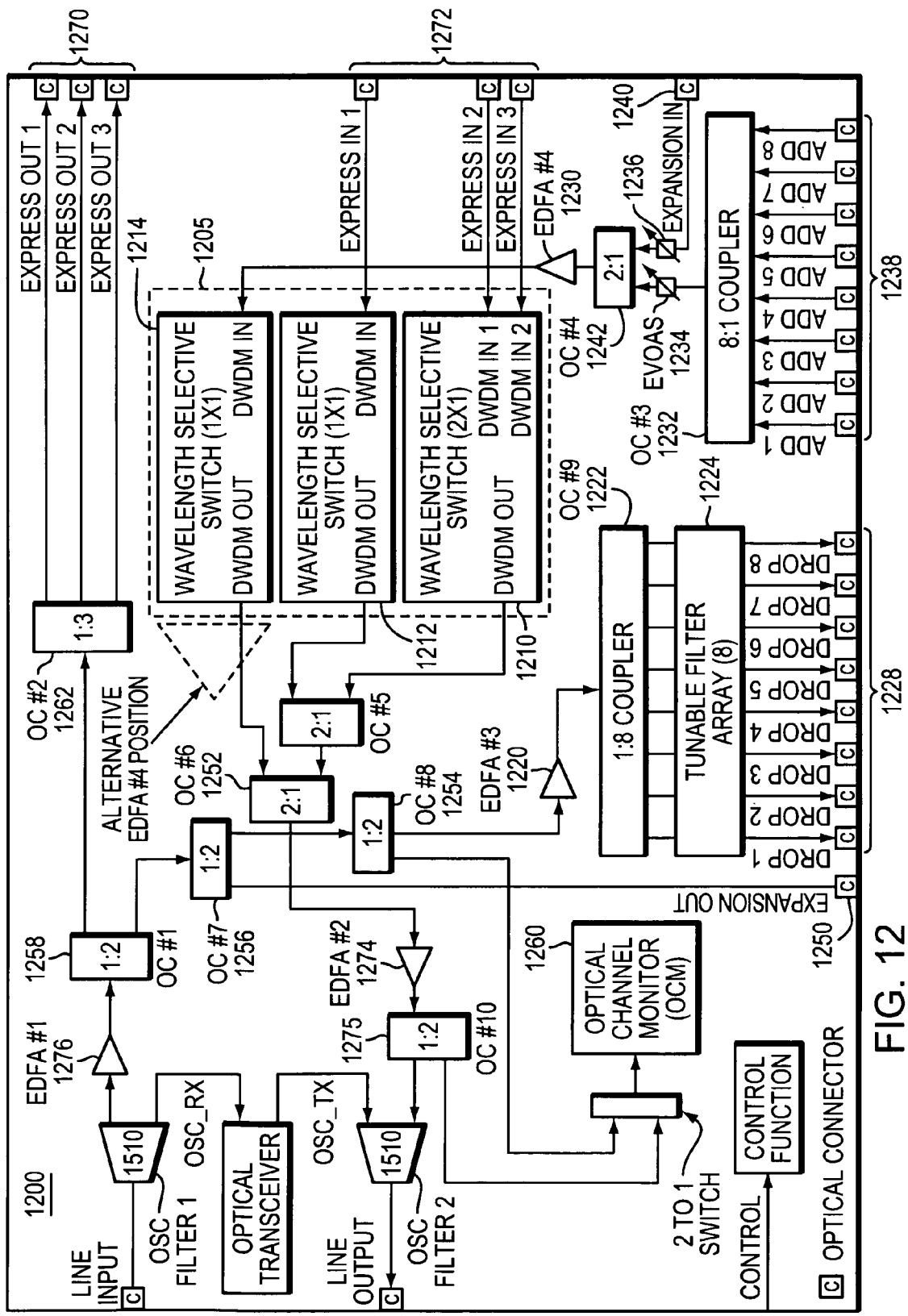
FIG. 12 is a block diagram illustrating a multi-degree ROADM employing a WSS device where an optical coupler is coupled to the add ports and a tunable filter array coupled to the drop ports to create a ROADM with eight embedded colorless add/drop ports according to example embodiments of the present invention.

FIG. 12 illustrates another example ROADM 1200 employing a 2×1 WSS device 1210 connected in parallel with a pair of 1×1 WSS devices 1212 and 1214 to optical couplers OC#5 and OC#6 1252 to form a 4×1 WSS 1205. In addition, an embedded optical amplifier 1230 amplifies wavelengths entering OC #6 1252 via WSS 1214. Thus, the ROADM 1200 illustrates another aspect of this invention—the ability to selectively amplify the wavelengths following a specific path through an N×1 WSS while not amplifying wavelengths following other paths through an N×1 WSS.

The ROADM 1200 contains all the optical circuitry of the ROADM 1000 of FIG. 10, a drop optical amplifier (EDFA #3) 1220, an add optical amplifier (EDFA #4) 1230, wavelength de-multiplexing circuitry (OC #9 1222 plus a tunable filter array 1224), wavelength multiplexing circuitry (OC #3 1232), and two electrical VOAs (EVOAs) 1234, 1236. Also, ROADM 1200 has an "expansion in" port 1240 and "expansion out" port 1250 instead of the add in port 1040 and drop out port 1042 of ROADM 1000 (FIG. 10). (The expansion in port 1240 and the add in port 1040 each can be used as an extra add port; similarly, the expansion out port 1250 and the drop out port 1042 each can be used as extra drop port.)

Optical coupler OC #9 1222 is used to broadcast all the received wavelengths to each of the tunable filters within the tunable filter array 1224. Each tunable filter can be independently programmed to forward one selected wavelength to its corresponding output port. Because any wavelength can be directed to any drop port 1228, the drop ports 1228 are "colorless." The drop optical amplifier 1220 may be used to compensate for insertion loss of the optical coupler OC #9 1222 and tunable filter array 1224, and to provide an adequate optical power to optical transponders (not shown) attached to the drop output ports 1228 of the ROADM 1200. Although the ROADM 1200 includes a tunable filter array 1224 with eight tunable filters, alternative embodiments may include a tunable filter array with either more or less than eight tunable filters.

Optical coupler OC #3 1232 is used to multiplex the wavelengths received on add ports 1238 into one composite DWDM signal. Since any wavelength can be applied to any add port 1238 (with the restriction that no two add ports can have a wavelength of the same frequency applied to it), the add ports 1238 are "colorless."

The output of OC #3 1232 is attached to an EVOA 1234 which can be used to perform coarse power leveling of the wavelengths applied to the add ports 1238 with the wavelengths arriving at the expansion in port 1240 and express ports 1272. An EVOA 1236 following the expansion in port 1240 can also be used to perform coarse power leveling of the wavelengths arriving on port 1240 with the wavelengths arriving on ADD ports 1238 and express ports 1272. In alternative embodiments, one or both of the EVOAs 1234, 1236 are removed, the output of OC #3 1232 is attached directly to one input of OC #4 1242, and the expansion in port 1240 is connected directly to the other input of OC #4 1242.

Optical coupler OC #4 1242 is used to passively combine the wavelengths applied to the add ports 1238 with the wavelengths arriving on the expansion in port 1240. The coupling ratio of OC #4 1242 is chosen such that the wavelengths exiting coupler OC #4 1242 are approximately of equal power. The add optical amplifier 1230 can be used to overcome the large insertion losses associated with OC #3 1232 and OC #4 1242. As shown in FIG. 12, the add optical amplifier 1230 may alternatively be placed between the output of the top WSS 1214 and the top input of OC #6 1252. Both OC #9 1222 and OC #3 1232 can be "equal split" couplers.

In contrast with the ROADM 1000 of FIG. 10, the ROADM 1200 includes an additional coupler OC #8 1254. Optical coupler OC #8 1254 broadcasts the amplified received wavelengths to the tunable filter array 1224 and the optical channel monitor 1260. Optical coupler OC #7 1256 broadcasts the amplified received wavelengths to the expansion out port 1250, optical channel monitor 1260, and tunable filter array 1224. Optical coupler OC #1 1258 broadcasts the amplified received optical wavelengths to optical couplers OC #7 1256 and OC #2 1262. Optical coupler OC #2 1262 broadcasts the amplified received wavelengths to the express output ports 1270.

If OC #2 1262 and OC #5 are "equal split" couplers, then the output express ports 1270 are interchangeable (assuming the insertion loss of WSS 121 equals that of WSS 1210). Making OC #2 1262 and OC #5 "equal split" couplers also makes the input express ports 1272 interchangeable. The coupling ratio for optical coupler OC #1 1258 may be set such that some predetermined per/wavelength power level is sent to each of the express output ports 1270. The coupling ratio for optical coupler OC #7 1256 may be set such that a minimally acceptable power level can be sent to the optical channel monitor 1260 and the expansion out port 1250. The coupling ratio for optical coupler OC #8 1254 may be set such that a minimally acceptable power level can be sent to the optical channel monitor 1260, while providing enough optical power to the input of the drop optical amplifier 1220 so as to limit the required gain needed for the drop optical amplifier 1220. The coupling ratio for optical coupler OC #10 1275 may be set such that a minimally acceptable power level can be sent to the optical channel monitor 1260. The coupling ratio for OC #6 1252 may be chosen to provide both the desired optical power margins for the pass-through wavelengths (i.e., the wavelengths arriving on the express in ports 1272 that are directed to output optical amplifier (EDFA #2) 1274) and the added wavelengths (i.e., the wavelengths exiting the add optical amplifier 1230). Thus, OC #6 1252 may have an even or uneven coupling ratio.

Additional add/drop ports can be added to the ROADM 1200 by attaching a wavelength de-multiplexing module (not shown) to the expansion out port 1250 and a wavelength multiplexing module (not shown) to the expansion in port 1240. The multiplexing and de-multiplexing modules may be on the same circuit pack.

The circuit pack attached to the expansion in port 1240 and expansion out port 1250 may contain either colorless or colored add/drop ports. If the circuit pack attached to the expansion in 1240 and expansion out 1250 ports contains colored add/drop ports, the colored add/drop ports can be implemented with thin film filters, thermal AWGs, or athermal AWGs. If athermal AWGs are used, the "port expansion circuit pack" may be in the form of a single patch panel, or in the form of two patch panels, as described above with reference to the ROADM 1000 of FIG. 10. In other example embodiments, all of the optical components shown in FIG. 12 may be placed within a single pluggable circuit pack.

An alternative example embodiment may contain multiple expansion out ports 1250 and multiple expansion in ports 1240. In this example, each expansion out port 1250 is connected to an output of a first additional equal split optical coupler, with the input of the first equal split optical coupler attached to the left output of OC #7 1256. Also, each expansion in port 1240 is attached to an input of a second additional equal split optical coupler, and the output of the second additional equal split optical coupler is attached to the right-most EVOA 1236.

In still another alternative example embodiment, the ROADM 1200 may be a circuit pack that does not include the input optical amplifier (EDFA #1) 1276, output amplifier 1274, OSC circuitry, optical channel monitor 1260, or other components. These items may instead be included in one or more additional circuit packs used within a common optical node with the circuit pack containing the alternative example embodiment.

In yet another alternative example embodiment, the ROADM 1200 may contain all the optical components except for the drop optical amplifier 1220, the add optical amplifier 1230, or both. For embodiments not including the drop optical amplifier 1220, optical coupler OC #9 1222 can be connected directly to the right-most output of OC #8 1254. For embodiments not including the add optical amplifier 1230, the output of optical coupler OC #4 1242 can be connected directly to the input of WSS 1214.

Still other alternative example embodiments may include a ROADM 1200 which does not include an expansion in port 1240 or an expansion out port 1250. For these embodiments, OC #7 1256 can be eliminated, and the lower output of OC #1 1258 can be directly connected to the input of OC #8 1254. Additionally, OC #4 1242 and the rightmost EVOA 1236 may be eliminated, and the output of the remaining EVOA 1234 may be attached directly to the input of the add optical amplifier 1230.

Other alternative example embodiments may omit one or both of the EVOAs 1234, 1236. If EVOA 1234 is removed, then the output of the OC #3 1232 may be connected directly to OC #4 1242. If EVOA 1236 is removed, then the expansion in port 1240 may be directly connected to OC #4 1242. If the add optical amplifier 1230 is placed between the output of the WSS 1214 and the top input to OC #6 1252, and if one or both EVOAs 1234, 1236 are removed, then the output of OC #4 1242 may be attached directly to the input of the WSS 1214. If EVOA 1234 is removed, then the output of OC #3 1232 may be attached to the left-most input of OC #4 1242, and if EVOA 1236 is removed, then the expansion in port 1240 can be connected directly to the right-most input of OC #4 1242.

Figure 13:
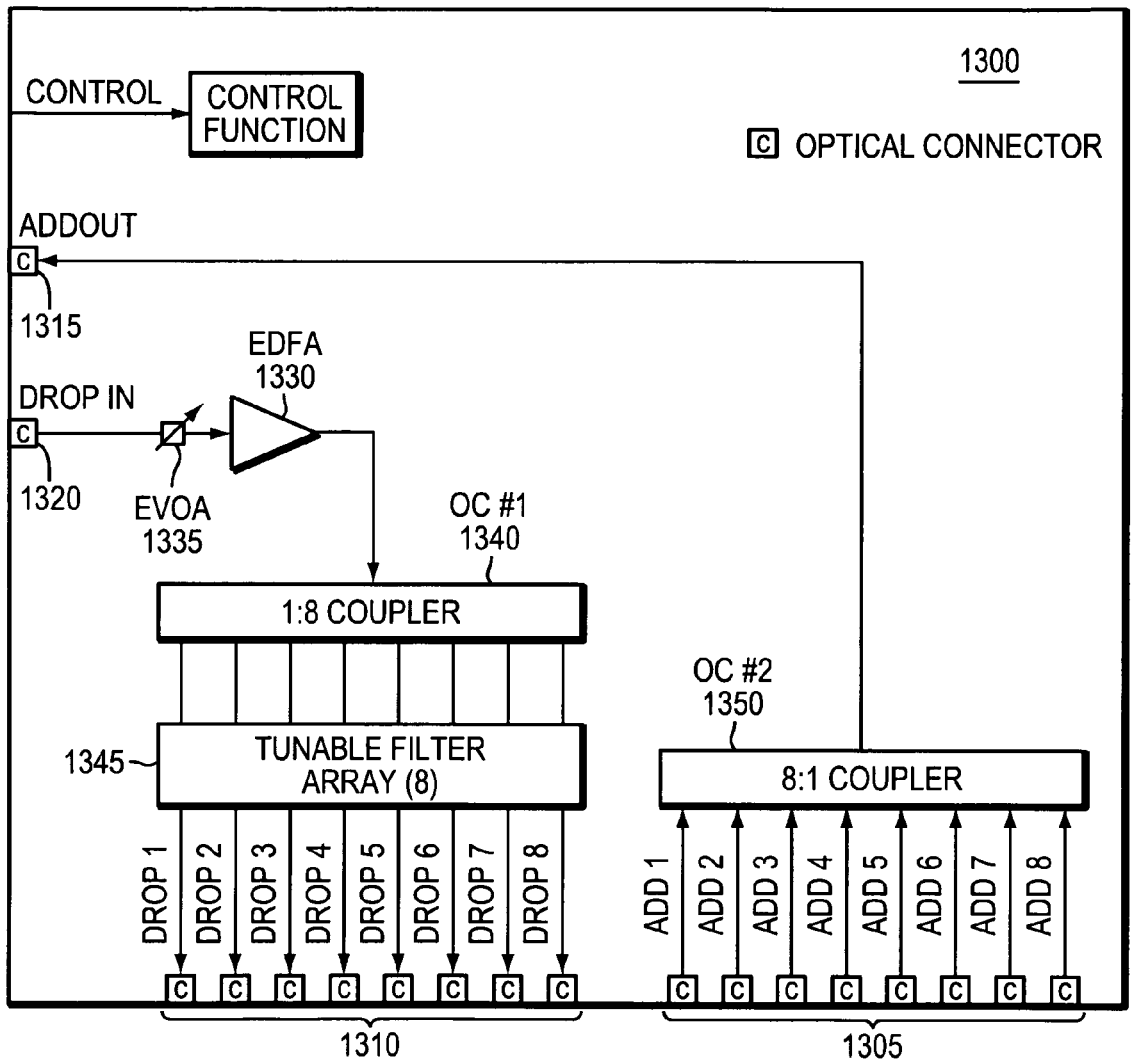
FIG. 13 is a block diagram illustrating an eight-port colorless expansion module for use with the expansion ports of the ROADM depicted in FIG. 12 in accordance with example embodiments of the present invention.

FIG. 13 is an example embodiment of a colorless port expansion module 1300 that can be connected to a given ROADM to provide a set of colorless add/drop ports 1305, 1310 to the ROADM. The colorless port expansion module 1300 may, for example, be attached to either the ROADM 1000 of FIG. 10 or the ROADM 1200 of FIG. 12.

When attaching the colorless port expansion module 1300 to the ROADM 1000 of FIG. 10, an add out port 1315 of the colorless port expansion module 1300 is connected to the add in port 1040 of the ROADM 1000 (FIG. 10) using an optical jumper cable or other suitable connector. The WSS 1020 residing in the add path of the ROADM 1000 may be used to power balance the wavelengths arriving from the colorless port expansion module 1300. The drop in port 1320 of the colorless port expansion module 1300 is attached to the drop out port 1042 of the ROADM 1000 using an optical jumper cable or other suitable connector.

Similarly, when attaching the colorless port expansion module 1300 to the ROADM 1200 of FIG. 12, the add out port 1315 of the colorless port expansion module 1300 is connected to the expansion in port 1240 of the FIG. 12 ROADM 1200 using an optical jumper cable. The WSS 1214 residing in the add path of ROADM 1200 may be used to power balance the wavelengths arriving from the colorless port expansion module 1300. The drop in port 1320 of the colorless port expansion module 1300 can be attached to the expansion out port 1250 of ROADM 1200 using an optical jumper cable.

The colorless port expansion module 1300 may include an input optical amplifier 1330 in its drop path, which can be either a variable gain input amplifier or a fixed gain amplifier. If the drop path's input optical amplifier 1330 is a fixed gain amplifier, then an EVOA 1335 may optionally be placed in front of the amplifier 1330, as depicted in FIG. 13. The amplifier 1330 in the drop path is used to simultaneously amplify all the wavelengths arriving at the drop in port 1320, and may be used to amplify eighty-eight (88) or more wavelengths. The amplifier 1330 can be used to overcome the large insertion loss typically presented by the combination of an optical coupler OC #1 1340 and a tunable filter array 1345, as well as providing an adequate optical power level to any optical transponder (not shown) attached to the drop output ports 1310 of the colorless port expansion module 1300.

Optical coupler OC #1 1340 is used to broadcast all the amplified wavelengths to each of the tunable filters within the tunable filter array 1345. Each tunable filter can be independently programmed to forward one selected wavelength to its output port. Because any wavelength can be directed to each of the drop ports 1310, each drop port is considered to be a "colorless" drop port. Although module 1300 contains a tunable filter array 1345 with eight tunable filters, the module may contain a tunable filter array with more or less than eight tunable filters.

Optical coupler OC #2 1350 is used multiplex the wavelengths received on the eight add ports 1305 into one composite DWDM signal. Since any wavelength can be applied to each of the add ports 1305 (with the restriction that no two add ports can have a wavelength of the same frequency applied to it), the add ports 1305 are considered to be "colorless" add ports. Although module 1300 is shown with eight add ports 1305, the module 1300 may contain more or less than eight add ports 1305. Optical couplers OC #1 1340 and OC #2 1350 are typically equal split optical couplers.

An alternative example may include placing an additional optical amplifier (not shown) in the add path between the output of OC #2 1350 and the add out port 1315 of the colorless port expansion module 1300. The additional optical amplifier is used to simultaneously amplify all the wavelengths exiting OC #2 1350 (e.g., up to eight when using an 8:1 optical coupler as shown in). The additional optical amplifier may be either a variable gain amplifier or a fixed gain amplifier. If a fixed gain amplifier is used, then an EVOA (not shown) may optionally be placed in front of the fixed gain amplifier in order to provide a particular average per-wavelength optical power level at the add out port 1315.

In an example embodiment of the colorless port expansion module 1300, all the optical circuitry may be placed on a single pluggable circuit pack. However, the present invention should not be construed as being limited thereto, and one or more components may be located on one or more circuit packs or other similar such locations.

Figure 14:
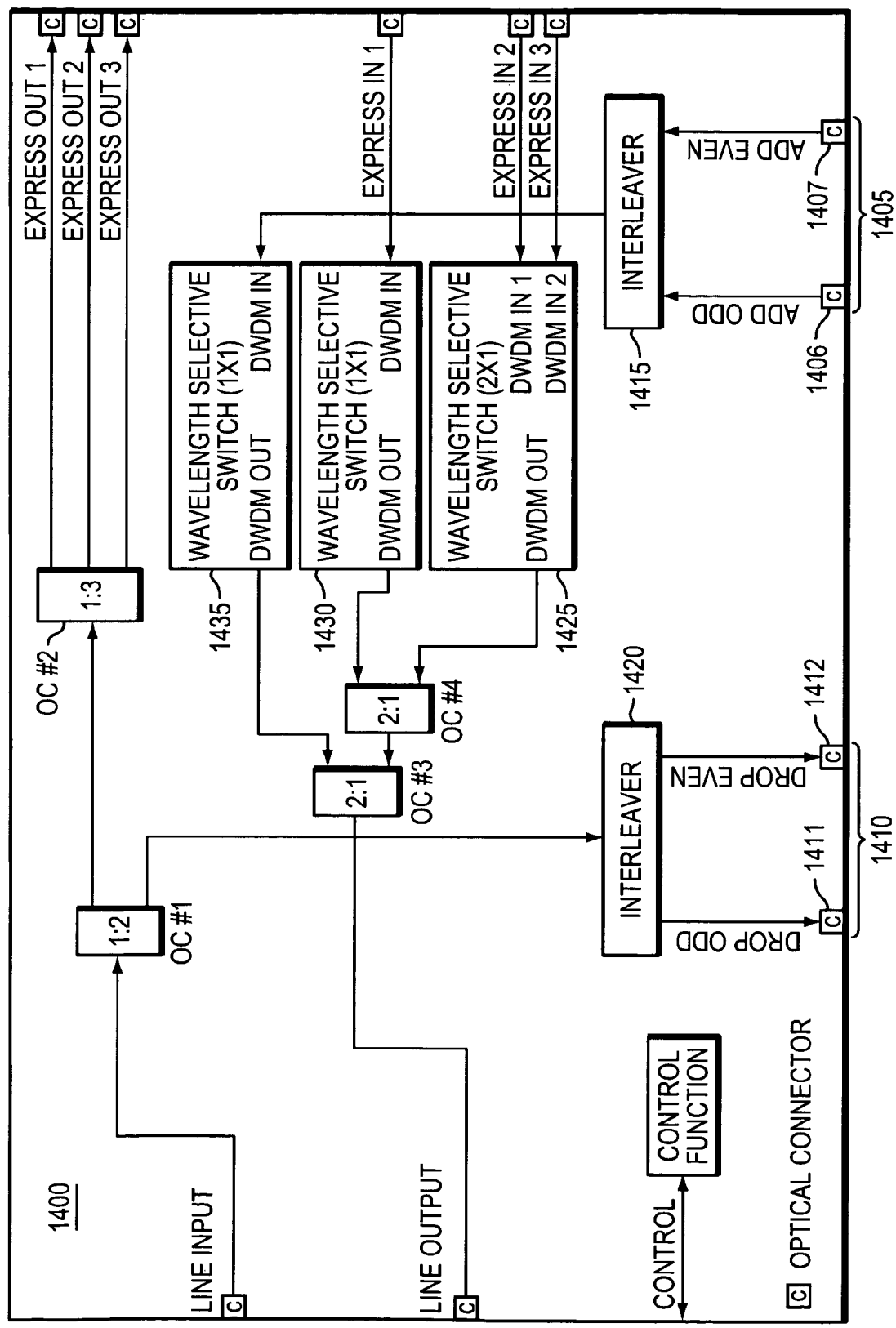
FIG. 14 is a block diagram illustrating multi-degree ROADMs employing a WSS device and interleaver devices coupled to add/drop ports of the ROADMs according to example embodiments of the present invention.

FIG. 14 is a block diagram illustrating another example embodiment depicting a multi-degree ROADM 1400 employing a pair of 1×1 WSSs 1430 and 1435 connected in parallel with a 2×1 WSS 1425 to create a larger 4×1 WSS. The example embodiment illustrated in FIG. 14 is similar to that of the ROADM 1100 of FIG. 11 except that the ROADM 1400 uses interleavers 1415, 1420 instead of AWGs 1170, 1145 and has only two add/drop ports 1405, 1410.

The interleaver 1420 in the drop path places every odd numbered wavelength on one output (and onto the drop odd port 1411) and every even wavelength on the other output (and onto the drop even port 1412). Similarly, the interleaver 1415 in the add path combines the odd wavelengths arriving on the add odd port 1406 with the even wavelengths arriving on the add even port 1407, and forwards the composite DWDM signal to WSS 1435.

For example, the interleavers 1415, 1420 may be 50 GHz/100 GHz interleavers, where a first group of 100 GHz spaced wavelengths (the odd wavelengths) are interleaved with a second group of 100 GHz spaced wavelengths (the even wavelengths) to form a DWDM signal where the wavelengths are spaced 50 GHz apart. In this case, the first group of wavelengths are offset in frequency from the second group of wavelengths by 50 GHz.

Coupling ratios for the four optical couplers (OC #1-4) shown in FIG. 14 can be chosen in a similar manner that the coupling ratios are chosen for the optical couplers in the ROADM 1100 of FIG. 11.

Two patch panels can be connected to ROADM 1400. The first patch panel connects to the add odd port 1406 and the drop odd port 1411, and the second patch panel connects to the add even port 1407 and the drop even port 1412. The first patch panel may contain two athermal AWGs: one to multiplex the individual odd frequency wavelengths, and one to de-multiplex the individual odd frequency wavelengths. The second patch panel may also contain two athermal AWGs: one to multiplex the individual even frequency wavelengths and one to de-multiplex the individual even frequency wavelengths. Optical transponders can be attached to each of the two patch panels.

In an alternative example embodiments, an input amplifier, output amplifier, OSC circuitry, and optical channel monitor, or combinations thereof may be included with the optical circuitry shown in FIG. 14. The combined optical circuitry may be placed on a single circuit pack or may be placed on multiple circuit packs, modules, or the like.

Figure 15:
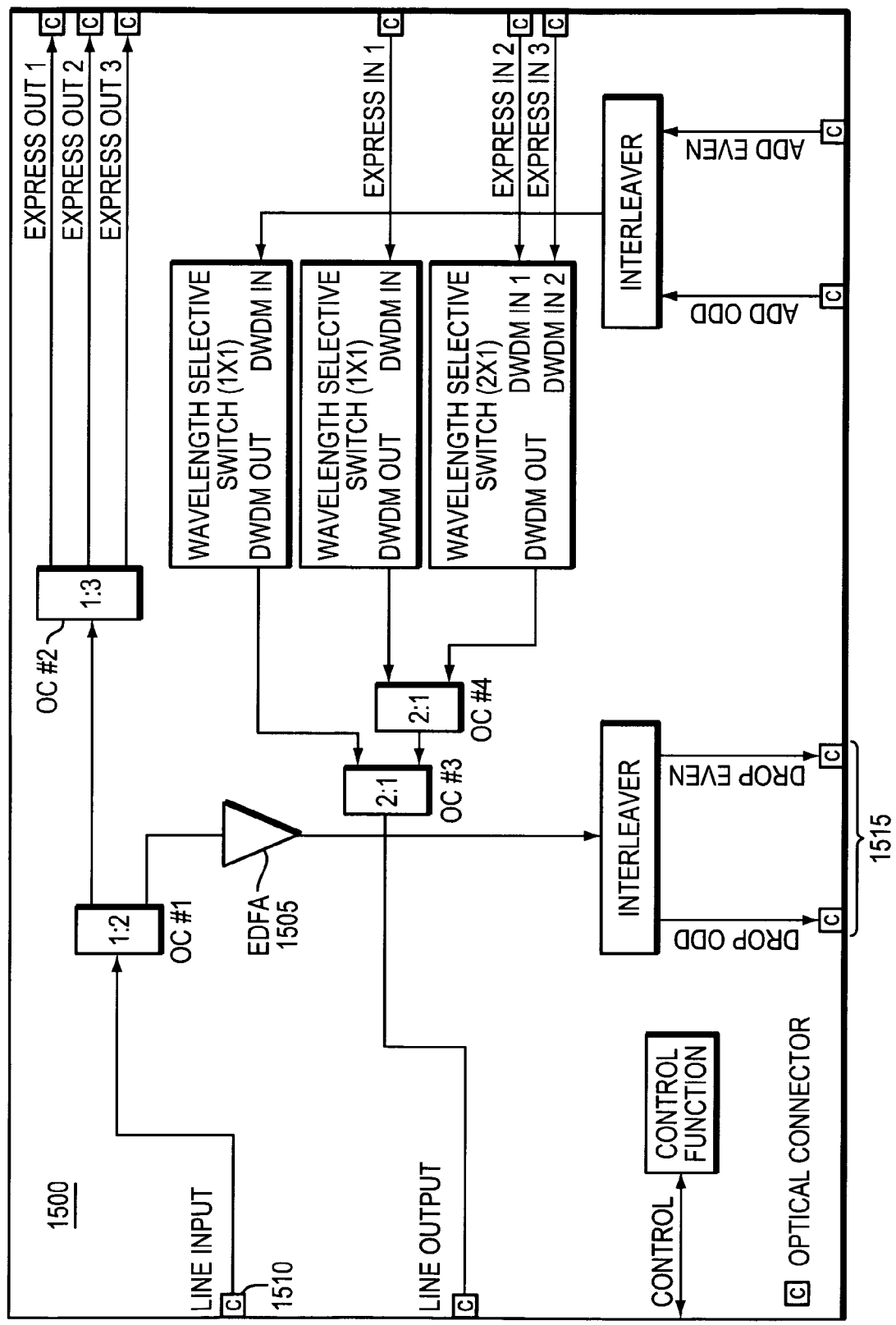
FIG. 15 is a block diagram illustrating an alternative implementation of FIG. 14 employing an optical amplifier along drop paths according to example embodiments of the present invention.

FIG. 15 depicts a ROADM 1500 that is similar to the ROADM 1400 of FIG. 14, except that the ROADM 1500 of FIG. 15 has an optical amplifier (EDFA) 1505 in the drop path. The optical amplifier 1505 is used to simultaneously amplify each wavelength arriving at a line input port 1510 and directed towards the two drop ports 1515. Additionally, a second optical amplifier can optionally be placed in the "ADD" path between the output of the "ADD Path" interleaver and the top input port of the optical coupler OC #3. More specifically, the second optical amplifier may be placed between the output of the "ADD Path" interleaver and the top WSS in FIG. 15, or between the output of the top WSS in FIG. 15 and the top input port of the optical coupler OC #3.

Figure 16:
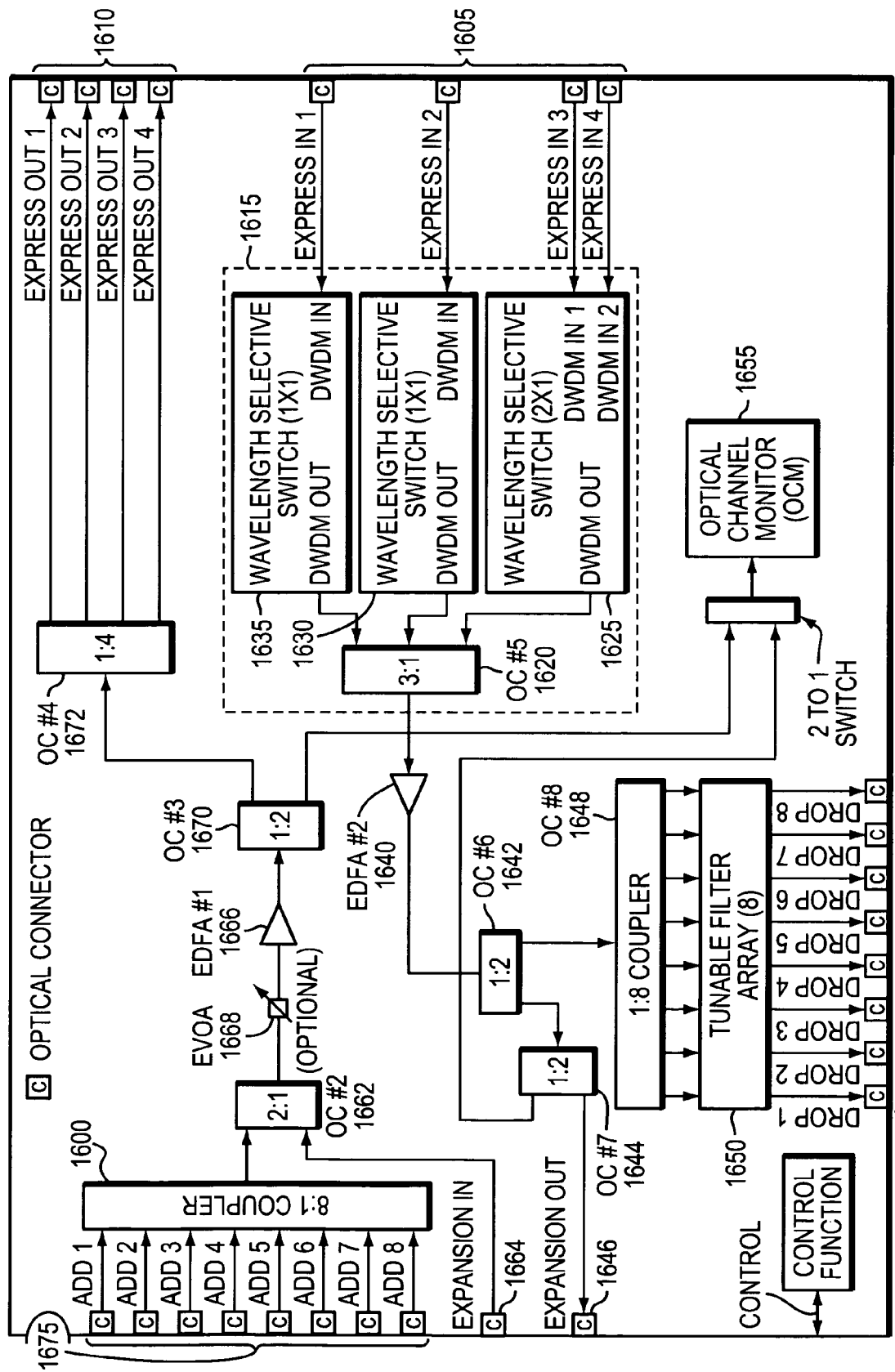
FIG. 16 is a block diagram illustrating a colorless/directionless add/drop module employing a large WSS device and four express in/out ports in accordance with example embodiments of the present invention.

FIG. 16 illustrates another example embodiment employing multiple smaller WSS devices using parallelism to form a larger WSS. FIG. 16 depicts a colorless/directionless add/drop module 1600. Express in/out ports 1610, 1605 can be connected to the express out/in ports of multiple ROADMs (such as the ROADMs 1000, 1100, and 1200 of FIGS. 10-12) to provide colorless/directionless add/drop ports to the ROADMs.

Each express in/out port pair 1610, 1605 of the colorless/directionless add/drop module 1600 can be connected to a different ROADM within an optical node. The circuitry on the colorless/directionless add/drop module 1600 is then capable of providing the ability to drop any wavelength received at any of the network interfaces of the ROADMs attached to the FIG. 16 module 1600. Similarly, circuitry on the colorless/directionless add/drop module 1600 is also capable of providing the ability to add any wavelength received at its add ports to any of the network interfaces of the ROADMs attached to it.

In the drop direction, the WSS devices 1625, 1630, and 1635 and an optical coupler OC #5 1620 are used to form a larger 4×1 WSS 1615 device. The 4×1 WSS 1615 device is used to select wavelengths from the various express in ports 1605 (which can be connected to the express out ports of various ROADMs in an optical node) and forward the selected wavelengths to an output optical amplifier (EDFA #2) 1640.

The amplifier 1640 is used to simultaneously amplify all the wavelengths exiting the 4×1 WSS 1615 function and then forwards the resulting amplified wavelengths to optical coupler OC #6 1642. Optical couplers OC #6 1642 and OC #7 1644 are used to broadcast all the amplified wavelengths to an expansion out port 1646, (optional) optical channel monitor 1655, and optical coupler OC #8 1648. Optical coupler OC #8 1648 is used, in turn, to broadcast all the amplified wavelengths to each tunable filters in a tunable filter array 1650.

Each tunable filter can be independently programmed to forward one selected wavelength to its output port. Because any wavelength can be directed to any drop port 1652, each drop port 1652 is colorless. Because each of the dropped wavelengths may arrive from multiple network interfaces of the optical node, each drop port 1652 is also directionless (meaning that the dropped wavelengths are not permanently directed from a particular network interface).

The expansion out port 1646 can connect to another module (not shown) containing another 1-to-N optical coupler connected to another N input tunable filter array to provide additional colorless/directionless drop ports. In addition, optical transponders (not shown) can be attached to each drop port 1652 of the colorless/directionless add/drop module 1600.

In the add direction, an eight-to-one optical coupler OC #1 1660 is used to combine the wavelengths from up to eight add ports 1675 into a composite DWDM signal. Optical coupler OC #2 1662 is used to combine the wavelengths from the add ports 1675 to the wavelengths arriving on an expansion in port 1664. The expansion in port 1664 may be connected to a module (not shown) containing additional add ports that are combined into a single DWDM signal by use of a multi-input optical coupler.

The DWDM signal exiting OC #2 1662 is forwarded to an add optical amplifier (EDFA #1) 1666 where all wavelengths are simultaneously amplified and forwarded to OC #3 1670. An EVOA 1668 may optionally be placed between the OC #2 1662 and the add optical amplifiers 1666. OC #3 1670 is used to broadcast all the amplified wavelengths to both the (optional) optical channel monitor 1655 and optical coupler OC #4 1672. Optical coupler OC #4 1672 is used to broadcast each of the amplified wavelengths to each of the four express out ports 1610. Optical couplers OC #1 1660, OC #4 1672, OC #5 1620, and OC #8 1648 may be equal split couplers.

Since each of the express out ports 1610 in FIG. 16 can be connected to the express in ports of up to four ROADMs within an optical node, each of the added wavelengths can in turn be forwarded to up to four network interfaces of the optical node. Since an optical wavelength of any frequency can be applied to a given add port 1675 of the FIG. 16 module 1600, the add ports 1675 are colorless add ports 1675. In addition, since each wavelength applied to the add ports 1675 can be directed to up to four network interfaces in the optical node, the add ports 1675 are directionless add ports 1675 (i.e., the added wavelengths are not permanently directed to a particular network interface). An optical transponder (not shown) can be attached to each add port 1675 of the colorless/directionless add/drop module 1600.

Although the module 1600 of FIG. 16 illustrates eight add/drop ports and a single bidirectional expansion port, the module 1600 may be built with any number of add/drop ports and any number of bidirectional expansion ports (including no expansion ports). All the optical circuitry shown in FIG. 16 may be placed on a single pluggable circuit pack, or alternatively, across multiple modules, circuit packs, or the like.

Figure 17:
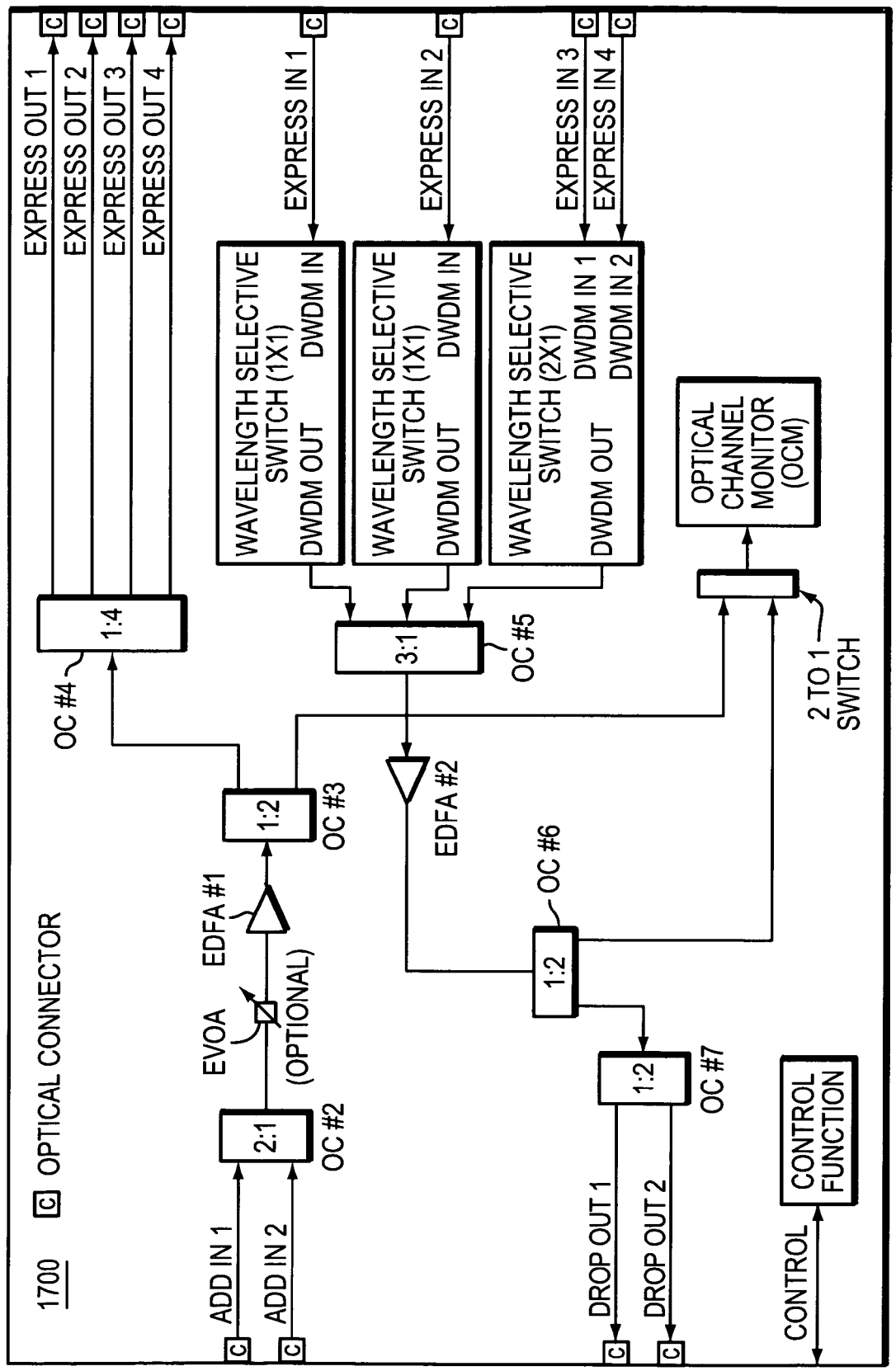
FIG. 17 is a block diagram illustrating a colorless/directionless add/drop module employing a large WSS device with add/drop ports that may be coupled to other optical modules in which embodiments of the present invention may be employed.

FIG. 17 illustrates an alternative example embodiment of a colorless/directionless add/drop module 1700 similar to the module 1600 of FIG. 16 except that the individual add/drop ports are not included on module 1700. Instead, the add/drop ports are be placed on a module (not shown) external to module 1700. The module external to module 1700 may contain N add ports combined together by an N-to-1 optical coupler. It may also contain N drop ports, where the drop ports are connected to outputs of N tunable filters; the inputs of the tunable filters are connected to a 1-to-N optical coupler.

ROADMs Using 1×N WSS Devices

Figure 18:
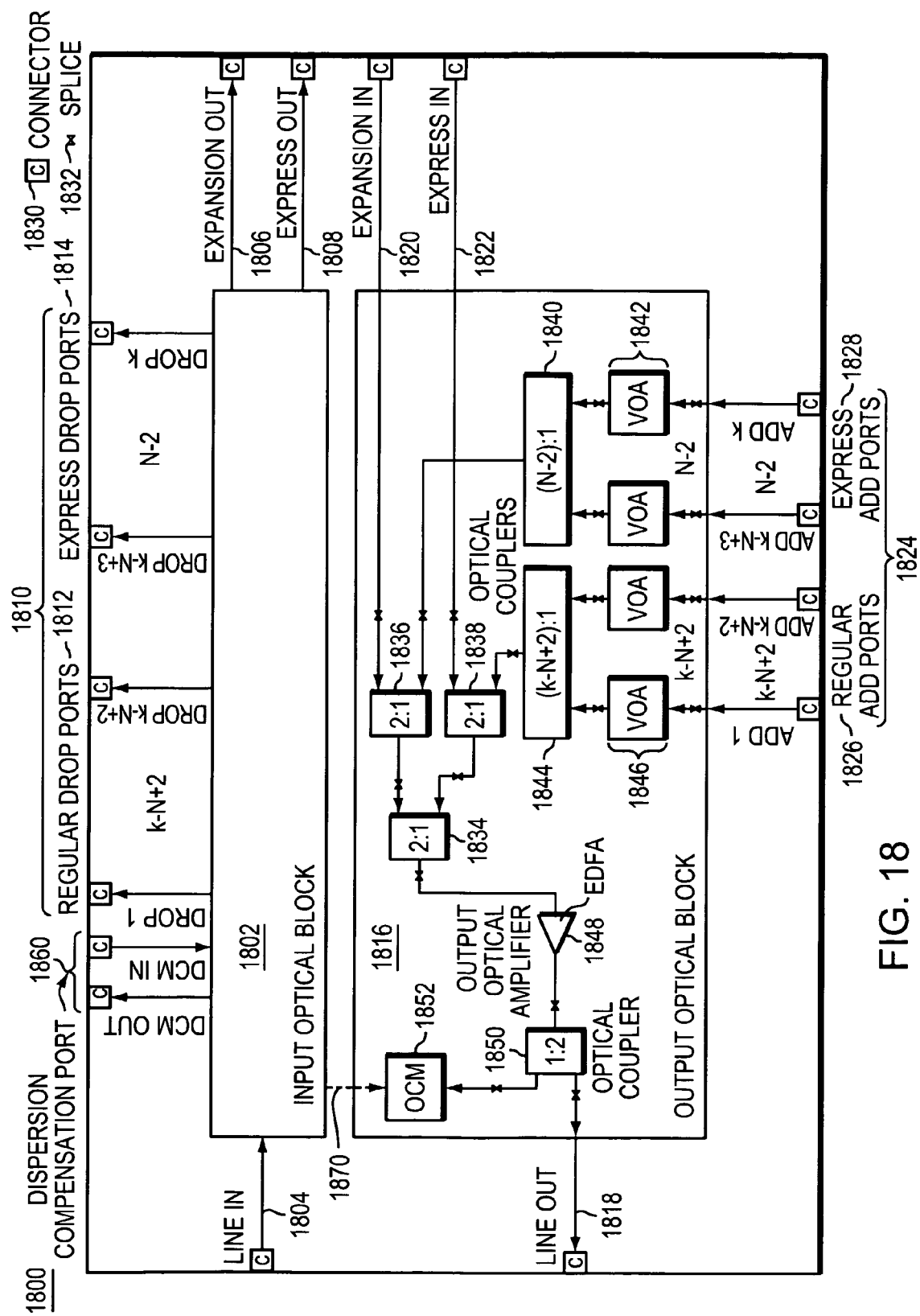
FIG. 18 is a block diagram depicting a ROADM illustrating an input optical block supporting example embodiments of the present invention.

FIG. 18 illustrates an example embodiment of a ROADM 1800, which is a general implementation of the more detailed various example embodiments shown with reference to FIGS. 19-22. ROADM 1800 includes an input optical block 1802 coupled to a DWDM line input interface 1804, an expansion output interface 1806, an express output interface 1808, and k drop (output) ports 1810. At least a subset of the k drop ports 1810 may be regular drop ports 1812. At least a subset of the k drop ports 1810 may be express drop ports 1814. An express drop port 1814 can operate as either a dedicated drop port (defined as a port which is only operable to transmit a single wavelength at any given time), or an express output port (defined as a port which is operable to simultaneously transmit multiple wavelengths). In contrast, a regular drop port 1812 can only operate as a dedicated drop port.

In ROADM 1800, there are k−N+2 regular drop ports and N−2 express drop ports, where N is the degree of the ROADM 1800 configuration. In order to allow an express drop port 1814 to operate as an express output port, the optical power level emitted from an express drop port 1814 may be substantially higher than the optical power level emitted from a regular (dedicated) drop port 1812.

Various interfaces provide various connections to the ROADM 1800. DWDM line input interface 1804 provides a connection to a DWDM network for receipt of a signal having at least one wavelength from the DWDM network. Expansion output interface 1806 provides a connection to an expansion module for expanding the functionality of the ROADM 1800 in that the connection can provide transmittal of a signal having at least one wavelength to the expansion module.

The expansion output interface 1806 can expand the functionality of the ROADM 1800 as follows. Through its connection to an expansion module, the expansion output interface 1806 can provide the ability to increase the number of drop ports beyond k, the illustrated number of drop ports. In ROADM 1800, an expansion module, which includes e expansion ports, can be connected to expansion output interface 1806. In an example embodiment, the expansion module can advantageously provide additional colorless drop ports to a previously deployed ROADM, and, thus, be referred to as a colorless port expansion module. In another example embodiment, the expansion module can advantageously provide additional colored drop ports to a previously deployed ROADM, and, thus, be referred to as a colored port expansion module.

The express output interface 1808 provides a connection to an express input interface of another ROADM within the same node. Through its connection, the express output interface 1808 can provide transmittal of a signal having at least one wavelength to the express input interface 1808 or an express add port of another ROADM within the same node.

Each of the regular (dedicated) drop ports 1812 allow dropping (i.e., transmitting) of a signal having a single wavelength from the ROADM 1800. Therefore, the receiver of an optical transponder may be attached to a regular (dedicated) drop port.

Each express drop port 1814 provides a connection to an express input port or an express add port of another ROADM within the same node. When operating as drop ports, each of the express drop ports 1814 provides transmittal of a signal having a single wavelength from the ROADM 1800. Therefore, the receiver of an optical transponder may be attached to an express drop port that is operating as a drop port. When operating as an express output port, each express drop port 1814 provides a connection to an express input interface or an express add port of another ROADM within the same node.

The ROADM 1800 also includes an output optical block 1816 which can be coupled to a DWDM line output interface 1818, an expansion input interface 1820, an express input interface 1822, and k add (input) ports 1824. At least a subset of the k add ports 1824 may be regular (dedicated) add ports 1826. A regular (or dedicated) add port 1826 is an add port which is only operable to transmit a single wavelength at any given time. Another subset of the k add ports 1824 may be express add ports 1828. An express add port 1824 may operate as either a dedicated add port or an express input port (defined as a port which is operable to simultaneously transport multiple wavelengths). In this example embodiment, there are k−N+2 regular add ports and N−2 express add ports, where N is the number of degrees supported by the ROADM. In order to allow an express add port 1828 to operate as an express input port, the insertion loss from an express add port 1828 to the input of an output optical amplifier 1848 may be substantially less than the insertion loss from a regular (dedicated) add port 1826 to the input of the output optical amplifier 1848. DWDM line output interface 1818 provides a connection to a DWDM network for transmittal of a signal having at least one wavelength to the DWDM network.

Expansion input interface 1820 provides a connection to an expansion module for expanding the functionality of the ROADM 1800. Through its connection, expansion input interface 1820 can provide receipt of a signal having at least one wavelength from an expansion module.

The expansion input interface 1820 can expand the functionality of the ROADM 1800 as follows. Through its connection to an expansion module (not shown), expansion input interface 1820 can provide the ability to increase the number of add ports 1824 beyond k, the illustrated number of add ports. In ROADM 1800, the expansion module, which includes e expansion ports, can be connected to expansion input interface 1820. In an example embodiment, the expansion module may be a colorless port expansion module that provides additional colorless add ports to a previously deployed ROADM. In another example embodiment, the expansion module may be a colored port expansion module that provides additional colored add ports to a previously deployed ROADM.

The express input interface 1822 provides a connection to an express output interface or an express drop interface of another ROADM within the same node. Through its connection, express input interface 1822 can provide receipt of a signal having at least one wavelength from the express output interface of another ROADM within the same node.

Each of the regular (dedicated) add ports 1826 allow adding (i.e., receiving) a signal having a single wavelength to the ROADM 1800. Therefore, the transmitter of an optical transponder may be attached to a regular (dedicated) add port.

Each of the express add ports 1828 provides a connection to an express output port or an express drop port of another ROADM within the same node. When operating as an add port, each of the express add ports 1828 provides receipt of a signal having a single wavelength. When operating as an express port, each of the express add ports provides a connection to an express output interface or an express drop interface of another ROADM within the same node. Through its connection, express add port 1828 can provide receipt of a signal having at least one wavelength from the express output interface of another ROADM within the same node.

In output optical block 1816, optical couplers 1834, 1836, and 1838 may couple optical signals transmitted from the expansion input interface 1820, the express input interface 1822, and the k add ports 1824. Details on how this may be done, according to an example embodiment, are as follows. Optical coupler 1834 receives and couples signals transmitted from optical couplers 1836 and 1838. Optical coupler 1836 receives and couples signals transmitted from expansion input 1820 and optical coupler 1840. Optical coupler 1840 receives and couples signals transmitted from express add ports 1828, after each of the signals passes through a VOA 1842, which may attenuate the signal. Optical coupler 1838 receives and couples signals transmitted from express input 1822 and optical coupler 1844. Optical coupler 1844 receives and couples signals transmitted from regular (dedicated) add ports 1826, after each of the signals passes through one of the variable optical attenuators 1846 (where the signal may be attenuated).

Couplers 1840 and 1844 are equal split couplers, while couplers 1834, 1836, and 1838 may be equal or non-equal split couplers. For the case of an equal split N-to-1 coupler, the signal path from each of the N inputs to the single output typically have substantially the same insertion loss. For the case of a non-equal split coupler, the signal paths through the coupler typically have substantially different insertion losses. The signal from optical coupler 1834 is transmitted to and received at the output optical amplifier 1848 (where it may be amplified) and is transmitted to and split into two signals at optical coupler 1850. One signal resulting from the split is transmitted to DWDM line output 1818; another signal is transmitted to an optical channel monitor (OCM) 1852, where the it may be monitored on a per wavelength basis. The output optical amplifier 1848 may be an EDFA in an example embodiment or other suitable amplifier. Connectors 1830 and optical splices 1832 may used for optical coupling at interfaces or may be disposed between optical fibers connecting any two interfaces.

Example functionality provided by the ROADM 1800 may include: full optical drop-and-continue support on all drop ports of the ROADM; greater than 2-degree node operation (e.g., 4-degree operation); expansion port support; and dispersion compensation module ports for all reach applications. To provide this functionality, certain intranode optical power level specifications for the various interfaces may be observed, such as the values enumerated in Table 1.

The values shown in Table 1 may be associated with an existing ROADM where the input optical block is implemented using an optical architecture different than those described here. To interoperate with the existing ROADM when placed within the same optical node, ROADMs of differing architecture should have optical interfaces that are compatible with the optical interfaces of the existing ROADM. Although Table 1 indicates specific example optical power levels, other suitable power levels can be specified.

TABLE 1

Intranode Optical Power Level Specifications

| Interface | Minimum Optical Power Level |
|---|---|
| Express Output | −6.4 dBm |
| Express Input | −6.4 dBm |
| Expansion Output | −10.8 dBm |
| Expansion Input | −10.0 dBm |
| Express Drop Ports | −6.4 dBm |
| Regular Drop Ports | −12.9 dBm |
| Regular Add Port | +3 dBm |
| Express Add Port | −6.4 dBm |
| Signal to OCM | −15 dBm |

Optical Input Blocks for ROADMs Using 1×N WSS Devices

In the input optical blocks shown in FIGS. 19, 20, and 20A-20E, signals may be received at a DWDM line input interface (such as DWDM line input interface 1804 of FIG. 18), processed by various components, and transmitted to: an express output interface (such as the express output interface 1808 of FIG. 18); an expansion output interface (such as for example the expansion output interface 1806 of FIG. 18); and drop ports (such as drop ports 1810 of FIG. 18). Details on how this may be done, according to various example embodiment, are as follows.

Figure 19:
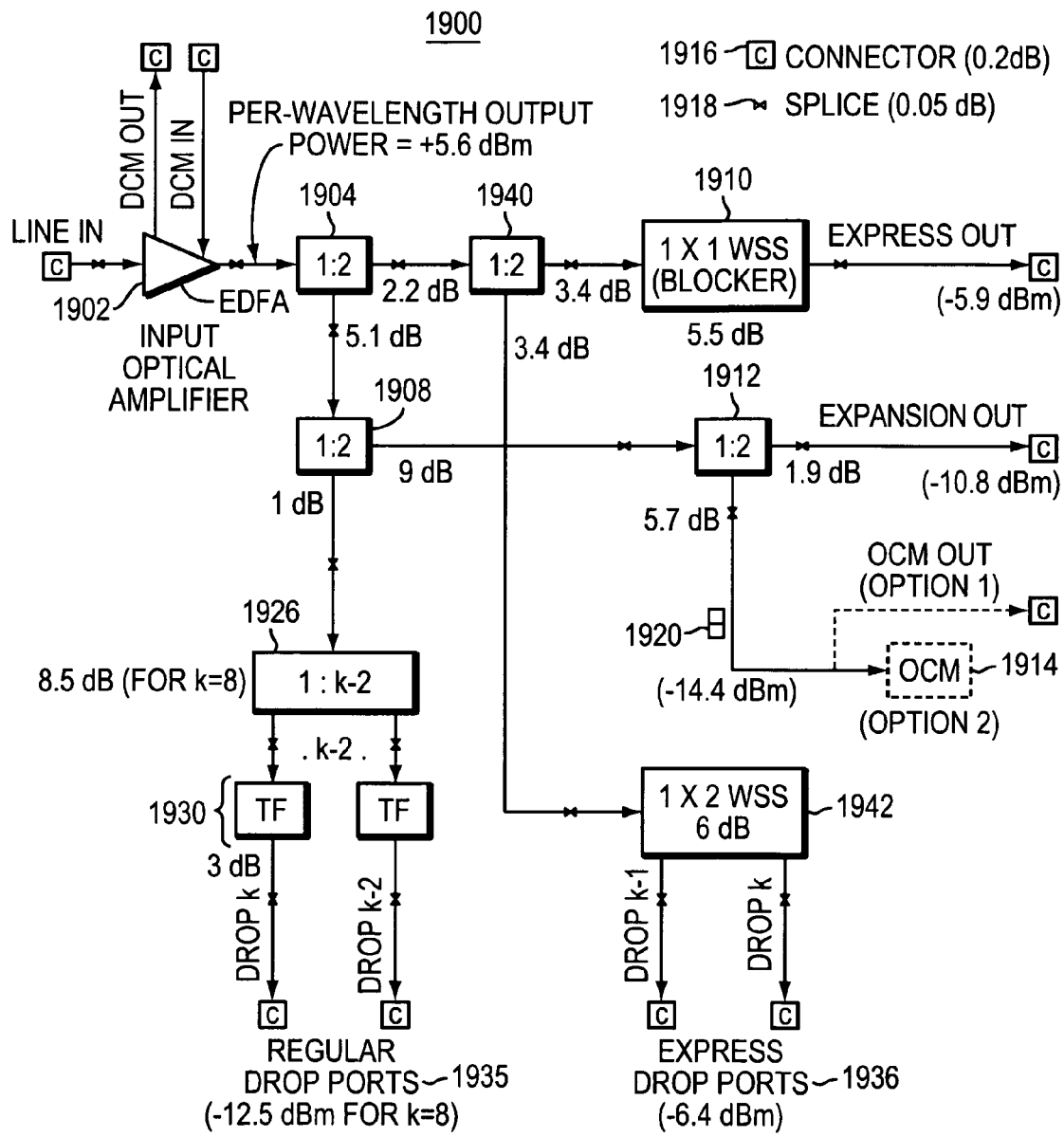
FIGS. 19 and 20A-20E are block diagrams illustrating alternative input optical blocks suitable for use with the ROADM shown in FIG. 18.

FIG. 19 is a block diagram of an input optical block 1900, which receives a signal via a DWDM line input interface "LINE IN" at an input optical amplifier 1902, which may amplify the signal. The signal is then transmitted to optical coupler 1904 where it is split into two signals. One of the signals resulting from the split is transmitted to optical coupler 1940 and the other signal is transmitted to optical coupler 1908. Connectors 1916 and optical splices 1918 may used for optical coupling at interfaces or may be disposed between optical fibers connecting any two interfaces.

At optical coupler 1940, the received signal is again split into two signals. One of the signals resulting from the split is transmitted to a WSS 1910 and the other signal is transmitted to a WSS 1942. At WSS 1910, certain individual wavelengths may be blocked so that signals made of only certain other wavelengths may be transmitted to an express output interface. At WSS 1942, certain signals each made of an individual wavelength may be selected and subsequently dropped (i.e., transmitted from the ROADM) through express drop ports 1936.

At optical coupler 1908, the received signal is split into two signals. One of the signals resulting from the split is transmitted to optical coupler 1912. The other signal resulting from the split is transmitted to optical coupler 1926.

At optical coupler 1926, the signal is divided into multiple signals, where each signal includes one or more wavelengths. Each signal is transmitted to a tunable filter 1930, which may select and drop (i.e., transmit from the ROADM) certain signals through regular (dedicated) drop ports 1935. Each tunable filter 1930 can be tuned to pass a single specific wavelength and block all other wavelengths.

At optical coupler 1912, the received signal is split into two signals. One of the signals resulting from the split is transmitted to an expansion output interface. The other signal 1920 is transmitted to an optical channel monitor (OCM) 1914 where the signal 1920 may be monitored on a per wavelength basis.

For intermediate reach applications, amplifier 1902 may be a fixed gain amplifier with a gain of 26.2 dB and a saturated output power of 22 dBm. Alternatively, amplifier 1902 may be a variable gain amplifier with a maximum gain of 32.2 dB and a saturated output power of 22 dBm.

Figure 20A:
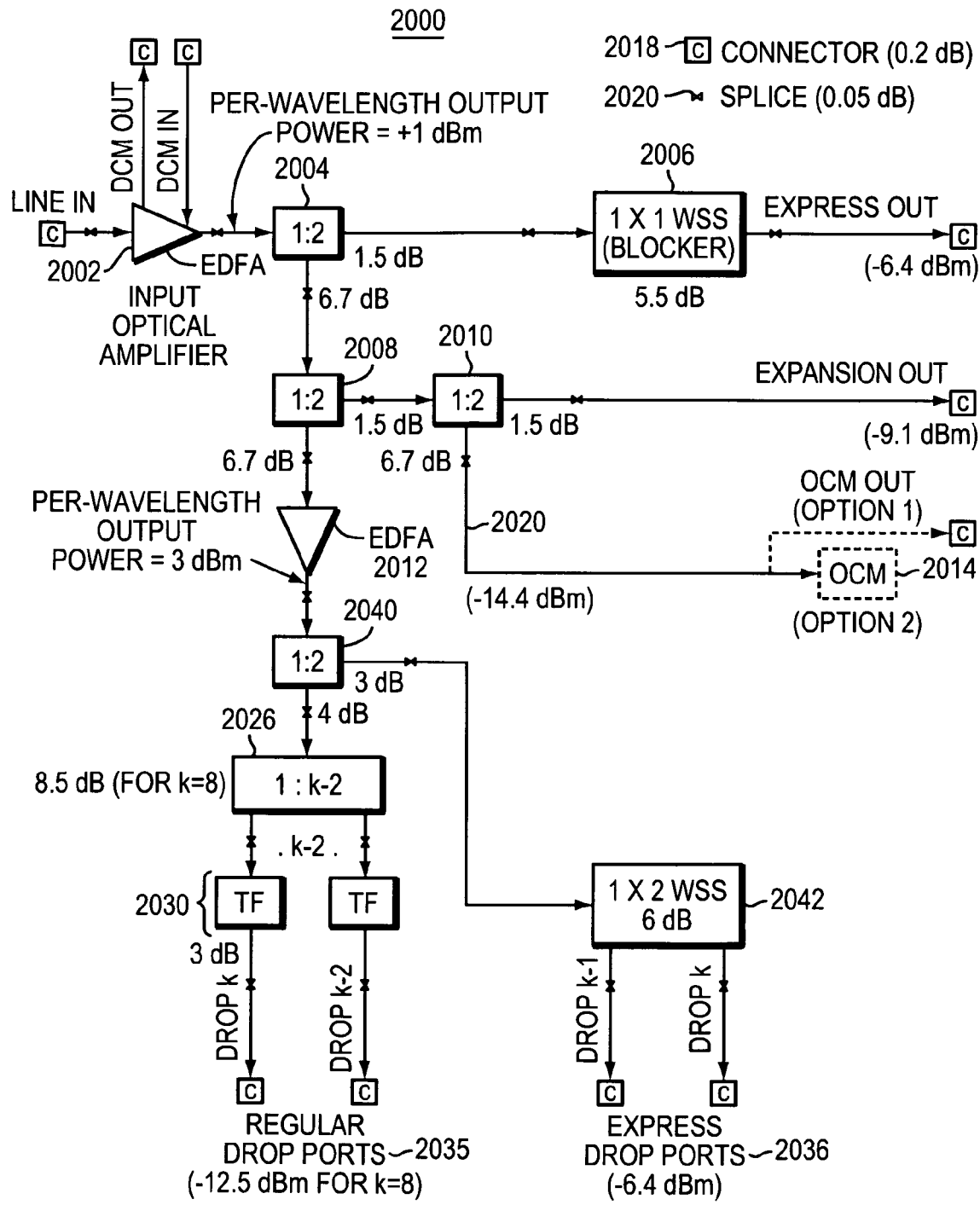

FIG. 20A is a block diagram of an alternative input optical block 2000, which receives a signal via a DWDM line input interface. The signal is coupled to an input optical amplifier 2002, which amplifies the signal and transmits the amplified signal to an optical coupler 2004, which splits the amplified signal into two signals. For intermediate reach applications, the input optical amplifier 2002 may be a fixed gain amplifier with a gain of 21.5 dB and a saturated output power of 17.5 dBm. Of course, amplifiers with different gains and saturated output powers may be employed in other example embodiments.

One of the signals resulting from the split is transmitted to a 1×1 WSS 2006 and the other signal is transmitted to an optical coupler 2008. At the WSS 2006, certain individual wavelengths may be blocked so that only certain other wavelengths may be transmitted to an express output interface. Connectors 2018 and optical splices 2020 may be used for optical coupling at interfaces or may be disposed along optical fibers connecting any two interfaces.

At optical coupler 2008, the received signal is split into two signals. One of the signals resulting from the split is transmitted to an optical coupler 2010 and the other signal is transmitted to an amplifier 2012 where it may be amplified. The drop optical amplifier 2012 may have a gain of 15.6 dB and a saturated output power of 19.5 dBm. At the optical coupler 2010, the received signal is split into two signals. One of the signals resulting from the split is transmitted to an expansion output interface. The other signal is transmitted to an OCM 2014 where the signal may be monitored on a per wavelength basis.

After transmittal to amplifier 2012, the signal is transmitted to optical coupler 2040. At optical coupler 2040, the received signal is split into two signals. One of the signals is transmitted to a 1×2 WSS 2042 and the other signal is transmitted to an optical coupler 2026.

At optical coupler 2026, the signal is divided into multiple signals, each signal including one or more wavelengths. Each of the signals is transmitted to a tunable filter 2030 where certain signals may be selected and subsequently dropped (i.e., transmitted from the ROADM) through regular (dedicated) drop ports 2035. Each tunable filter 2030 can be tuned to pass a single specific wavelength and block all other wavelengths.

The input optical block 1900 also includes reconfigurable express drop ports 2036, which can operate as either regular (dedicated) drop ports 2035 or express ports as described above with reference to FIG. 19. In FIG. 20A, for example, the WSS 2042 provides two express drop ports 2036 couple that may operate as regular (dedicated) drop ports or express ports. Because the ROADM 1800 of FIG. 18 and the input optical block 2000 of FIG. 20A have three express ports, they can be used to support a ROADM node containing up to four degrees.

In FIG. 20A, a 1×3 WSS device is formed by coupling 1×1 WSS device 2006 in parallel with 1×2 WSS device 2042 and optical couplers 2004, 2008, and 2040. An embedded optical amplifier 2012 in the path leading to the 1×2 WSS device amplifies wavelengths exiting the 1×2 WSS portion of the overall 1×3 WSS. Larger or smaller WSS device can be created by coupling any number of 1×N smaller WSS devices in parallel. Thus, the input optical block 2000 illustrates another aspect of this invention—the ability to selectively amplify the wavelengths destined for specific outputs of the overall larger 1×N WSS while not amplifying wavelengths destined for other outputs of the overall larger 1×N WSS device.

As shown in FIG. 20A, the insertion loss from the output of amplifier 2012 to the express drop ports 2036 (9.3 dB) is substantially less than the insertion loss from the output of amplifier 2012 to the regular (dedicated) drop ports 2035 (15.9 dB). When the express drop ports 2036 are connected to a receiver of a transponder (not shown), the express drop ports 2036 operate as regular (dedicated) drop ports and each drop only a single wavelength.

Figure 20B:
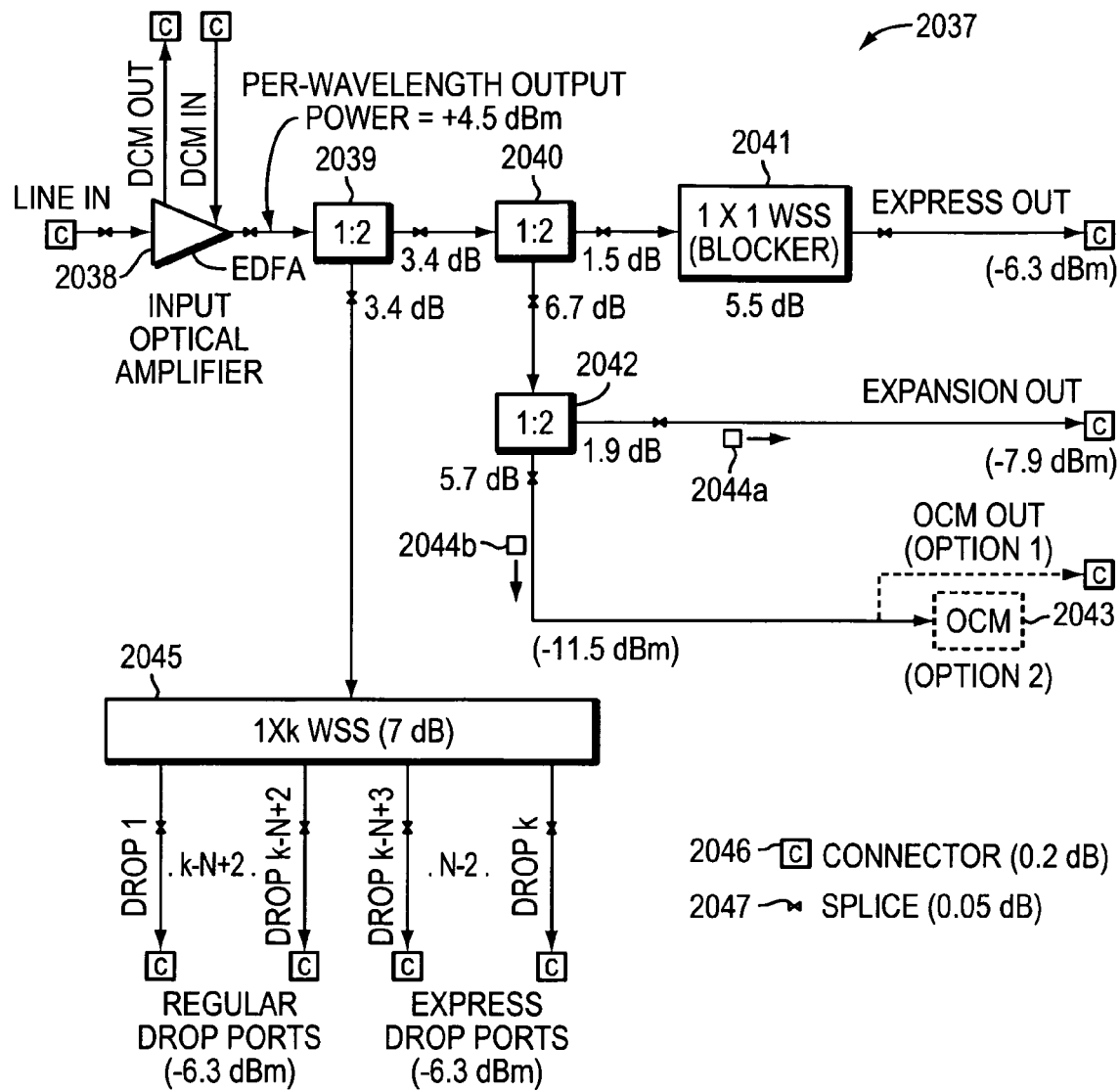

FIG. 20B shows an input optical block 2037 that receives a signal via a DWDM line input interface to an amplifier 2038 (where it may be amplified). For intermediate reach applications, the amplifier 2038 may be a fixed gain amplifier with a gain of 25 dB and a saturated output power of 21 dBm. For long reach applications, the amplifier 2038 may be a variable gain amplifier with a maximum gain of 31 dB and saturated output power of 21 dBm.

Next, the signal is transmitted to an optical coupler 2039, where it is split into two signals. One of the signals resulting from the split is transmitted to a first WSS 2045, and the other signal is transmitted to another optical coupler 2040, which may be connected using connectors 2046 or optical splices 2047. At the first WSS 2045, certain signals each made of an individual wavelength may be selected and subsequently dropped (transmitted from the ROADM) through drop ports.

The optical coupler 2040 splits the received signal into two signals. One of the signals resulting from the split is transmitted to a second WSS 2041, and the other signal is transmitted to an optical coupler 2042. At the second WSS 2041, certain individual wavelengths may be blocked so that only certain other wavelengths may be transmitted to an express output interface. At the optical coupler 2042, the received signal is split into two signals. One of the signals 2044a resulting from the split is transmitted to an expansion output interface. The other signal 2044b is transmitted to an OCM 2043, where the signal may be monitored on a per wavelength basis.

There are two types of drop ports exiting from the 1×k WSS 2045: regular drop ports and express drop ports. No more than a single wavelength is forwarded from the WSS 2045 to each regular drop port. An optical transponder may be attached directly to a regular drop port. The express drop ports have two modes of operation: mode 1 and mode 2. When operating in mode 1, no more than a single wavelength is forwarded from the WSS 2045 to each express drop port. When operating in mode 1, an optical transponder may be attached directly to the express drop port. In contrast, when operating in mode 2, one or more wavelengths may be forwarded to a given express drop port. When operating in mode 2, each express drop port operates as an output express port, which can be connected to an express input port (such as 1822 in FIG. 18) or an express add port (such as 1828 in FIG. 18).

In a given ROADM, two per-wavelength filter bandwidths may be deployed: a drop filter bandwidth and an express filter bandwidth, where the drop filter bandwidth may be narrower than the express filter bandwidth. A wider filter bandwidth is used in the express path in order to prevent excessive filter narrowing that may result when passing a wavelength through the express paths of multiple ROADMs. Using a narrower filter bandwidth in the drop path limits the amount of noise seen by the receiver of a given optical transponder.

The 1×1 WSS 2041 uses wider express filter bandwidths. Because optical transponders are attached to the regular drop ports associated with the WSS 2045, the narrower drop filter bandwidths may be used for these regular drop ports. Since the express drop ports can either operate as either regular drop ports (attached directly to optical transponders) or express ports (used to interconnect to other ROADMs), the ports of WSS 2045 attached to the express drop ports can include both narrowband and wideband filters associated with each wavelength. When operating in mode 1, the express drop ports use narrowband filters within the WSS 2045; when operating in mode 2, the express drop ports use wideband filters within the WSS 2045.

Because the insertion losses from the input port of a WSS to a given output port of the WSS may be the same, express ports operating as drop ports and regular drop ports may also have similarly low insertion losses. This makes it possible to achieve low insertion losses for express drop ports operating as express ports. To prevent optical overload of the receiver within an optical transponder, EVOAs within the WSS are used to provide additional attenuation of the signals exiting the regular drop ports and the express drop ports operating as drop ports.

Figure 20C:
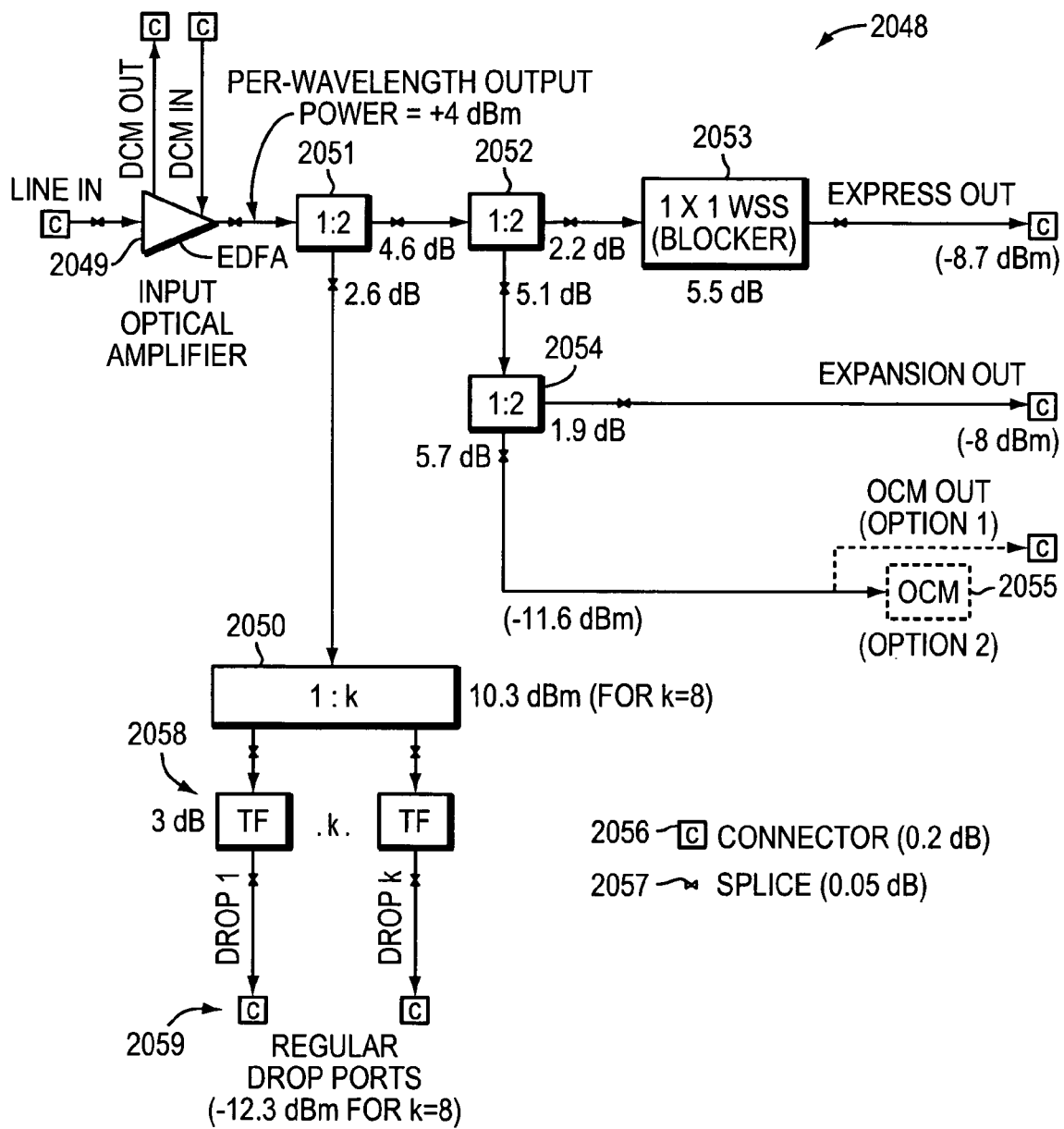

FIG. 20C shows an example embodiment input optical block 2048 that receives a signal via a DWDM line input interface connected to an amplifier 2049, which may amplify the signal. For intermediate-reach applications, the amplifier 2049 may be a fixed-gain amplifier with a gain of 24.6 dB and a saturated output power of 20.5 dBm. For long-reach applications, the amplifier 2049 may be a variable gain amplifier with a maximum gain of 30.6 dB and a saturated output power of 20.5 dBm.

Next, the signal is transmitted to an optical coupler 2051, where it is split into two signals. One of the signals resulting from the split is transmitted to an optical coupler 2050 and the other signal is transmitted to another optical coupler 2052. Connectors 2056 and optical splices 2057 may be used for optical coupling at interfaces or may be disposed between optical fibers connecting any two interfaces.

At the optical coupler 2050, the signal is divided into multiple signals, each signal consisting of one or more wavelengths. Each of the signals is transmitted to a tunable filter 2058 where certain signals may be selected and subsequently dropped (transmitted from the ROADM) through regular drop ports 2059. Each tunable filter can be tuned to pass a single specific wavelength and block all other wavelengths.

At the optical coupler 2052, the received signal is split into two signals. One of the signals resulting from the split is transmitted to a WSS 2053 and the other signal is transmitted to an optical coupler 2054. At the WSS 2053, certain individual wavelengths may be blocked so that only certain other wavelengths may be transmitted to an express output interface. At the optical coupler 2054, the received signal is split into two signals. One of the signals resulting from the split is transmitted to an expansion output interface. The other signal is transmitted to an OCM 2055, where the signal may be monitored on a per wavelength basis.

In the input optical block 2048, there are no express drop ports, only regular drop ports and a single dedicated express output port. The WSS 2053 is equipped with wideband filters to avoid filter narrowing effects on wavelengths passing through the ROADM. In contrast, the tunable filters 2058 include narrower filter bandwidths to limit the amount of noise seen by the receivers of the optical transponders (not shown) attached to the drop ports.

Figure 20D:
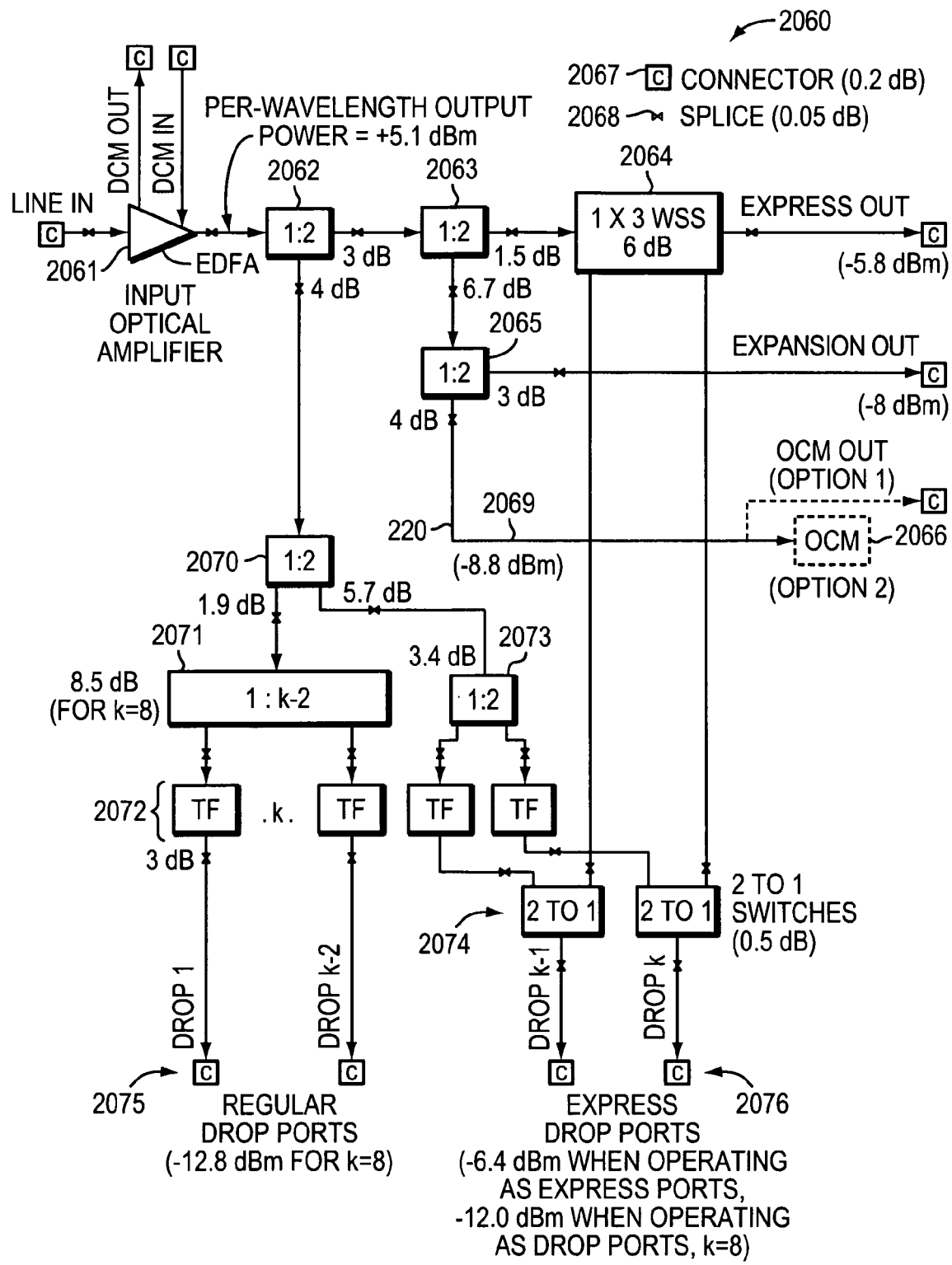

FIG. 20D shows an example embodiment input optical block 2060, which receives a signal transmitted via a DWDM line input interface to an amplifier 2061 (where it may be amplified). For intermediate-reach applications, the amplifier 2061 may be a fixed-gain amplifier with gain of 25.7 dB and a saturated output power of 21.5 dBm. For long-reach applications, the amplifier 2061 may be a variable gain amplifier with a maximum gain of 31.7 dB and a saturated output power of 21.5 dBm. Next, the signal is transmitted to an optical coupler 2062 where it is split into two signals. One of the signals resulting from the split is transmitted to an optical coupler 2070 and the other signal is transmitted to another optical coupler 2063.

At the optical coupler 2063, the received signal is split into two signals. One of the signals resulting from the split is transmitted to a 1×3 WSS 2064 and the other signal is transmitted to an optical coupler 2065. At the WSS 2064, certain individual wavelengths may be blocked so that signals made of only certain other wavelengths may be transmitted to either an express output interface or 2-to-1 switches 2074.

At the optical coupler 2065, the received signal is split into two signals. One of the signals resulting from the split is transmitted to an expansion output interface. The other signal is transmitted to an OCM 2066 (where the signal may be monitored on a per wavelength basis).

At the optical coupler 2070, the signal is split into two signals. One of the signals resulting from the split is transmitted to an optical coupler 2071 and the other signal is transmitted to another optical coupler 2073. Connectors 2067 and optical splices 2068 may be used for optical coupling at interfaces or may be disposed between optical fibers connecting any two interfaces.

At the optical coupler 2071, the signal is divided into multiple signals, each signal consisting of one or more wavelengths. Each of the signals is transmitted to a tunable filter 2072 where certain signals may be selected and subsequently dropped (transmitted from the ROADM) through regular drop ports 2075. Each tunable filter 2072 can be tuned to pass a single specific wavelength and block all other wavelengths.

At the optical coupler 2073, the signal is split into multiple signals, each signal made of an individual wavelength. Each of the signals is transmitted to a tunable filter 2072 where a certain signal may be selected, combined with a signal (transmitted from the WSS 2064) at a switch 2074, and then dropped (i.e., transmitted from the ROADM) through express drop ports 2076. Each tunable filter 2072 can be tuned to pass a specific wavelength and block all other wavelengths.

The input optical block 2060 includes both regular drop ports 2075 and express drop ports 2076. The insertion loss from the output of the input optical amplifier 2061 to the drop ports 2075 and 2076 may be less for certain ports and more for other ports. For this case, ports with the higher insertion loss could be designated as regular drop ports 2075, and ports with lower insertion loss could be designated as express drop ports 2076.

As shown in FIG. 20D, there are two paths from the output of the input optical amplifier 2061 to the express drop ports, with different insertion losses for each of the two paths. The insertion loss from the output of the input optical amplifier 2061 through to the express drop ports 2076 through the optical coupler 2070 is 17.1 dB, while the insertion loss from the output of the input optical amplifier 2061 through to the express drop ports 2076 through the WSS 2064 is 11.5 dB.

When an express drop port 2076 operates as an express port, the switch 2074 associated with the express drop port 2076 is configured to select the path through the WSS 2064 (i.e., the lower insertion path). If the WSS 2064 does not support an optical broadcast function, however, the path through the WSS 2064 does not support optical drop and continue because the WSS 2064 can only direct a given wavelength to either the "Express Out" port or an express drop port 2076. Therefore, when optical drop and continue is needed on an express drop port 2076, the path through the optical coupler 2070 may be selected by the associated optical switch 2074.

The filter bandwidths associated with the three output ports of the WSS 2064 may all be wideband filters because the output ports of the WSS 2064 operate as express ports whenever wavelengths exit any of the three output ports of the WSS 2064. For the case where a given express drop port 2076 operates as an express port, the associated 2×1 switch will select the path associated with the WSS 2064 and not that of the tunable filter 2072, and, therefore, wavelengths exiting the express drop ports 2076 will traverse through the wider bandwidth filters of the WSS.

All of the tunable filters 2072 (i.e., those associated with both the regular drop ports and the express drop ports) act as narrowband filters. When a given express drop port 2076 operates as a drop port, the associated 2×1 switch selects the path associated with the tunable filter 2072, not that of the WSS 2064. As a result, wavelengths exiting the express drop ports 2076 traverse through the narrowband tunable filters 2072.

Figure 20E:
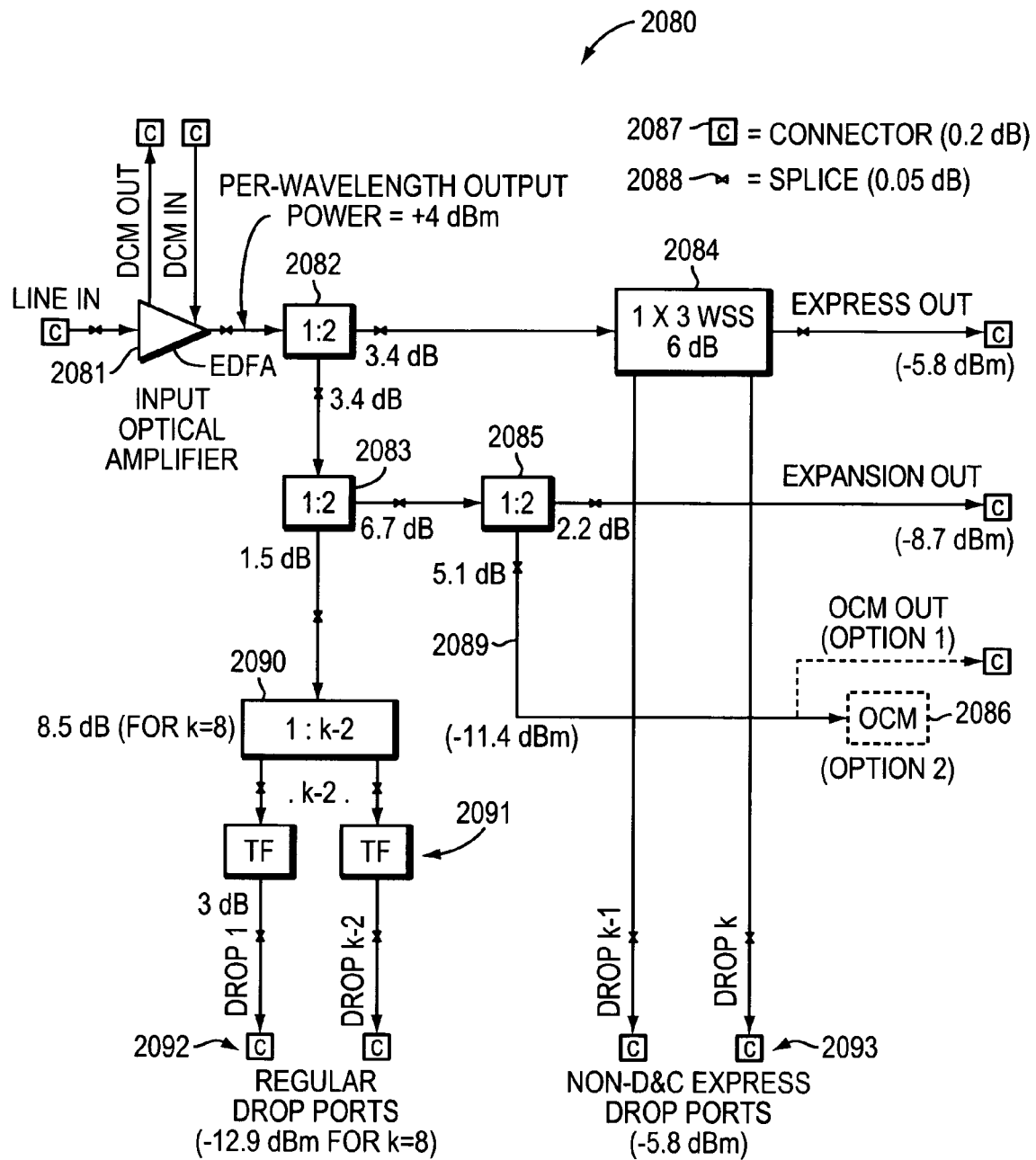

FIG. 20E shows an example embodiment input optical block 2080, which receives a signal transmitted from a DWDM line input interface to amplifier 2081 (where it may be amplified). For intermediate-reach applications, the amplifier 2081 may be a fixed gain amplifier with a gain of 23.8 dB and a saturated output power of 20 dBm. For long-reach applications, the amplifier 2081 may be a variable gain amplifier with a maximum gain of 29.8 dB and a saturated output power of 20 dBm.

Next, the signal is transmitted to an optical coupler 2082 where it is split into two signals. One of the signals resulting from the split is transmitted to a 1×3 WSS 2084 and the other signal is transmitted to an optical coupler 2083. Connectors 2087 and optical splices 2088 may be used for optical coupling at interfaces or may be disposed between optical fibers connecting any two interfaces.

At the WSS 2084, certain individual wavelengths may be blocked so that signals made of only certain other wavelengths may be transmitted to either an express output interface or non-drop-and-continue express drop ports 2093. If the WSS 2084 is a traditional WSS, then it can forward a given wavelength to only one of the three output ports. If one or both of the non-drop-and-continue express drop ports 2093 operate as drop ports, then a given wavelength can only be forwarded to the express out port of the ROADM; it cannot be dropped to a non-drop-and-continue express drop port 2093 operating as a drop port as well. However, since a given wavelength can be sent to both a regular drop port and the WSS 2084 (via coupler 2082), the regular drop ports 2092 can support an optical drop-and-continue function to either the dedicated express output port or to either of the non-drop-and-continue express drop ports 2093 operating as express ports.

At the optical coupler 2083, the received signal is split into two signals. One of the signals resulting from the split is transmitted to an optical coupler 2090 and the other signal is transmitted to another optical coupler 2085.

At the optical coupler 2090, the signal is divided into multiple signals, where each signal may include one or more wavelengths. Each of the signals is transmitted to a tunable filter 2091 where certain signals may be selected and subsequently dropped (i.e., transmitted from the ROADM) through regular drop ports 2092. Each tunable filter 2091 can be tuned to pass a specific wavelength and block all other wavelengths.

At the optical coupler 2085, the received signal is split into two signals. One of the signals resulting from the split is transmitted to an expansion output interface. The other signal 2089 is transmitted to an OCM 2086, which may monitor the signal on a per wavelength basis.

In certain embodiment, the two WSS output ports connected to the non-drop-and-continue express drop ports 2093 each be associated with two switchable filter bandwidths: a narrower filter bandwidth (for when the port is operating as drop port), and a wider filter bandwidth (for when the port is operating as an express port). The port of the WSS 2084 connected to the dedicated express output port may be associated with the wider filter bandwidth, while the tunable filters 2091 may be associated with the narrower bandwidth.

Alternatively, the optical input blocks may not include OCMs. Instead, the signals to be monitored can be routed to an input port of a corresponding output optical block, such as the output block 1816 of FIG. 18. In this case, the signal is then routed to the OCM 1852 within the output optical block 1816. The OCM 1852 contained within the output optical block 1816 is then shared between the output optical block 1816 and the input optical block 1802. The connection 1870 for directing the signal between the input optical block to the output optical block is illustrated in FIG. 18.

Similarly, a shared OCM could be placed in the input optical block, with no OCM in the output optical channel block. In this case, an optical signal to be monitored runs from the output optical block to the OCM within the input optical block. Finally, for the case where the input optical block and output optical block are placed on the same physical pluggable (or non-pluggable) circuit pack, the OCM may be external to both the input and output optical blocks, and signals to be monitored may be routed from the input and output optical blocks to the shared OCM. The shared OCM may include one or two input ports; typically, the single-input OCM is used with a 2-to-1 optical switch coupled to the input.

Intranode Optical Power Levels for ROADMs Using 1×N WSS Devices

For the ROADM 1900, Table 2 shows that intranode optical power levels on the various interfaces meet or are sufficiently acceptable when compared to the specified intranode optical power levels of Table 1. The minimum optical power levels listed in Table 2 are for ROADM 1900; the minimum required optical power levels are for use in designing a ROADM capable of interoperating with an existing ROADM, as discussed with reference to Table 1. (In Table 2, the drop port optical power level is calculated assuming that k=8.)

TABLE 2

Intranode Optical Power Levels for the ROADM 1900

| Interface | Minimum Optical Power Level | Minimum Required Power Optical Level for RODAM Interoperability |
| --- | --- | --- |
| Express Output | −5.9 dBm | −6.4 dBm |
| Expansion Output | −10.8 dBm | −10.8 dBm |
| Express Drop Port | −6.4 dBm | −6.4 dBm |
| Regular Drop Port | −12.5 dBm | −12.9 dBm |
| Optical Channel Monitor (214 of FIG. 19) | −14.4 dBm | −15 dBm |

The optical power levels at the various interfaces are computed by starting with the per-wavelength optical power level at the output of the input optical amplifier 1902 (+5.6 dBm), and then subtracting the insertion losses of the various components leading up to the given interface. Therefore, by way of example, the optical power level at the EXPRESS OUT interface is 5.6 dBm−0.05 dB−2.2 dB−0.05 dB−3.4 dB−0.05 dB−5.5 dB−0.05 dB−0.2 dB=−5.9 dBm using the losses per path shown in FIG. 19, including splice losses of 0.05 dB and 0.2 dB for connector losses.

Drop and continue functionality implies that a given wavelength received at the line in port of the ROADM can simultaneously be transmitted to a selected drop port and an express output port. Referring to FIG. 19, the optical couplers 1904 and 1940 enable full optical drop-and-continue support on all k drop ports. This is because couplers 1904 and 1940 provide the ability to transmit all received wavelengths to both the 1×1 WSS device 1910 (continue path) and the 1×2 WSS device 1942 and 1 to k−2 optical coupler 1926 (drop path). Since a 1 to k−2 optical coupler 1926 is able to transmit a received wavelength to all of its k−2 outputs, a given wavelength received by optical coupler 1904 and 1940 can be transmitted to both the output of the 1×1 WSS 1910 and any of the k outputs of the 1 to k−2 tunable filters 1930 or 1×2 WSS 1942.

The input optical amplifier 1902 may be chosen such that the saturated output power of the amplifier is sufficient so as to meet the optical specifications of the drop ports, express output port and expansion output port, as specified in Table 1. In the embodiment depicted in FIG. 19, a per-wavelength output power level of +5.6 dBm may be required at the output of 1902 for the case where the insertion loss for the remaining components is as follows:

coupler 1904, leg 1: 2.2 dB;
coupler 1904, leg 2: 5.1 dB;
coupler 1908, leg 1: 9.0 dB;
coupler 1908, leg 2: 1.0 dB;
coupler 1940, each leg: 3.4 dB;
coupler 1912, leg 1: 1.9 dB;
coupler 1912, leg 2: 5.7 dB;
WSS 1910: 5.5 dB;
WSS 1942: 6.0 dB;
coupler 1926, each leg: 8.5 dB;
tunable filter 1930: 3.0 dB;
optical splices 1918: 0.05 dB each; and
optical connectors 1916: 0.2 dB each.

Although the insertion losses of each optical component shown in FIG. 19 are as indicated, other components with different insertion loss values may be used to construct the configuration shown in FIG. 19, as long as the saturated output power and optical gain of the input optical amplifier is adjusted up or down in order to meet the interface specifications shown in Table 3.

The ROADM configuration that includes the ROADM 1800 and the input optical block 1900 provides for greater than 2-degree node (4-degree) operation by establishing the express connections between multiple ROADMs, as was discussed above with reference to FIG. 2 (where k=8 and N=4). In order to support greater than 2-degree operation, the optical power levels of the express drop ports 1814 may be greater than or equal to the optical power level of the express out port 1808. Similarly, the insertion loss of the paths from the express add ports 1828 to the output of coupler 1834 and from the express input port 1822 to the output of coupler 1834 should each be low enough to be compensated with an output optical amplifier (not shown). To guarantee adequate compensation, the insertion loss of the paths from the express add ports 1828 to the output of coupler 1834 are substantially less than the insertion loss of the paths from the regular (dedicated) add ports 1826 to the output of coupler 1834.

Returning to FIG. 19, the 1×2 WSS 1942 provides two additional express ports 1936. When operating as express ports, multiple wavelengths may be transmitted out of each express drop port 1936 in the same or similar manner that multiple wavelengths may be transmitted out of the express out port of 1×1 WSS 1910. Similarly, when operating as express ports, the 1×2 WSS 1942 can selectively block wavelengths from exiting at express drop ports 1936 in the same or similar manner that 1×1 WSS 1910 can selectively block wavelengths from exiting the express out port of 1×1 WSS 1910.

Input optical block 1900 illustrates another aspect of this invention—the ability to simultaneously forward a given wavelength to multiple outputs of a 1×N WSS. Here, a 1×3 WSS device is formed by coupling a 1×1 WSS device 1910 and a 1×2 WSS device 1942 in parallel to an optical coupler 1940. The 1×3 WSS device can simultaneously forward a given wavelength arriving at its input to both the EXPRESS OUT (exiting WSS 1910) and one of the two EXPRESS DROP ports 1936 (exiting WSS 1942). A 1×N WSS formed using all 1×1 WSS devices and a 1-to-N optical coupler can also simultaneously forward a given wavelength entering its input to all N of its outputs.

Because the ROADM 1800 combined with the input optical block 1900 has three express ports, it can be used to support a ROADM node containing up to four degrees. As can be seen in FIG. 19, the insertion loss from the output of input amplifier 1902 to the express drop ports 1936 (12 dB) is substantially less than the insertion loss from the output of input amplifier 1902 to the regular (dedicated) drop ports 1935 (18.1 dB). When the express drop ports 1936 are connected to the receiver of a transponder, the express drop ports 1936 operate as regular (dedicated) drop ports and drop only a single wavelength. This configuration also provides dispersion compensation module supports for all reach applications by providing the dispersion compensation port (and the associated optical gain) for all input amplifier types.

In an example embodiment, the ROADM configuration that includes the ROADM 1800 and the input optical block 1900 are placed on a single pluggable circuit pack, however, other embodiments may place various components on separate circuit packs. For instance, the input and output optical amplifiers could be placed on a circuit pack (or packs) separate form the circuit pack containing the WSS devices and optical couplers.

Table 3 shows that the intranode configuration optical power levels on the various interfaces of ROADM 2000 meet or are sufficiently acceptable when compared to the given the intra-node optical power level specifications of Table 1. The minimum optical power levels listed in Table 2 are for ROADM 2000; the minimum required optical power levels are for use in designing a ROADM capable of interoperating with an existing ROADM as discussed above. (The drop port optical level is calculated for k=8.)

TABLE 3

Intranode Optical Power Levels for the ROADM 2000

| Interface | Minimum Optical Power Level | Min. Required Power Optical Level for ROADM Interoperability |
| --- | --- | --- |
| Express Output | −6.4 dBm | −6.4 dBm |
| Expansion Output | −9.1 dBm | −10.8 dBm |
| Express Drop Port | −6.4 dBm | −6.4 dBm |
| Regular Drop Port | −12.9 dBm | −12.9 dBm |
| Optical Channel Monitor (2014 of FIG. 20A) | −14.1 dBm | −15 dBm |

In a given application, the choice to implement the input optical block 1900 shown in FIG. 19 or the input optical block 2000 shown in FIG. 20A may depend partly upon the monetary cost of the one higher output power amplifier in 1900 compared to the monetary cost of the two lower power amplifiers in 2000. The choice may also partly depend upon the performance (i.e., noise figure as a function of optical gain) of the one larger amplifier compared to the performance of the two smaller amplifiers.

For example, if the optical amplifier 1902 of FIG. 19 has a higher overall noise figure than the optical amplifier 2002 of FIG. 20A and the goal is to optimize the performance of the path from line in to express out, then it may make more sense to use the block 2000 shown in FIG. 20A. However, if the amplifier 1902 in FIG. 19 is cheaper than the set of amplifiers 2002 and 2012 in FIG. 20A and the goal is to reduce cost, then it may be better to implement input optical block 1900.

Figure 21:
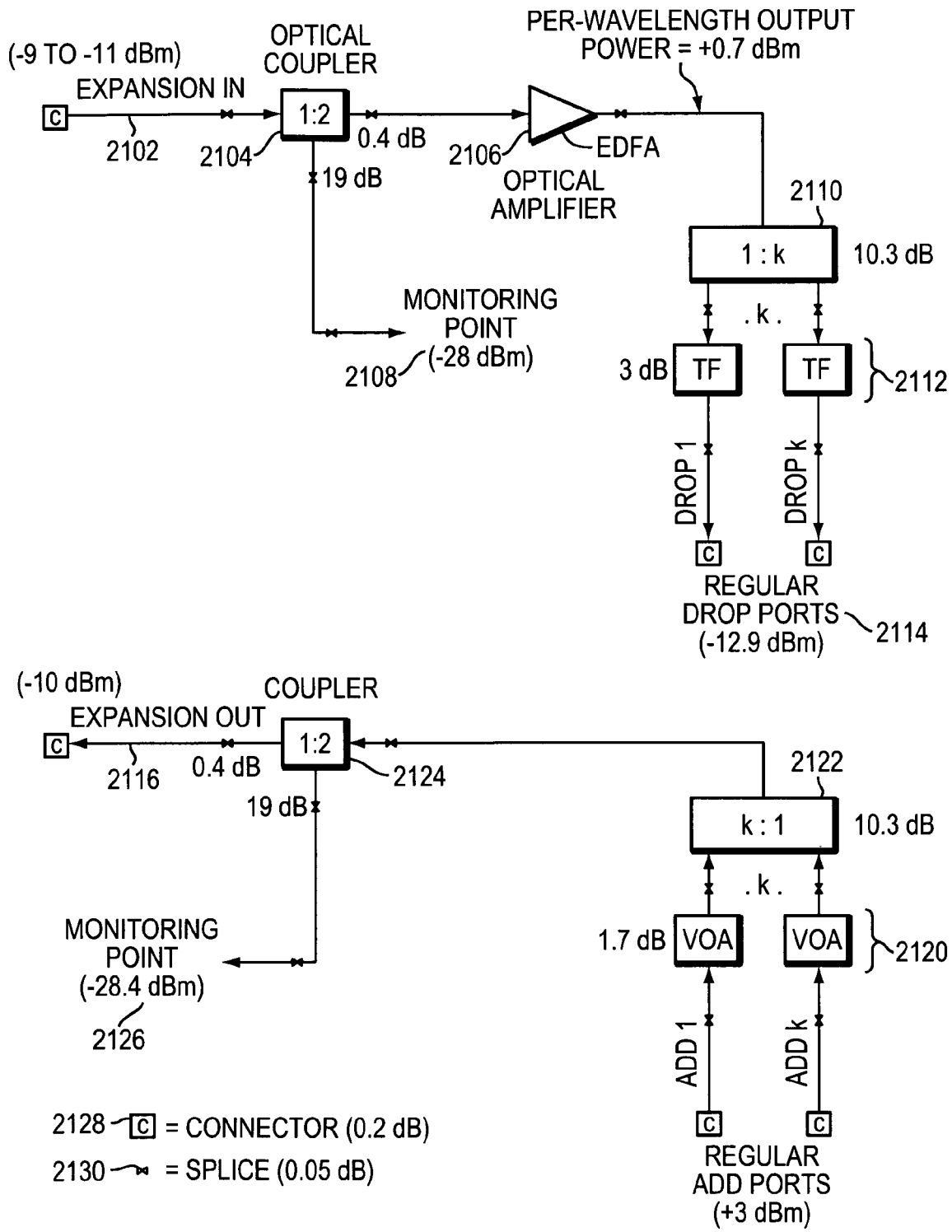
FIG. 21 is a block diagram depicting a colorless expansion module according to an example embodiment of the present invention.

FIG. 21 illustrates an example embodiment of a colorless expansion module 2100, which may be connected to a ROADM (e.g., ROADM 1800 of FIG. 18) which uses input optical block 1900 of FIG. 19 or input optical block 2000 of FIG. 20A. Expansion input interface 2102 may be connected to an expansion output interface of a ROADM (such as, for example, the expansion output interface 1806 of ROADM 1800 of FIG. 18). Signals in the colorless expansion module 2100 may be received at expansion input interface 2102, processed by various components, and transmitted to drop ports 2114.

In operation, a signal is received at expansion input interface 2102 and is transmitted to an optical coupler 2104. At the optical coupler 2104, the signal is split into two signals. One of the signals resulting from the split is transmitted to an optical amplifier 2106, where it may be amplified. The other signal is transmitted to an optical monitor 2108, where the signal may be monitored.

The amplifier 2106 transmits the signal (containing amplified wavelength(s)) to an optical coupler 2110, where an equal portion of optical power may be directed to each output of the optical coupler. Each of the signals is transmitted to a tunable filter ("TF") 2112. Each 2112 can be tuned to pass a single specific wavelength and block all other wavelengths. The individual wavelengths are then subsequently dropped through drop ports 2114. In an example embodiment TFs 2112 may be discrete tunable filters or part of a tunable filter array implemented on a common substrate (such as silicon, or some other suitable material).

In an example embodiment, the amplifier 2106 may have a gain of 10.4 to 12.4 dB for an input signal at a power of −9 to −11 dBm and saturated output power of +17 dBm. At this gain and saturated output power, the amplifier 2106 amplifies each of forty-four signals from −9.7 dBm to 0.7 dBm, for a total output power of about +17 dBm.

An expansion output interface 2116 may be connected to an expansion input interface of a ROADM (such as, for example, the expansion input interface 1820 of ROADM 1800 of FIG. 18). In the colorless expansion module 2100, signals may be received at add ports 2118, processed by various components, and transmitted to expansion output interface 2116.

In operation, signals having individual wavelengths are received at add ports 2118. The signals are transmitted to VOAs 2120 (where each signal may be attenuated) and subsequently combined at optical coupler 2122 into a single signal. The single signal exiting the optical coupler 2122 is received at optical coupler 2124, which splits the signal into two signals. One of the signals resulting from the split is transmitted to an optical monitor ("Monitoring Point") 2126, where the signal may be monitored. The other signal is transmitted to an expansion output interface 2116.

In the colorless expansion module 2100, a connector 2128 may be used at an interface to facilitate connection at that interface. Furthermore, an optical splice 2130 may be disposed along any of connection between two components, to splice the ends of two optical fibers making up at least part of the connection between the two components.

For the colorless expansion module 2100 shown in FIG. 21, Table 4 illustrates that the intranode optical power levels on the various interfaces meet or are sufficiently acceptable when compared to the specified intranode optical power levels of Table 1. The minimum optical power levels listed in Table 2 are for module 2100; the minimum required optical power levels are for use in designing a ROADM or other module capable of interoperating with an existing ROADM.

TABLE 4

Intranode Optical Power Levels for the ROADM 2100

| Interface | Minimum Optical Power Level | Minimum Required Power Optical Level for ROADM Interoperability |
| --- | --- | --- |
| Expansion Output | −10 dBm | −10 dBm |
| Regular Drop Port | −12.9 dBm | −12.9 dBm |
| Monitoring Point (2108 & 2126) in FIG. 21 | −28.4 dBm | −30 dBm |

All the optical circuitry shown in FIG. 21 may be placed on a common pluggable circuit pack, separate from the optical circuit pack containing the ROADM (2100), the ROADM 1800, and the input optical block 1900. In other embodiments, however, the optical circuitry associated with the "Expansion In" and "Expansion Out" ports of FIG. 21 may be placed on a separate pluggable circuit packs. Additionally, the ROADM that includes the ROADM 1800 and the input optical block 1900 could be placed within a standalone enclosure which does not plug into any backplane assembly.

Figure 22:
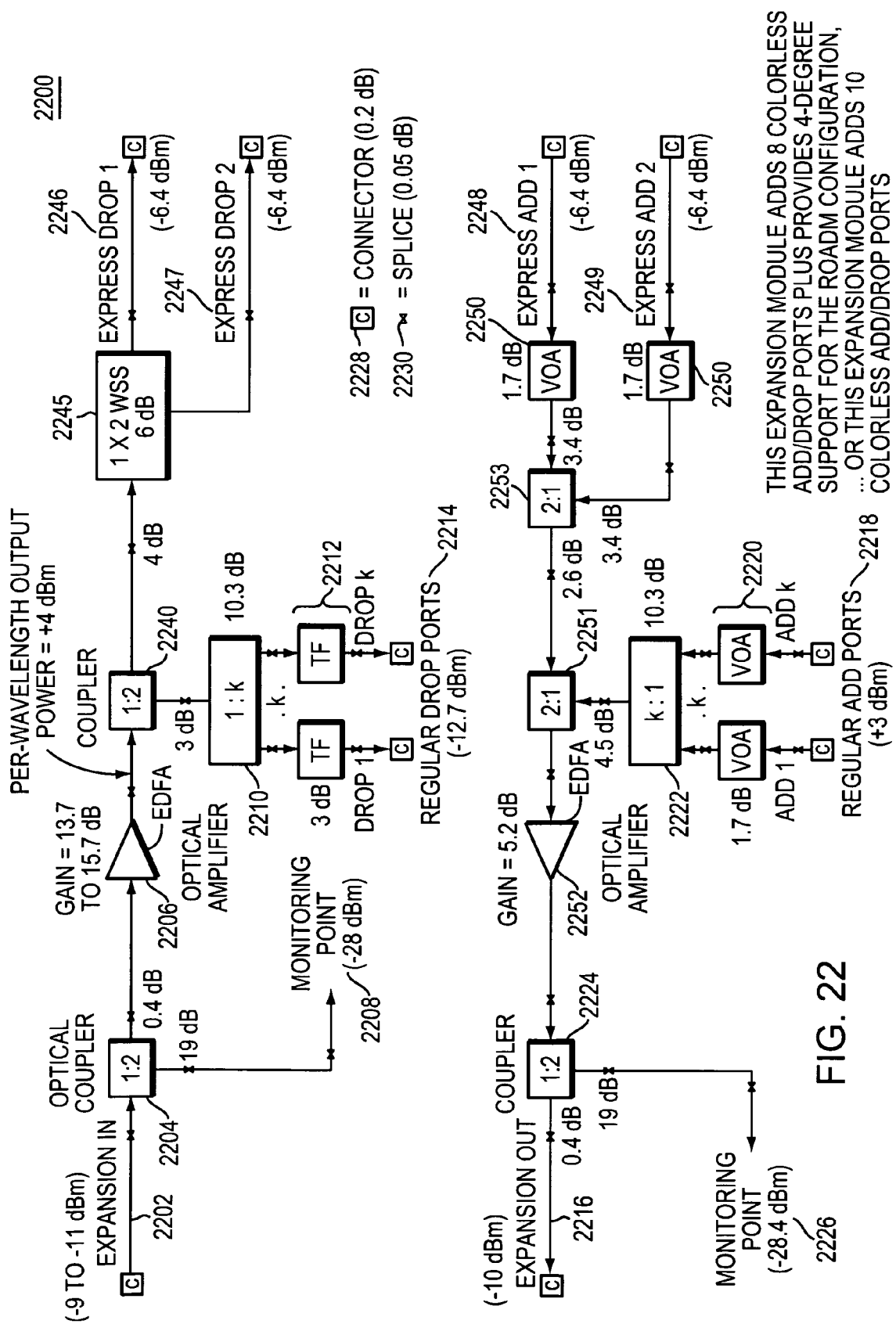
FIG. 22 is a block diagram depicting a colorless expansion module according to an alternative example embodiment of the present invention.

FIG. 22 depicts an alternative example embodiment illustrating a colorless expansion module 2200. The expansion module 2200 provides both additional k colorless add/drop ports (e.g., k=8) and, when attached to ROADM 1800 of FIG. 18 (with either input optical block 1900 of FIG. 19 or input optical block 2000 of FIG. 20A), support for up to 6 degrees. (This assumes that the two express drop ports in FIG. 19 and/or FIG. 20A are operated as express ports. If the two express drop ports in FIG. 19 and/or FIG. 20A are operated as regular (dedicated) drop ports, then the expansion module 2200 provides both additional k colorless add/drop ports (k=8 for example) and support for up to 4 degrees.)

Alternatively, the colorless expansion module 2200 provides an additional k+2 colorless add/drop ports (e.g., k=8) if the express drop ports 2246, 2247 are used as regular (dedicated) drop ports and the express add ports 2248, 2249 are used as regular (dedicated) add ports.

When expansion module 2200 of FIG. 22 is combined with input block 1900 of FIG. 19, a larger WSS is formed from smaller WSS devices using parallelism. More specifically, a 1×5 WSS device is formed, spread across two circuit packs— the circuit pack containing the ROADM 1800 (with input optical block 1900) and the circuit pack containing the circuitry of the colorless expansion module 2200. The 1×5 WSS is composed of WSS 1910 of FIG. 19, WSS 1942 of FIG. 19, WSS 2245 of FIG. 22, optical coupler 1904 of FIG. 19, optical coupler 1940 of FIG. 19, optical coupler 1908 of FIG. 19, optical coupler 1912 of FIG. 19, optical coupler 2204 of FIG. 22, and optical coupler 2240 of FIG. 22. Alternatively, a larger or smaller overall 1×N WSS device can be created using any number of smaller WSS devices using parallelism. Further, the overall larger 1×N WSS can be spread over any number of circuit packs.

Although FIG. 22 shows a 1×2 WSS 2245, a larger WSS device may be substituted for 2245 to provide for greater than 6-degree support. For instance, the 1×2 WSS 2245 may be replaced with a 1×4 WSS to provide support for up to eight degrees when combined with ROADM 1800. For this case, the 2:1 coupler 2253 may be replaced with a 4-to-1 coupler, and two additional express drop ports and two additional express add ports could be added to module 2200.

In addition, an embedded optical amplifier in the path leading to the 1×2 WSS device 2245 amplifies wavelengths exiting the 1×2 WSS 2245 portion of the overall 1×5 WSS. When expanding to support eight or more degrees, the gain of optical amplifiers 2206 and 2252 may be adjusted to a higher value. If the gain of the output optical amplifier 1848 of FIG. 18 is increased sufficiently (e.g., at least 4 dB), the optical amplifier 2252 of FIG. 22 may be eliminated.

Figure 23:
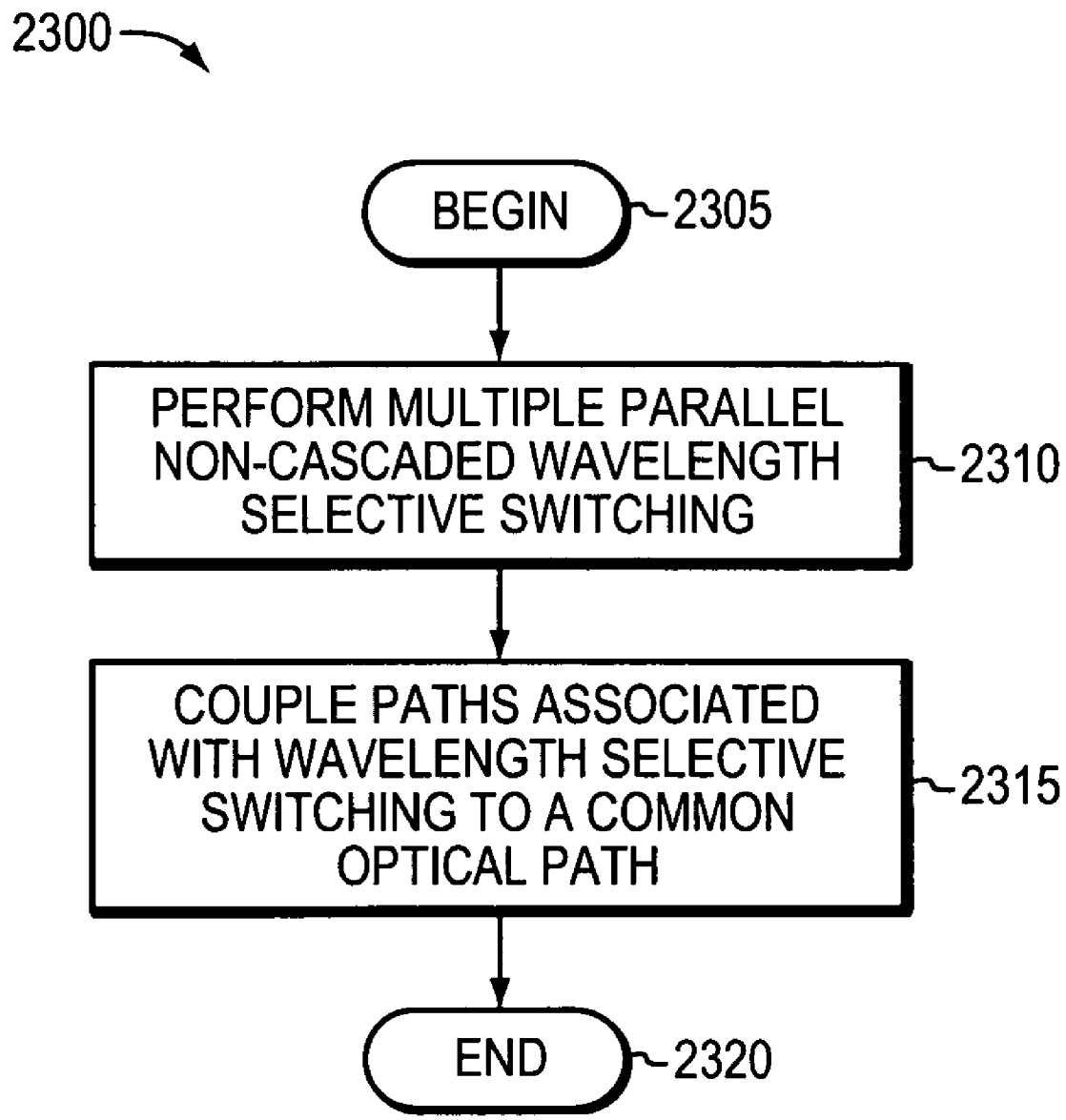
FIG. 23 is a flow diagram performed in accordance with an example embodiment of the present invention.

FIG. 23 is a flow diagram (2300) that illustrates an example embodiment of the present invention. The procedure 2300 begins (2305) and then performs multiple parallel non-cascaded wavelength selective switching of multiple optical signals having multiple wavelengths (2310), such as DWDM signals or other signals known in the art. Next, multiple optical paths associated with the multiple parallel WSS are coupled to a common optical path (2315), leading to an end (2320). In one embodiment, the optical path may be coupled using a single optical coupler. In an alternative embodiment, the optical coupler may include two or more optical couplers cascaded or daisy chained together.

Figure 24:
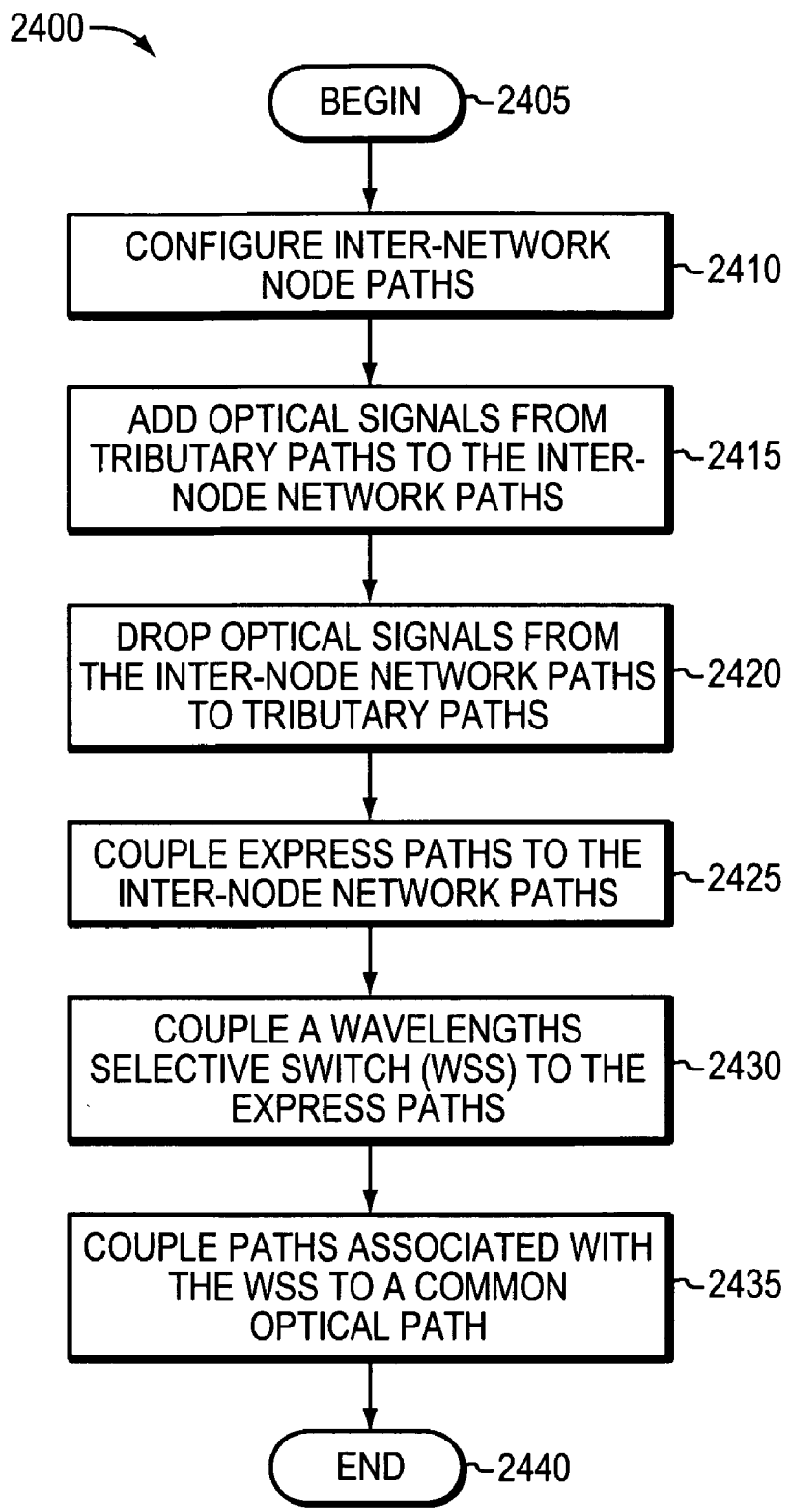
FIG. 24 is a flow diagram performed in accordance with an alternative example alternative embodiment of the present invention.

FIG. 24 is a flow diagram (2400) that illustrates a technique for multiplexing optical signals at an optical node and an optical network using a ROADM. After beginning (2405), the inter-network node paths are configured (2410). Optical signals from tributary paths may be added to the inter-network (2415). Optical signals may also be dropped from the inter-node network paths to the tributary paths (2420). Express paths may be coupled to the inter-node network paths (2425).

Next, a WSS may be coupled to the express paths (2430). The WSS performs multiple parallel wavelength-selective switching of the optical signal, which may have multiple wavelengths (2430). In addition, multiple optical paths associated with the multiple parallel wavelength-selective switching may also be coupled to a common optical path (2435).

Figure 25:
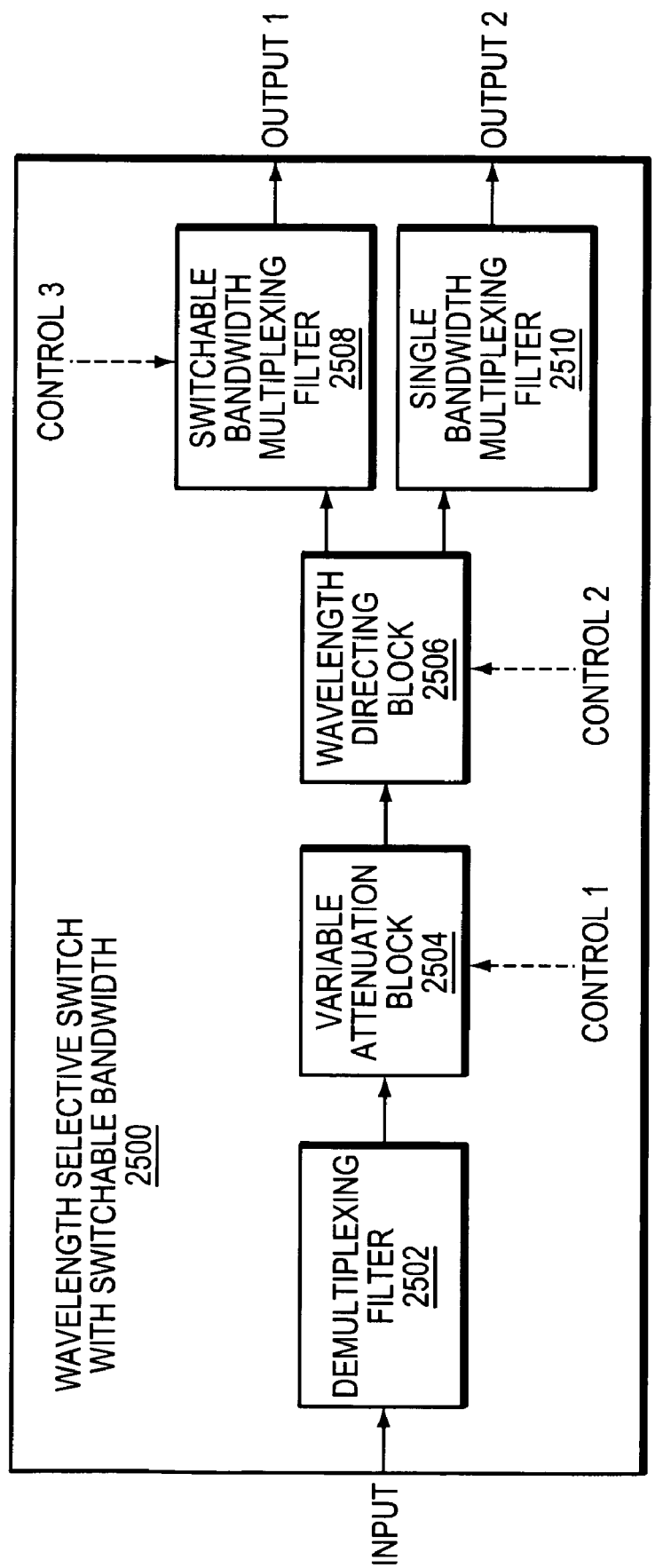
FIG. 25 is a block diagram of a WSS with switchable bandwidth.

FIG. 25 shows a block diagram of a 1×2 WSS 2500 with switchable bandwidth. In the WSS 2500, one of the two outputs (output 1) has the ability to switch between two different filter bandwidths, while the other output (output 2) does not have the ability to switch between two different bandwidths. A DWDM signal containing multiple wavelengths is applied to the input of the WSS 2500, and the signal is forwarded to a de-multiplexing filter block 2502. Within the de-multiplexing filter block 2502, the DWDM signal is directed through a wide-bandwidth filtering device which separates the signal into its individual wavelengths.

The individual wavelengths are then forwarded to the variable attenuation block 2504, where the optical power of each individual wavelength may be independently attenuated by some variable amount using the Control 1 interface. Once the wavelengths exit the variable attenuation block 2504, they are forwarded to a wavelength directing block 2506. The wavelength directing block 2506 is used to direct each of the individual wavelengths to either output 1 or output 2 using the Control 2 interface.

After exiting the wavelength directing block 2506, the group of wavelengths that have been directed to output 1 are forwarded to the switchable bandwidth multiplexing filter block 2508, while the group of wavelengths which have been directed to output 2 are forwarded to the single bandwidth multiplexing filter block 2510. Wavelengths entering the single bandwidth multiplexing filter block 2510 are combined (multiplexed) together using a combining filter which presents a fixed wide-bandwidth to each wavelength as the wavelengths are combined into one composite DWDM single. This DWDM signal then exits the WSS via output 2.

Conversely, the wavelengths entering the switchable bandwidth multiplexing filter block 2508 can be combined into one composite DWDM filter using one of at least two filtering bandwidths. The Control 3 interface is used to select which filter bandwidths are used for the combining operation. The DWDM signal then exits the WSS 2500 via output 1.

The WSS 2500 can be used to build a ROADM containing one dedicated express output port (output 2) and one express drop port (output 1). For this case, the switchable bandwidth multiplexing filter block 2508 may include a set of narrow-bandwidth filters that may be used when the express drop port is operating as a drop port. The block 2508 may also include a set of wider bandwidth filters that would be used when the express drop port is operating as an express port.

Figure 26:
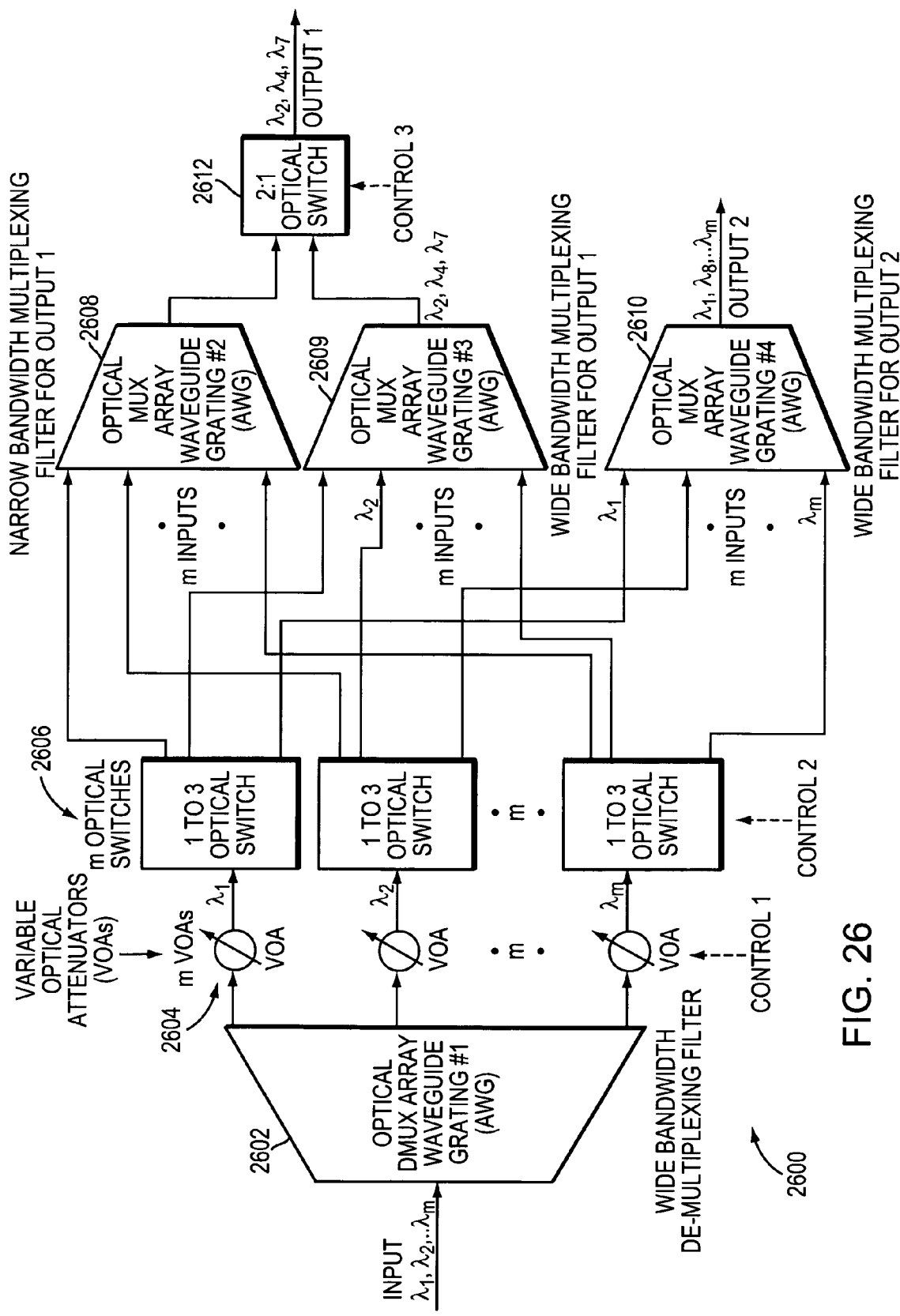
FIG. 26 is a block diagram of an alternative WSS with switchable bandwidth.

FIG. 26 is a block diagram of an alternative WSS 2600 with switchable bandwidth. In the WSS 2600, a wide-bandwidth array waveguide grating (AWG) 2602 is used to de-multiplex the incoming DWDM signal containing m number of wavelengths into its individual wavelengths. A set of m VOAs 2604 attenuates the wavelengths by some programmable amount using the Control 1 interface.

After attenuation, the wavelengths are forwarded to a group of m number of 1×3 optical switches 2606. Each of the m wavelengths are forwarded to one of three optical multiplexing devices (AWGs) 2608-2610 by the 1×3 optical switches via the Control 2 interface. Wavelengths that are destined for WSS output 2 are sent to the optical multiplexer 2610. Wavelengths that are destined for WSS output 1 are sent to either the optical multiplexer 2608 or the optical multiplexer 2609.

When sending each wavelength destined for output 1 through a narrow-bandwidth filter, the wavelengths are directed to the optical multiplexer 2608. When sending each wavelength destined for output 1 through a wide bandwidth filter, the wavelengths are directed to the optical multiplexer 2609. In the example implementation shown in FIG. 26, either all the wavelengths destined for WSS output 1 are sent to the optical multiplexer 2608 or all the wavelengths destined for WSS output 1 are sent to the optical multiplexer 2609. A 2×1 optical switch 2612 is then used to direct all the wavelengths from the optical multiplexers 2608 and 2609 to output 1. The 2×1 switch is controlled by the Control 3 interface.

If WSS output 1 is configured to operate as a drop port, then a single wavelength is forwarded to the optical multiplexer 2608, and the 2×1 optical switch 2612 is configured to direct the single wavelength to output 1 of the WSS. If WSS output 1 is configured to operate as an express port, then multiple wavelengths may be forwarded to the optical multiplexer 2609, and the 2×1 optical switch may be configured to direct the wavelengths from the optical multiplexer 2609 to WSS output 1.

Although the WSSs shown in FIGS. 25 and 26 each include contain only a single switchable bandwidth output port and a single non-switchable bandwidth output port, a WSS may have any number of switchable bandwidth output ports and any number of non-switchable bandwidth output ports.

Also, the optical components shown in the WSS 2600 of FIG. 26 may be integrated onto a single silicon die, or they may be separate discrete components, or they may be implemented as any combination of integrated and discrete components. Although the switchable filter multiplexer shown in FIG. 26 is implemented using multiplexing AWGs 2608-2610, 1×3 optical switches 2606, and a 2×1 optical switch 2612, the invention is not limited to such an implementation. For example, a single tunable filter (with narrow bandwidth) and a single multiplexing AWG (with wider bandwidths), along with a 2×1 optical switch could be used to implement the switchable filter multiplexer similar to the one shown in FIG. 26.

The ROADMs and optical input blocks described herein may include any type of wavelength filtering device, including the WSSs, sub-WSSs, and tunable filters described above. Example input blocks may include WSSs, tunable filters (including tunable filter arrays), or combinations thereof to forward wavelengths to dedicated express ports, dedicated drop ports, and express drop ports. Optical input blocks may also include alternative wavelength filtering devices known to those skilled in the art.

It should be readily appreciated by those of ordinary skill in the art that the aforementioned blocks are merely examples and that the present invention is in no way limited to the number of blocks or the ordering of blocks described above. For example, some of the illustrated flow diagrams may be performed in an order other than that which is described. It should be appreciated that not all of the illustrated flow diagrams is required to be performed, that additional flow diagram(s) may be added, and that some may be substituted with other flow diagram(s).

It should also be apparent that methods involved in the invention may be embodied in a computer program product that includes a computer readable medium. For example, such a computer readable medium may be a read-only memory device, such as a CD-ROM disk or convention ROM devices, or a random access memory, such as a hard drive device, computer diskette, or memory having a computer readable program code stored thereon. The computer may load the program code and execute it to perform some or all of the example operations described herein or equivalents thereof.

While this invention has been particularly shown and described with references to example embodiments thereof, it will be understood by those skilled in the art that various changes in form and details may be made therein without departing from the scope of the invention encompassed by the appended claims.

What is claimed is:

1. A wavelength-selective switch (WSS) comprising:
    multiple parallel non-cascaded WSSs;
    at least one add path coupled to an input of at least one of the WSSs, the add path configured to carry optical traffic from at least one tributary path; and
    an optical coupler optically coupled to the multiple parallel non-cascaded WSSs.

2. The WSS as claimed in claim 1 wherein the optical coupler includes cascaded optical couplers.

3. The WSS as claimed in claim 1 wherein the WSS is a first WSS and further including:
    at least one expansion path, the at least one expansion path being directly output from the optical coupler; and
    a second WSS.

4. The WSS as claimed in claim 3 further including an optical amplifier disposed between the optical coupler and the second WSS.

5. The WSS as claimed in claim 1 further including:
    multiple optical couplers each coupled to multiple non-cascaded WSSs; and
    a combining WSS coupled to the multiple optical couplers.

6. The WSS as claimed in claim 1 wherein the WSS coupled to the at least one add path is configured to perform power balancing.

7. The WSS as claimed in claim 1 wherein the WSS further includes an optical channel monitor configured to measure a power level for each wavelength forwarded to the optical channel monitor and set an output of at least one wavelength based on respective power levels.

8. The WSS as claimed in claim 7 wherein the optical channel monitor includes a variable optical attenuator configured to set the level of power of the at least one wavelength as a function of at least one of the power levels measured.

9. A method of wavelength-selective switching of optical signals at an optical node, the method comprising:
    performing multiple parallel non-cascaded wavelength-selective switching of multiple optical signals having multiple wavelengths;
    coupling at least one add path to an input of the multiple parallel non-cascaded wavelength selective switching, the add path configured to carry optical traffic from at least one tributary path; and
    coupling the multiple optical signals associated with the multiple parallel non-cascaded wavelength selective switching to a common optical path.

10. The method as claimed in claim 9 wherein coupling the multiple optical paths includes cascaded optical coupling.

11. The method as claimed in claim 9 wherein performing the wavelength-selective switching includes:
    coupling an output expansion path associated with a wavelength-selective switching group to the common optical path.

12. The method as claimed in claim 11 further including:
    amplifying the optical signals in the output expansion path.

13. The method as claimed in claim 9 wherein coupling the multiple optical paths includes:
    coupling multiple optical path groups, wherein each group is associated with respective multiple parallel non-cascaded wavelength selective switching; and
    combining the coupled groups onto a common optical path via a combining WSS.

14. The method as claimed in claim 9 further comprising:
    power balancing wavelengths associated with the multiple parallel non-cascaded wavelength selective switching using a wavelength selective switch coupled to the at least one add path.

15. A wavelength-selective switch (WSS) comprising:
    multiple parallel non-cascaded WSSs having all inputs configured to be available to receive optical signals having multiple wavelengths at the WSS;
    at least one add path coupled to an input of at least one of the WSSs, the add path configured to carry optical traffic from at least one tributary path; and
    an optical coupler optically coupled to outputs of the multiple parallel non-cascaded WSSs.

16. The WSS as claimed in claim 15 wherein the optical coupler includes cascaded optical couplers.

17. The WSS as claimed in claim 15 wherein the WSS is a first WSS and further including:
    at least one expansion path, the expansion path being directly output from the optical coupler; and
    a second WSS.

18. The WSS as claimed in claim 17 further including an optical amplifier disposed between the expansion port and the second WSS.

19. The WSS as claimed in claim 15 further including:
    multiple optical couplers each coupled to multiple non-cascaded WSSs; and
    a combining WSS coupled to the multiple optical couplers.

20. The WSS as claimed in claim 15 wherein the WSS coupled to the at least one add path is configured to perform power balancing.

21. A method of wavelength selective switching of optical signals at an optical node, the method comprising:
performing multiple parallel non-cascaded wavelength selective switching of optical signals having multiple wavelengths received at input ports all available to receive the optical signals;
coupling at least one add path to an input port of the multiple parallel non-cascaded wavelength selective switching, the add path configured to carry optical traffic from at least one tributary path; and
coupling multiple output optical paths associated with the multiple parallel non-cascaded wavelength selective switching to a common optical path.

22. The method as claimed in claim 21 wherein coupling the optical coupler includes cascaded optical coupling.

23. The method as claimed in claim 21 wherein performing the wavelength selective switching includes:
coupling an output expansion path associated with a first wavelength-selective switching group to the common optical path.

24. The method as claimed in claim 23 further including:
amplifying optical signals in the output expansion path.

25. The method as claimed in claim 21 wherein coupling the multiple optical paths includes:
coupling multiple optical path groups, where each group is associated with respective multiple parallel non-cascaded wavelength selective switching; and
combining the coupled groups onto a common optical path via a combining WSS.

26. The method as claimed in claim 21 further comprising:
power balancing wavelengths associated with the multiple parallel non-cascaded wavelength selective switching using a wavelength selective switch coupled to the at least one add path.

27. A wavelength-selective switch (WSS) comprising:
multiple parallel non-cascaded WSSs having all outputs configured to be available to output optical signals having multiple wavelengths from the WSS;
at least one add path coupled to an input of at least one of the WSSs, the add path configured to carry optical traffic from at least one tributary path; and
an optical coupler optically coupled to inputs of the multiple parallel non-cascaded WSSs.

28. The WSS as claimed in claim 27 wherein the optical coupler includes cascaded optical couplers.

29. The WSS as claimed in claim 27 wherein the WSS is a first WSS and further including:
at least one expansion path, the expansion path being directly output from the optical coupler; and
a second WSS.

30. The WSS as claimed in claim 29 further including an optical amplifier disposed between the optical coupler and the second WSS.

31. The WSS as claimed in claim 27 further including:
multiple optical couplers each coupled to multiple non-cascaded WSSs; and
a combining WSS coupled to the multiple optical couplers.

32. The WSS as claimed in claim 27 wherein the WSS coupled to the at least one add path is configured to perform power balancing.

33. A method of wavelength-selective switching of optical signals at an optical node, the method comprising:
performing multiple parallel non-cascaded wavelength-selective switching of optical signals having multiple wavelengths transmitted from output ports such that all the output ports are available to transmit the optical signals;
coupling at least one add path to an input port of the multiple parallel non-cascaded wavelength selective switching, the add path configured to carry optical traffic from at least one tributary path; and
coupling a common optical path to multiple input optical paths associated with the multiple parallel non-cascaded wavelength selective switching.

34. The method as claimed in claim 33 wherein coupling the optical coupler includes cascaded optical coupling.

35. The method as claimed in claim 33 wherein performing the wavelength selective switching includes:
coupling an output expansion path associated with a first wavelength-selective switching group to the common optical path.

36. The method as claimed in claim 35 further including:
amplifying optical signals in the output expansion path.

37. The method as claimed in claim 33 wherein coupling the multiple optical paths includes:
coupling multiple optical path groups, where each group is associated with respective multiple parallel non-cascaded wavelength selective switching; and
combining the coupled groups onto a common optical path via a combining WSS.

38. The method as claimed in claim 33 further comprising:
power balancing wavelengths associated with the multiple parallel non-cascaded wavelength selective switching using a wavelength selective switch coupled to the at least one add path.

* * * * *